(12) United States Patent
Park et al.

(10) Patent No.: US 11,758,125 B2
(45) Date of Patent: Sep. 12, 2023

(54) DEVICE AND METHOD FOR PROCESSING VIDEO SIGNAL BY USING INTER PREDICTION

(71) Applicant: LG ELECTRONICS INC., Seoul (KR)

(72) Inventors: Naeri Park, Seoul (KR); Junghak Nam, Seoul (KR); Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 236 days.

(21) Appl. No.: 17/420,611

(22) PCT Filed: Jan. 2, 2020

(86) PCT No.: PCT/KR2020/000068
§ 371 (c)(1),
(2) Date: Jul. 2, 2021

(87) PCT Pub. No.: WO2020/141911
PCT Pub. Date: Jul. 9, 2020

(65) Prior Publication Data
US 2022/0078408 A1    Mar. 10, 2022

Related U.S. Application Data

(60) Provisional application No. 62/787,749, filed on Jan. 2, 2019.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/137* (2014.11); *H04N 19/159* (2014.11); *H04N 19/176* (2014.11)

(58) Field of Classification Search
CPC .. H04N 19/105; H04N 19/132; H04N 19/137; H04N 19/159; H04N 19/176;
(Continued)

(56) References Cited

U.S. PATENT DOCUMENTS

2018/0098063 A1    4/2018  Chen et al.
2018/0192069 A1    7/2018  Chen et al.
(Continued)

FOREIGN PATENT DOCUMENTS

KR    10-2018-0123041 A    11/2018
WO    2017/0147765 A1    9/2017
WO    2017/0156705 A1    9/2017

*Primary Examiner* — Hesham K Abouzahra
(74) *Attorney, Agent, or Firm* — Bryan Cave Leighton Paisner LLP

(57) ABSTRACT

A video signal processing method comprises obtaining a merge subblock index for a current block for which a parameter for subblock-based inter prediction is derived from a surrounding block; obtaining control point motion vectors for control points of the current block, based on the merge subblock index, the merge subblock index being related to one candidate in a subblock-based merge candidate list; applying one or more offsets to the control point motion vectors, based on a merge with motion vector direction index for refining the control point motion vectors; determining a motion vector for each subblock based on the respective positions of the subblocks in the current block and the control point motion vectors to which the one or more offsets have been applied; and generating prediction samples for the current block based on a reference picture related to the subblock merge index and the motion vectors for each subblock.

15 Claims, 37 Drawing Sheets

(51) Int. Cl.
*H04N 19/137* (2014.01)
*H04N 19/159* (2014.01)
*H04N 19/176* (2014.01)

(58) Field of Classification Search
CPC .. H04N 19/119; H04N 19/139; H04N 19/513; H04N 19/52; H04N 19/563
See application file for complete search history.

(56) References Cited

U.S. PATENT DOCUMENTS

2022/0021900 A1* 1/2022 Jeong ..................... H04N 19/70
2022/0078488 A1* 3/2022 Leleannec ............ H04N 19/105

* cited by examiner

[FIG. 1]
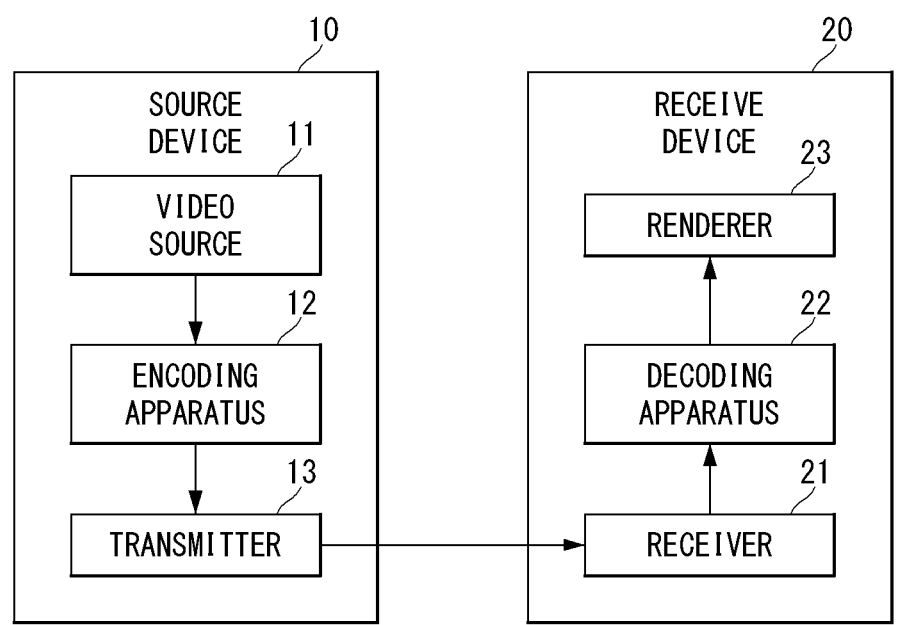

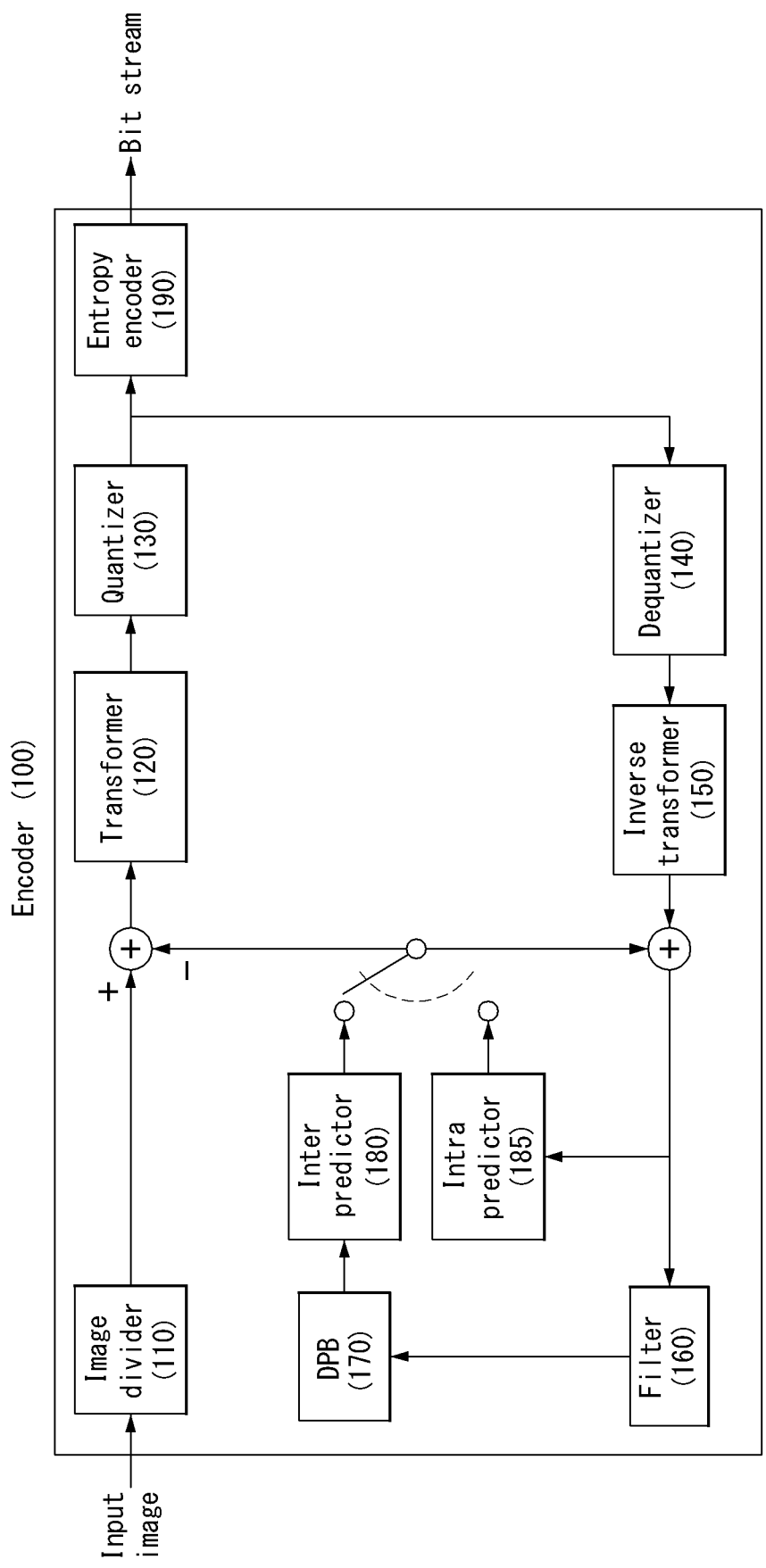
[FIG. 2]

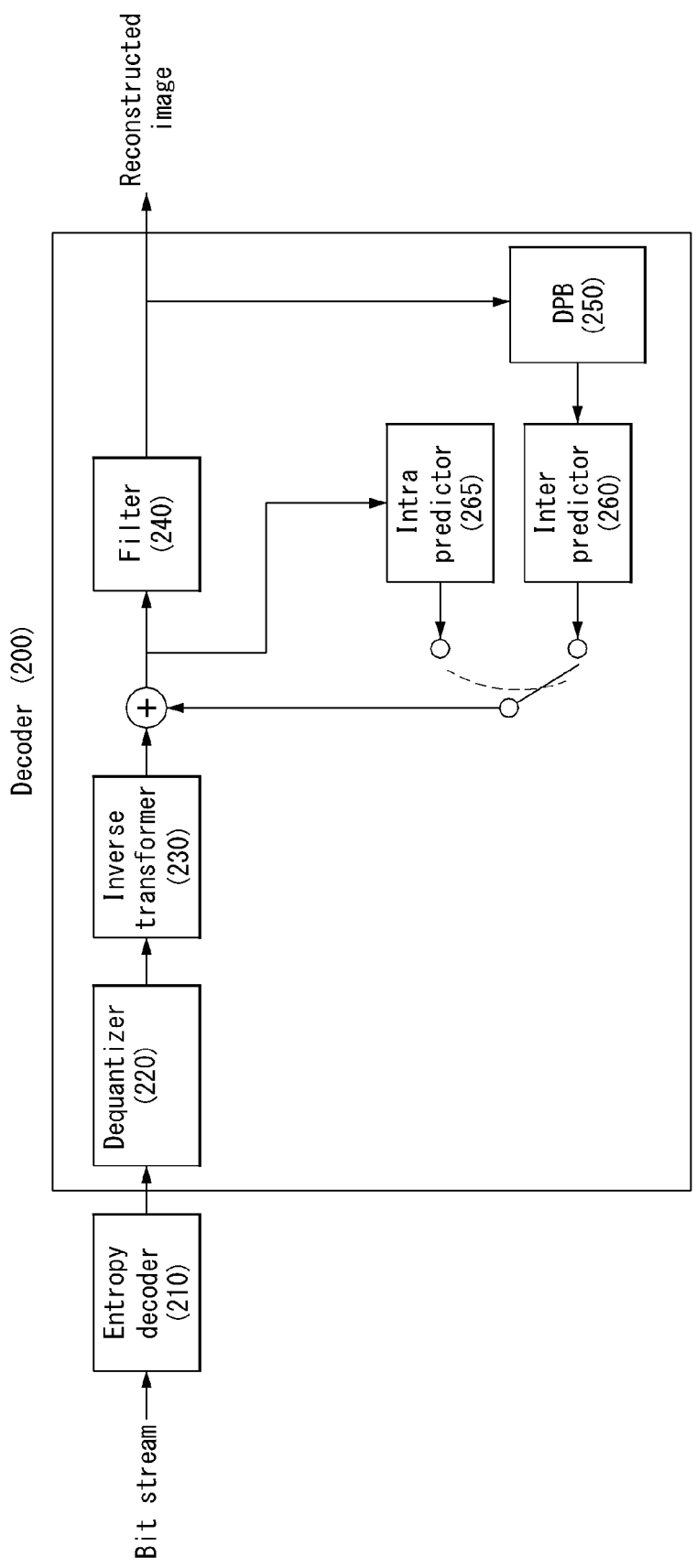
[FIG. 3]

[FIG. 4]
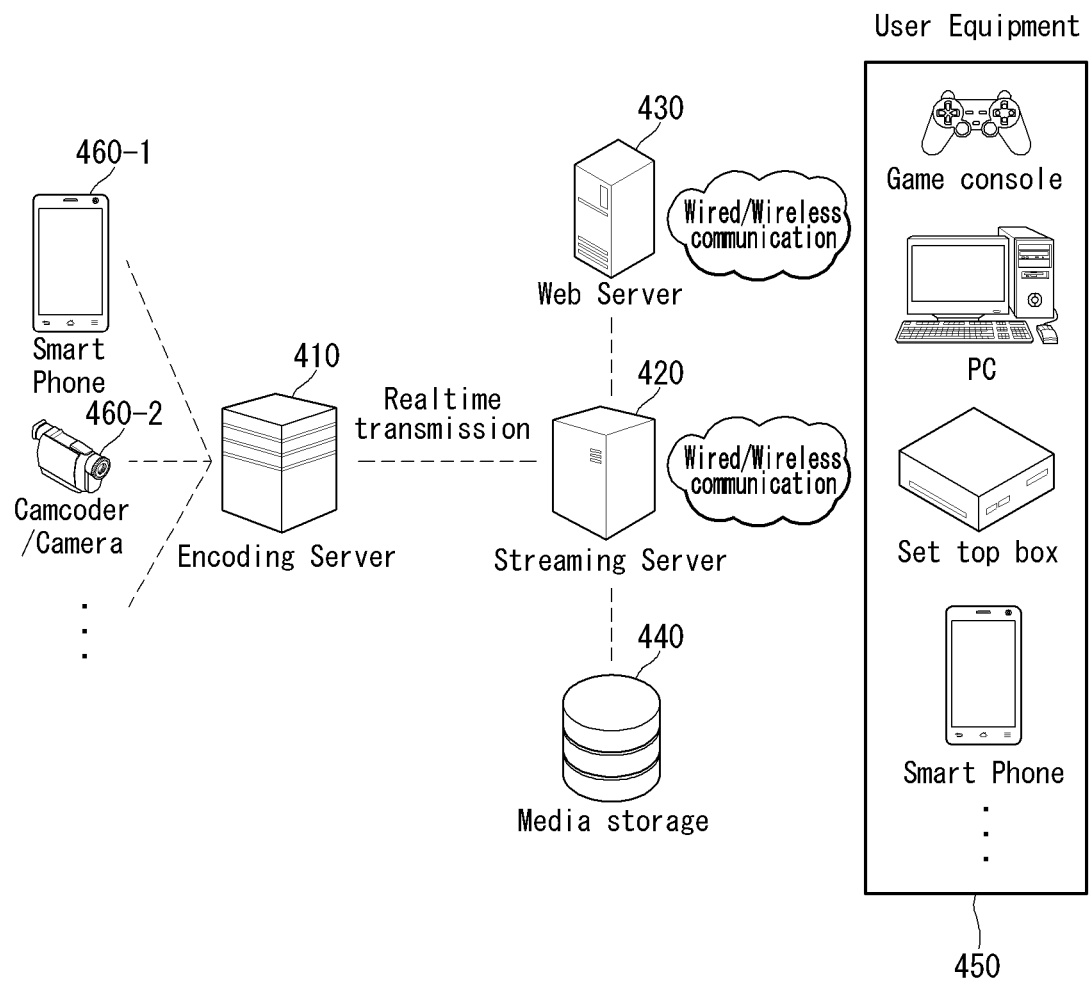

[FIG. 5]
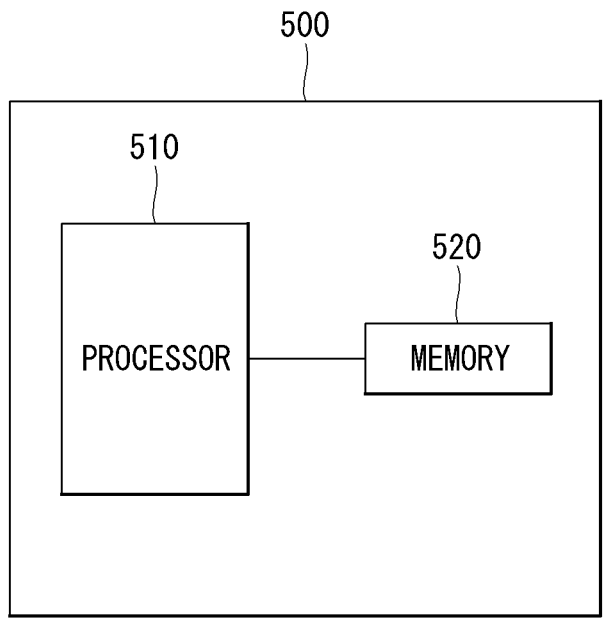
[FIG. 6]
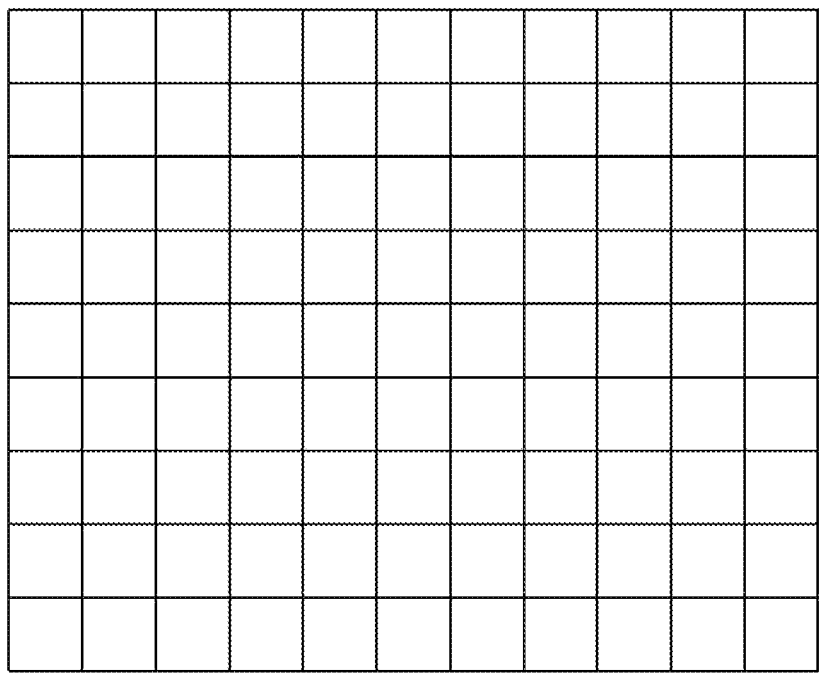

[FIG. 7]
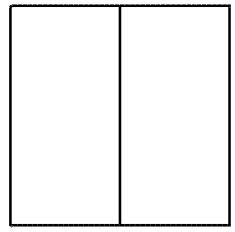 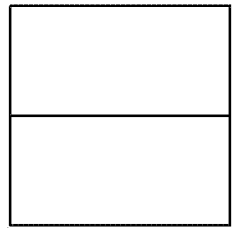 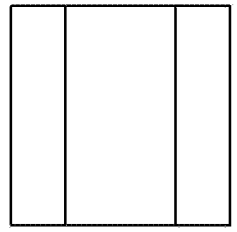 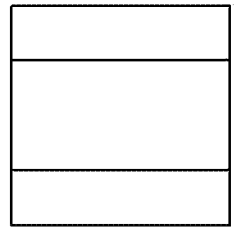
SPLIT_BT_VER    SPLIT_BT_HOR    SPLIT_TT_VER    SPLIT_TT_HOR

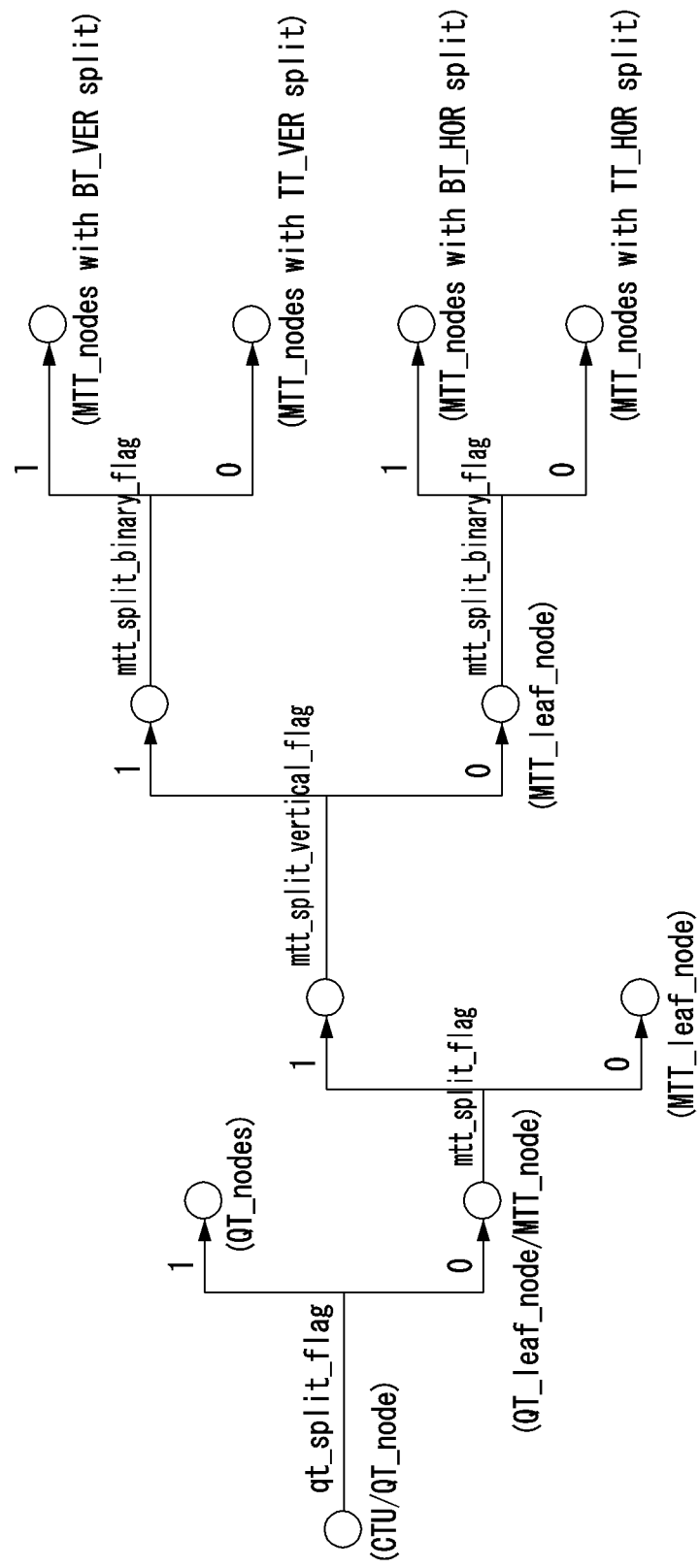
[FIG. 8]

[FIG. 9]
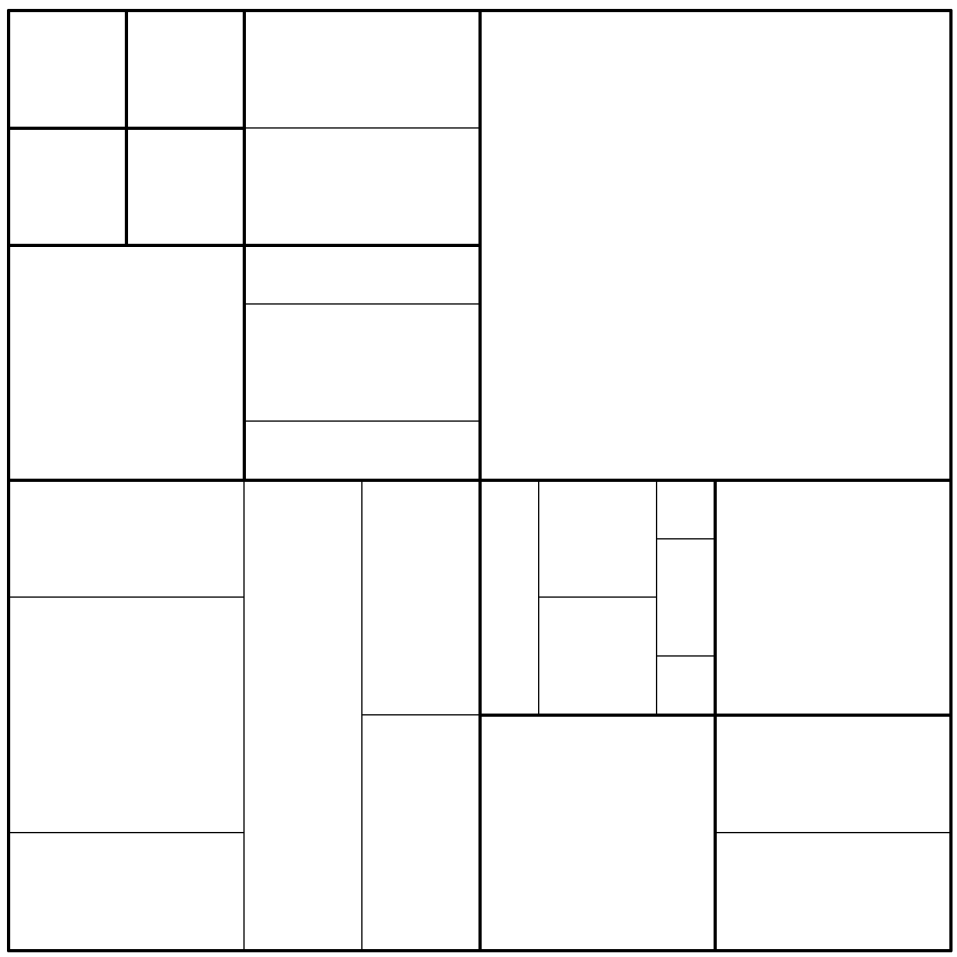

[FIG. 10]
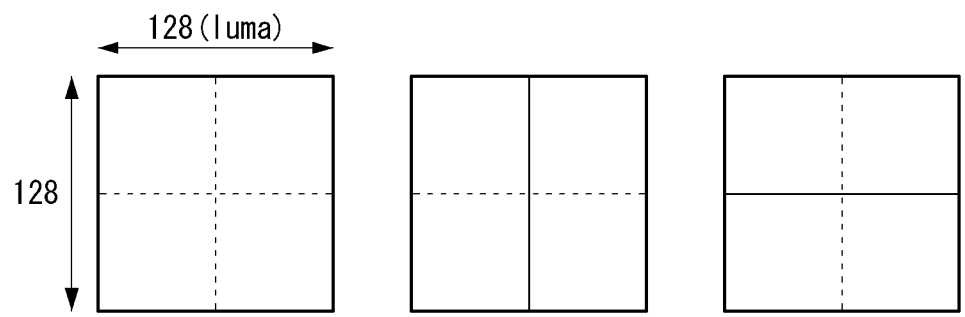
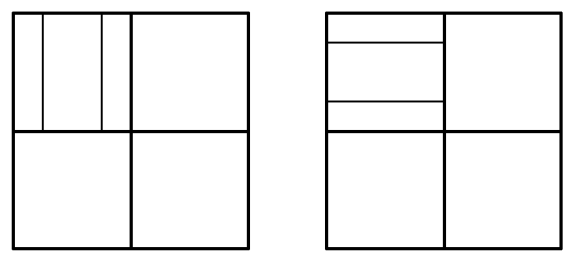
[FIG. 11]
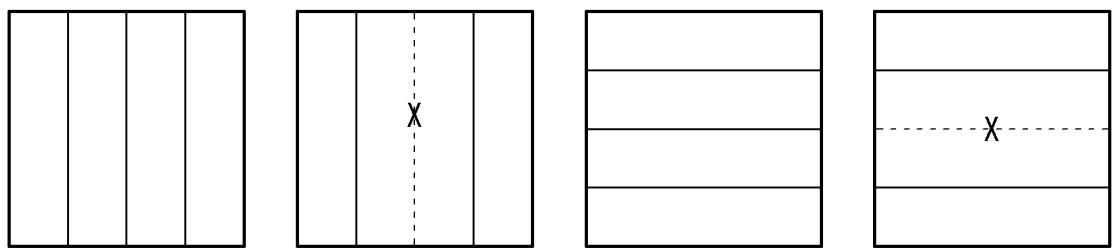

[FIG. 12]
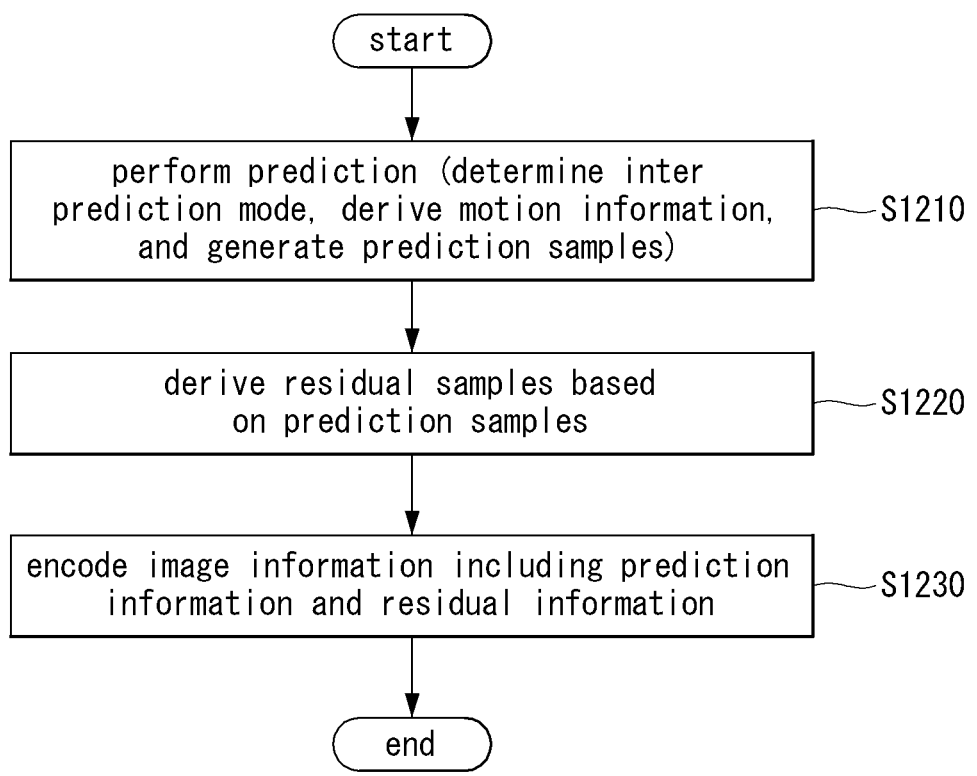

[FIG. 13]
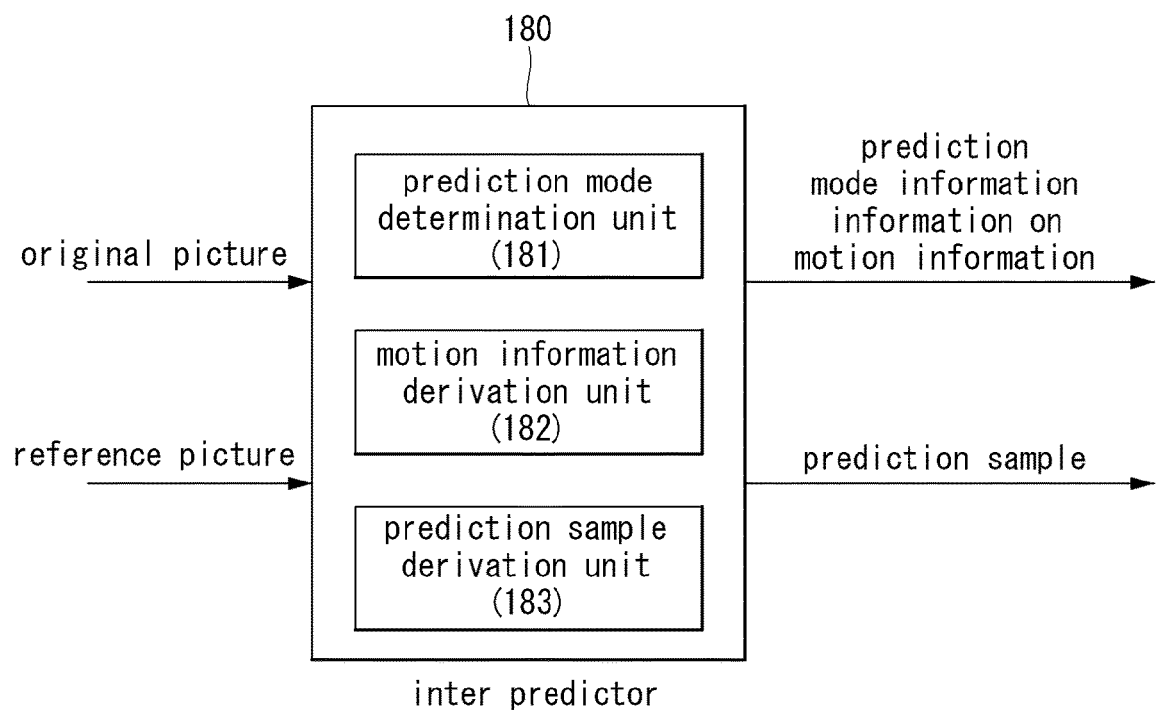

[FIG. 14]
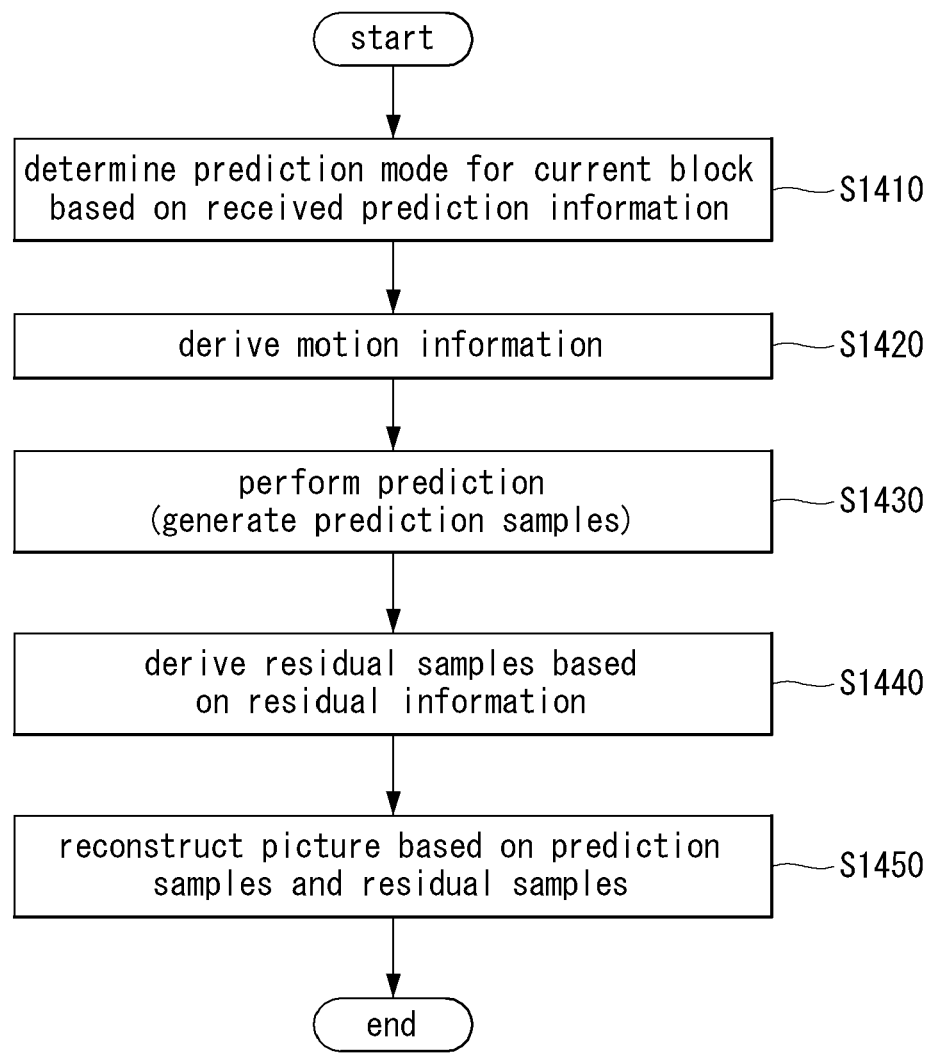

[FIG. 15]
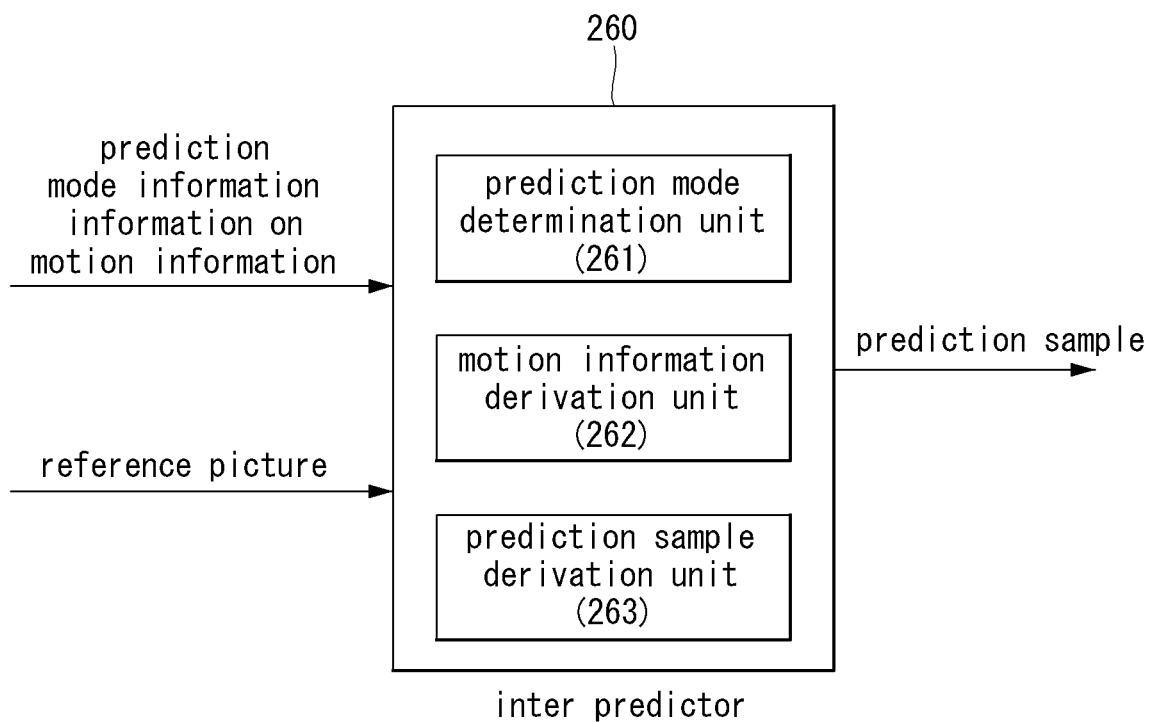
[FIG. 16]
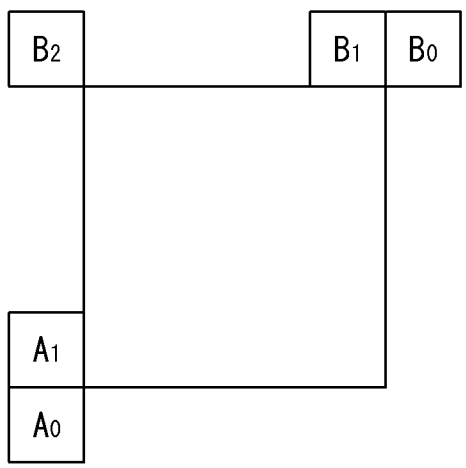

[FIG. 17]
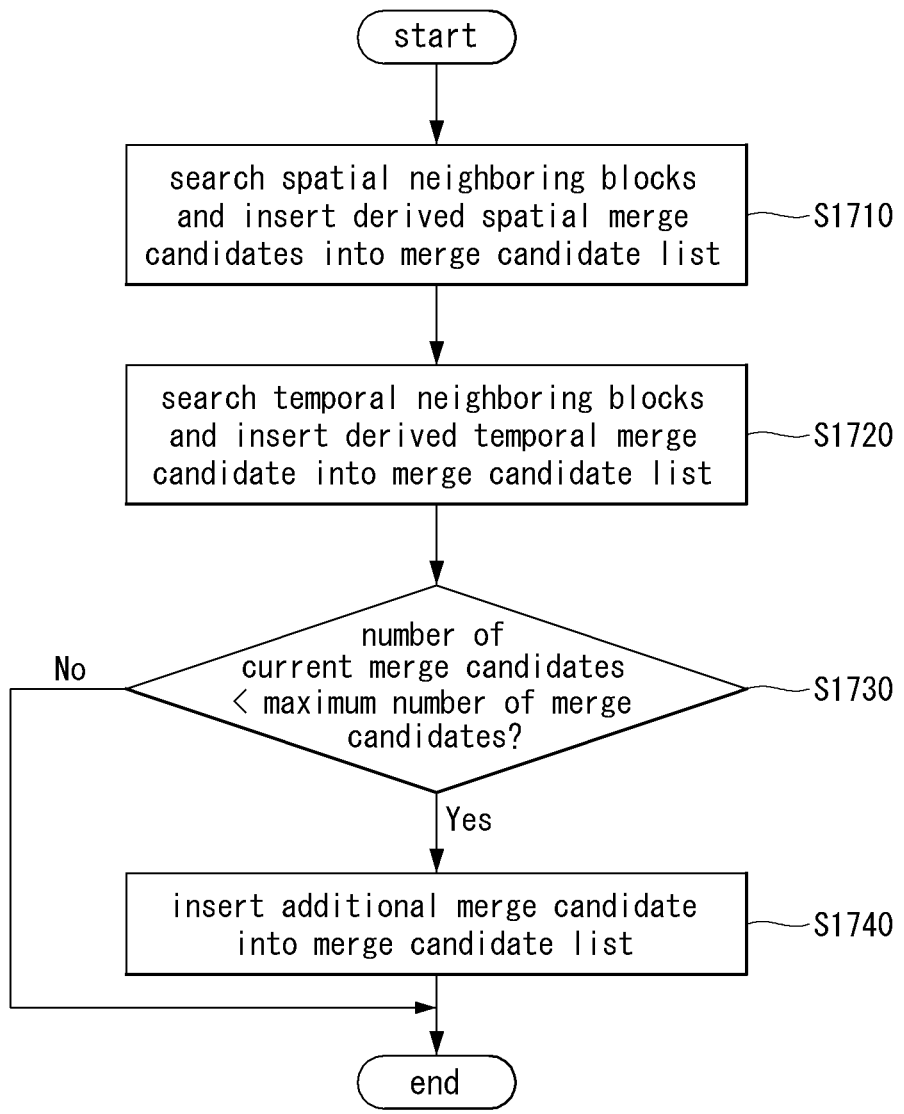

[FIG. 18]
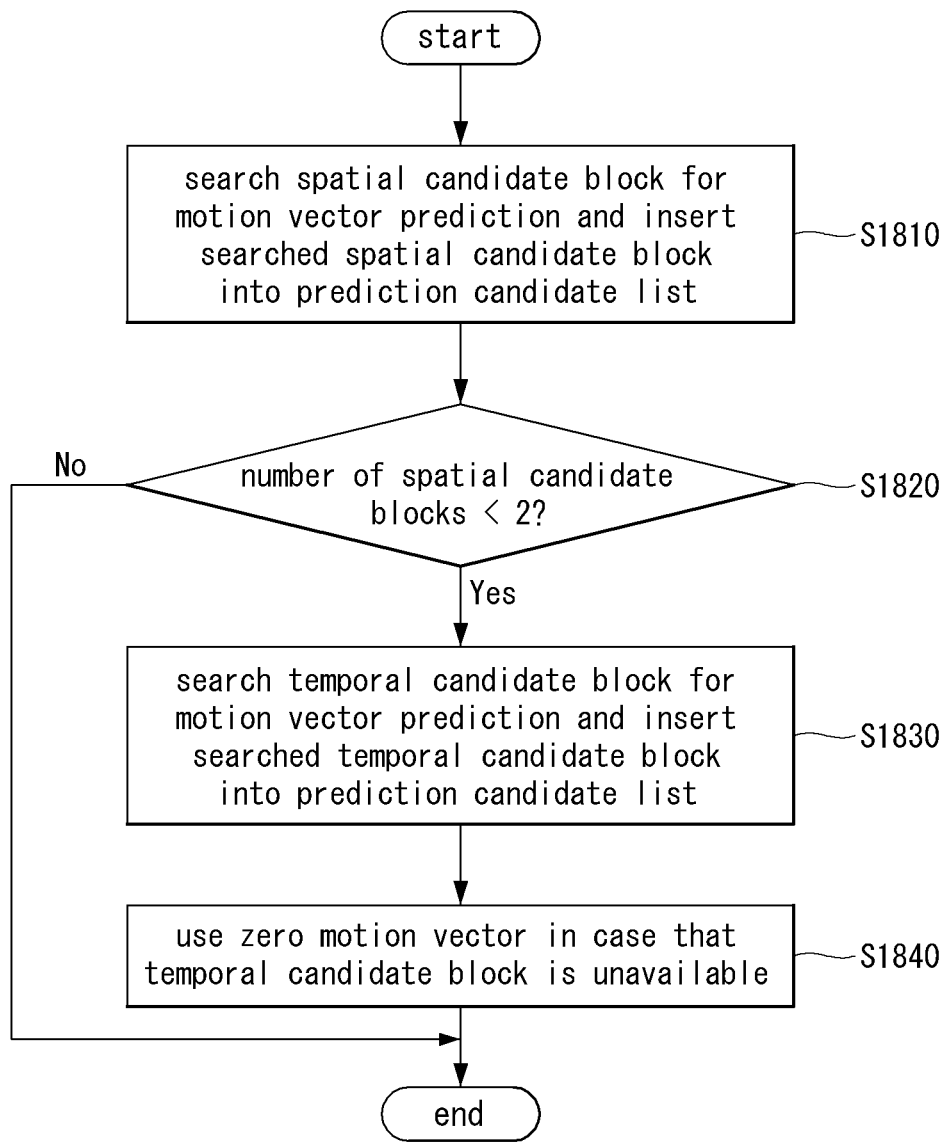

[FIG. 19]
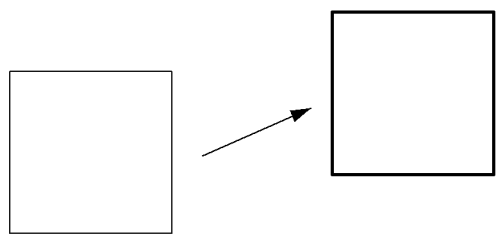
Translate
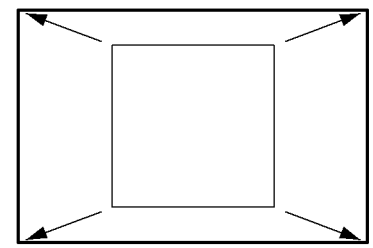
Scale
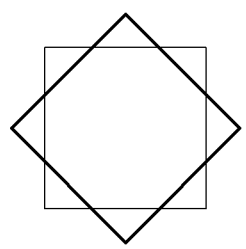
Rotate
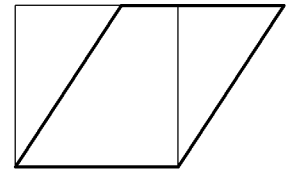
Shear

[FIG. 20A]
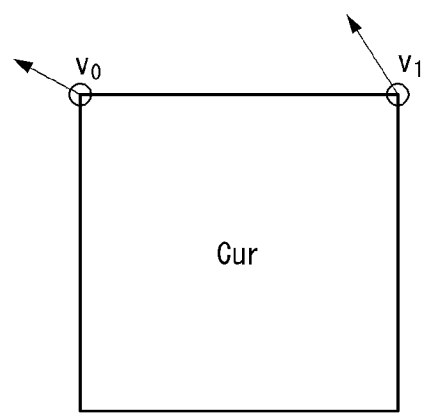

[FIG. 20B]
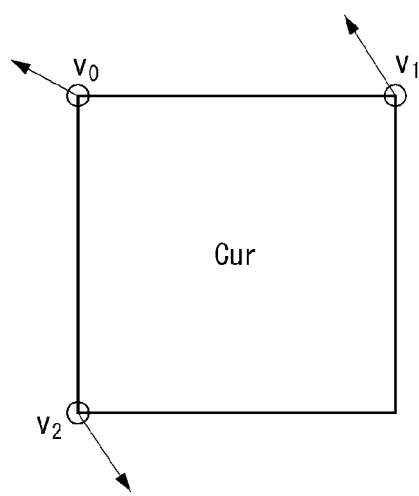

[FIG. 21]
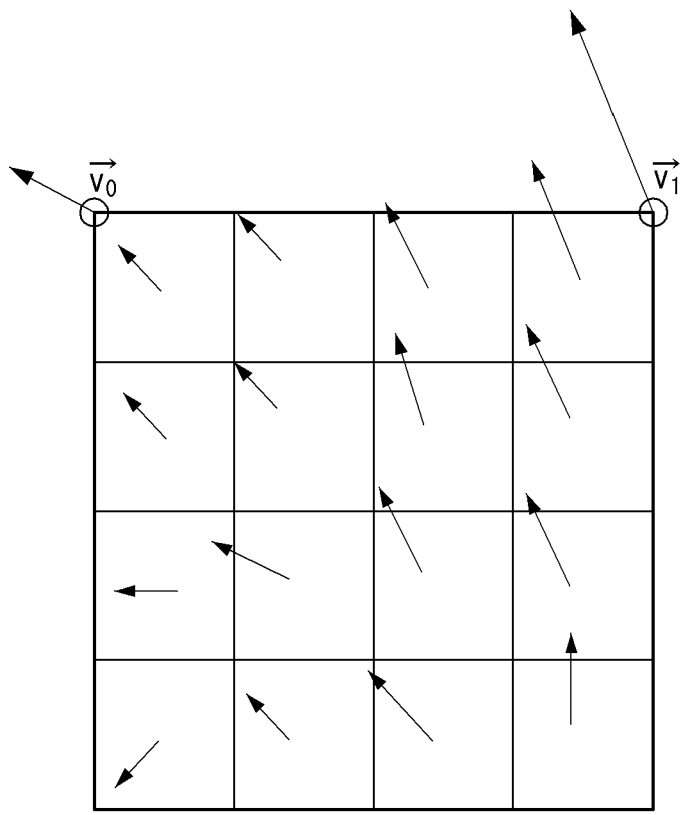

[FIG. 22]
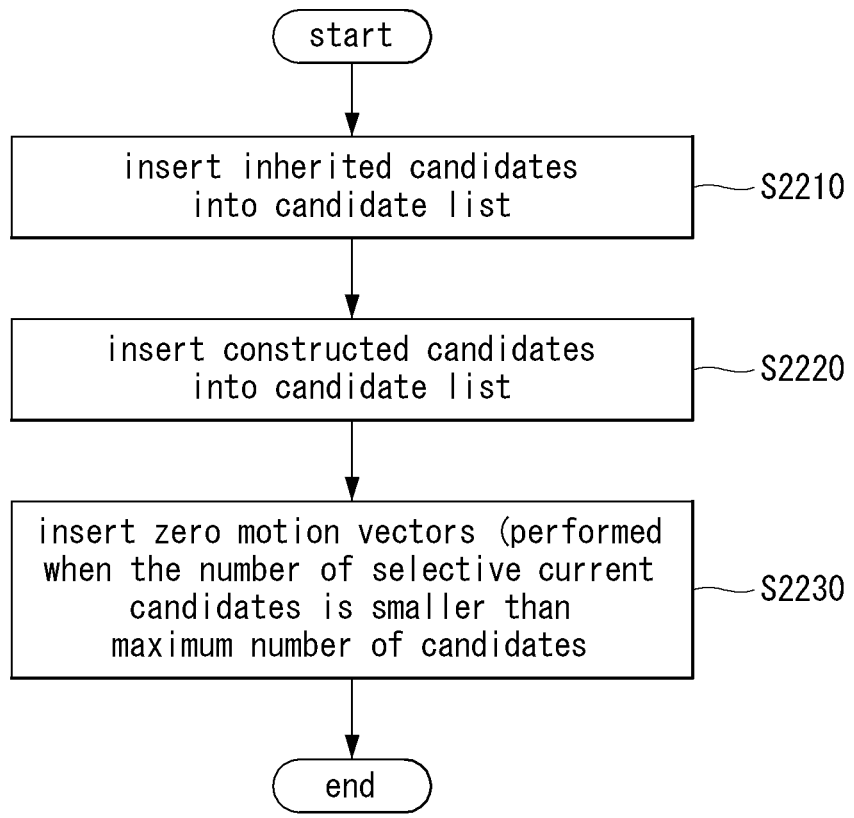
[FIG. 23]
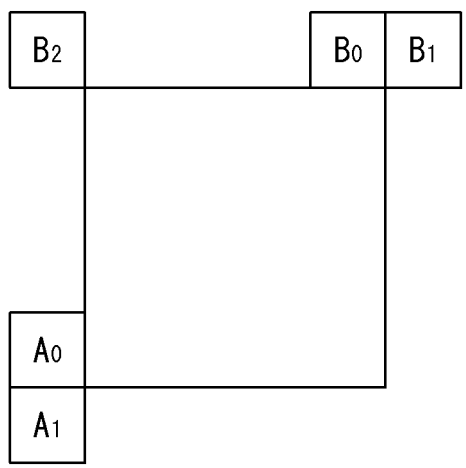

[FIG. 24]
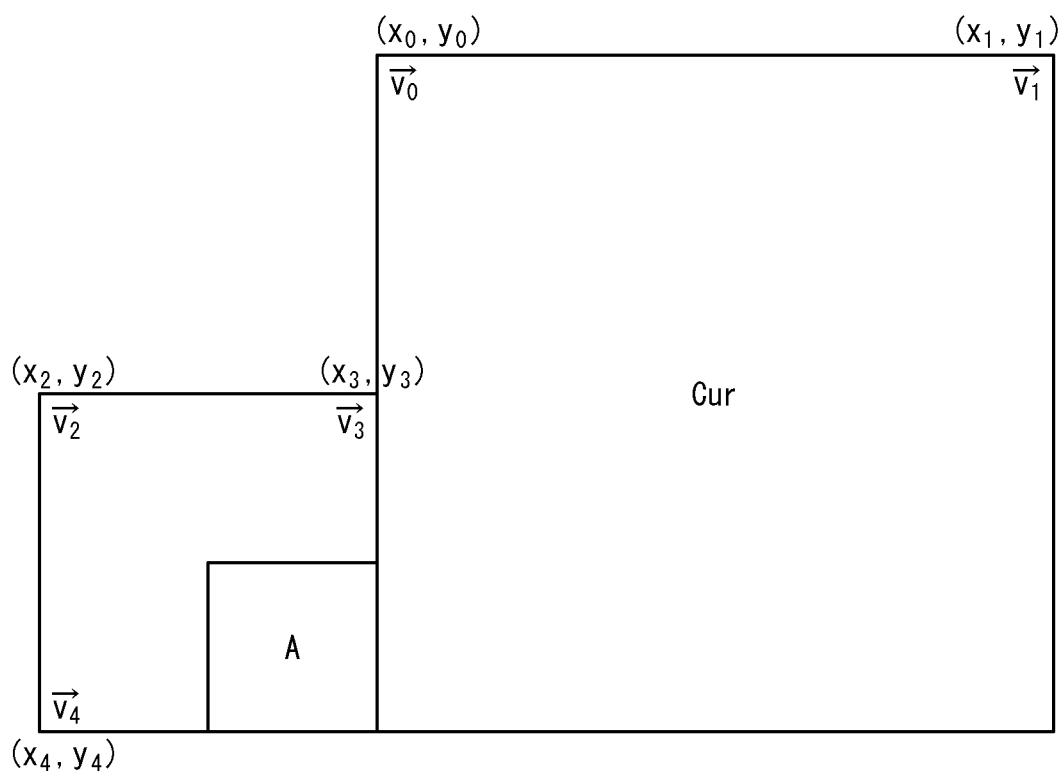
[FIG. 25]
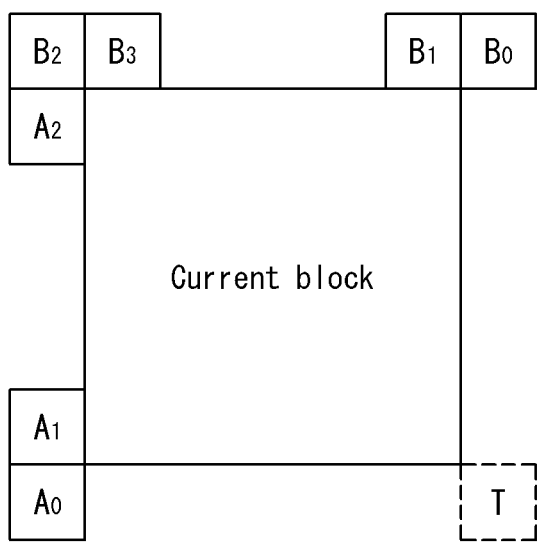

[FIG. 26]
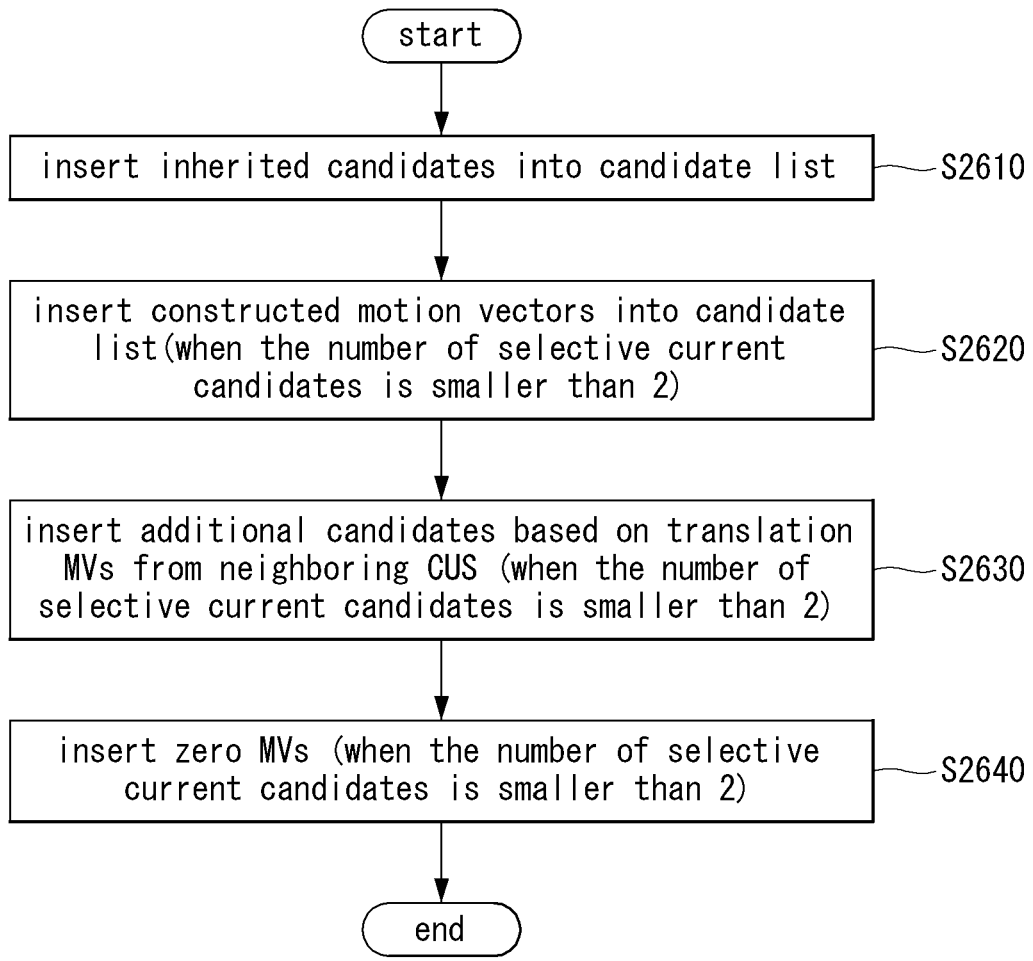
[FIG. 27]
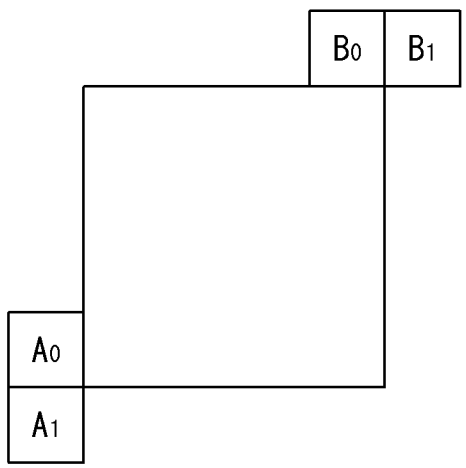

[FIG. 28]
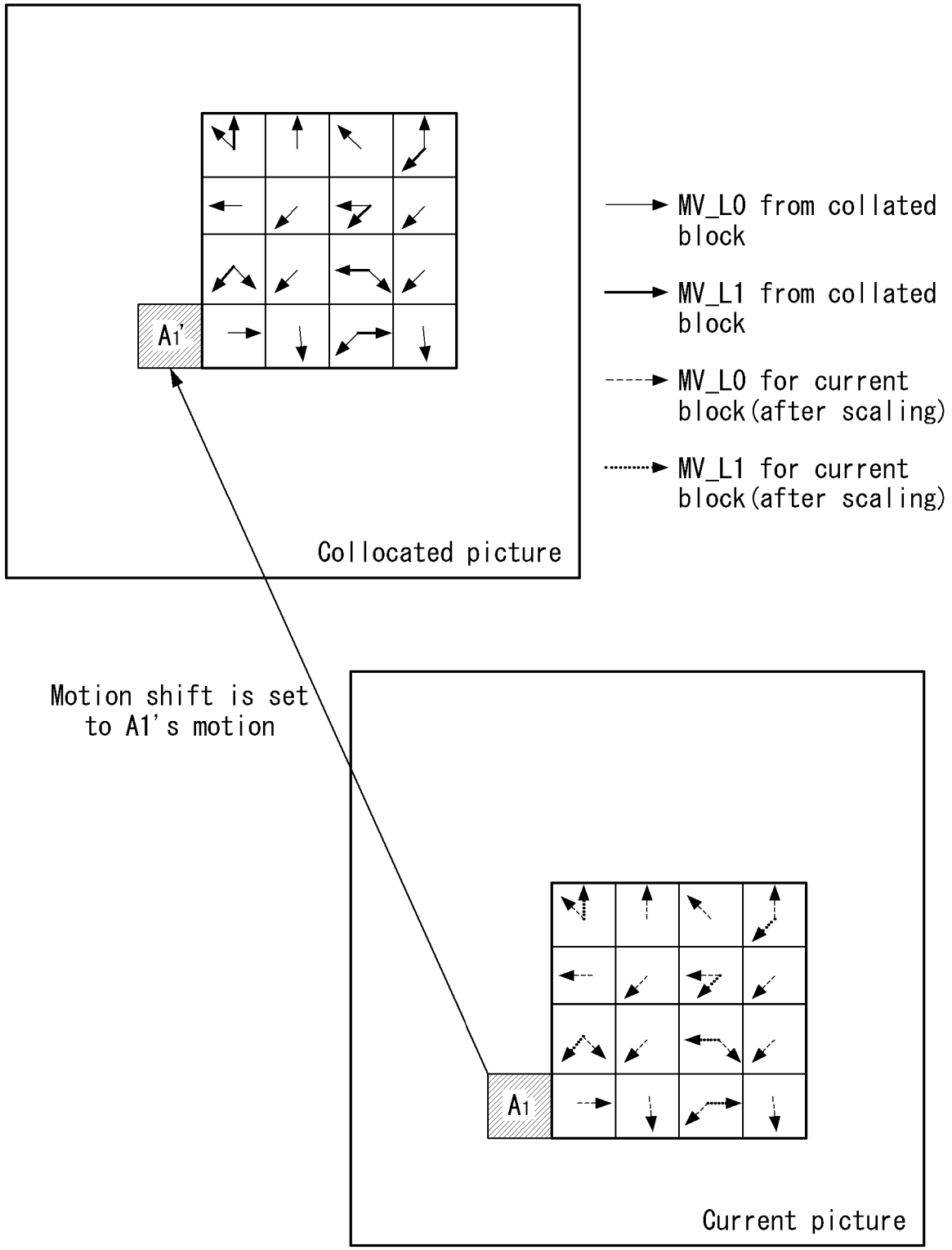

[FIG. 29]
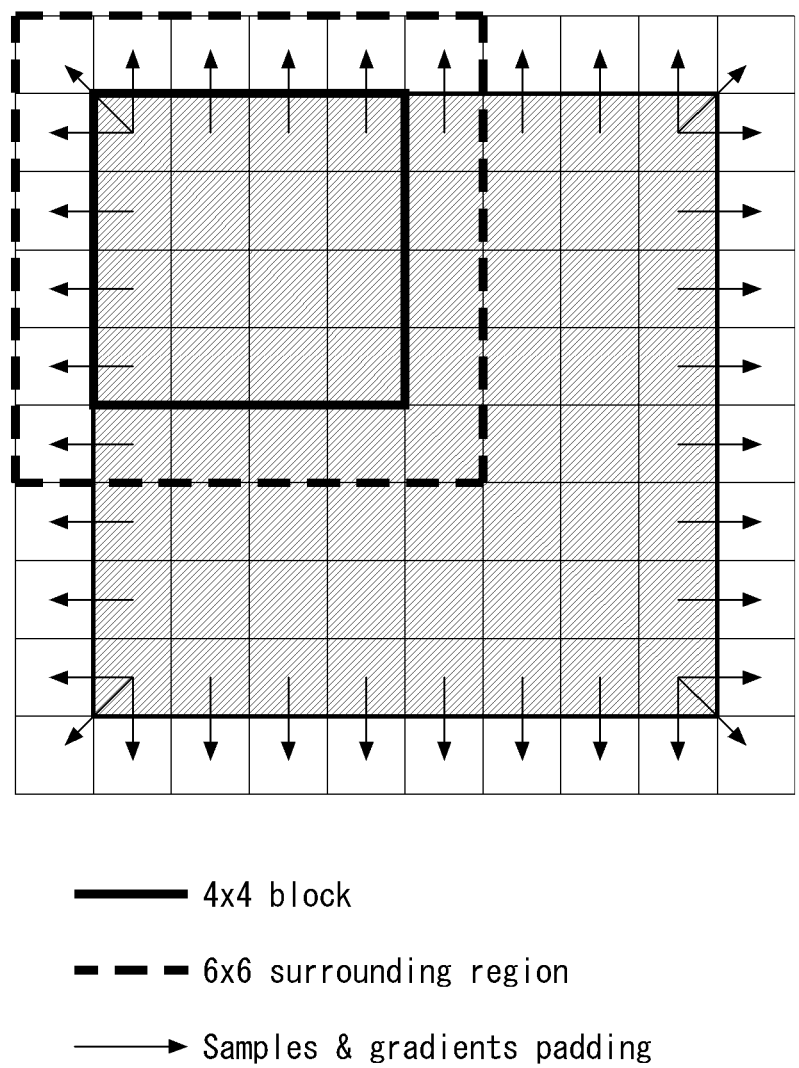

[FIG. 30]
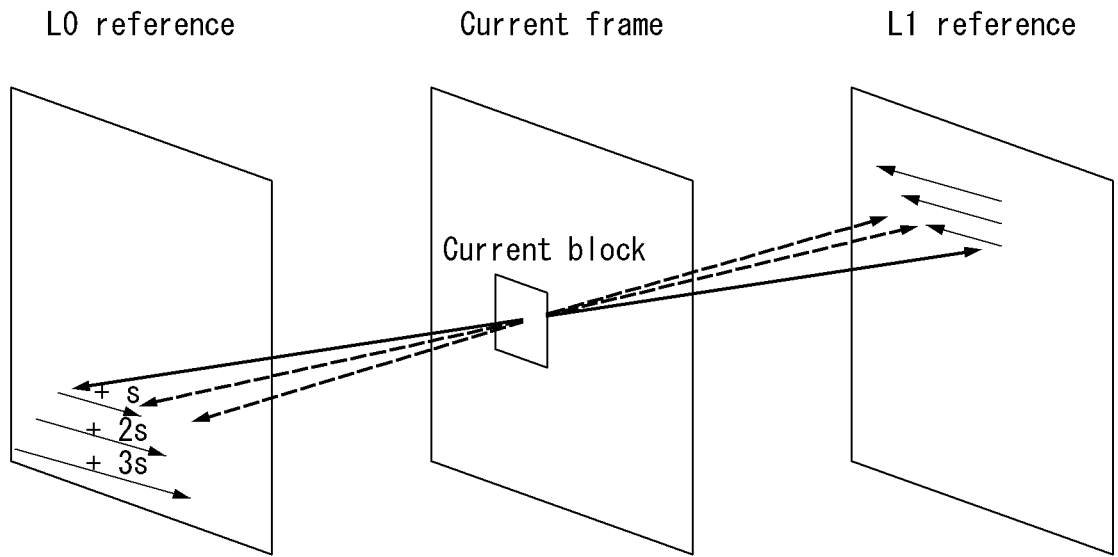
[FIG. 31]
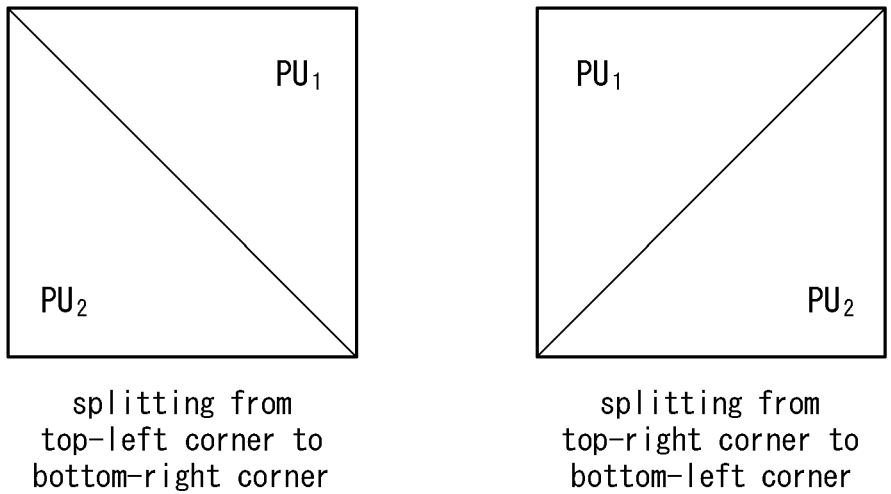
splitting from
top-left corner to
bottom-right corner
splitting from
top-right corner to
bottom-left corner

[FIG. 32]
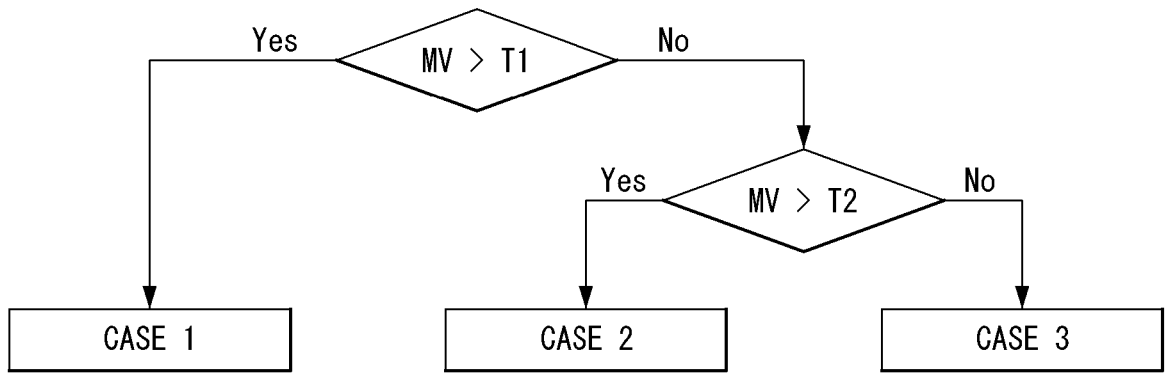
[FIG. 33]
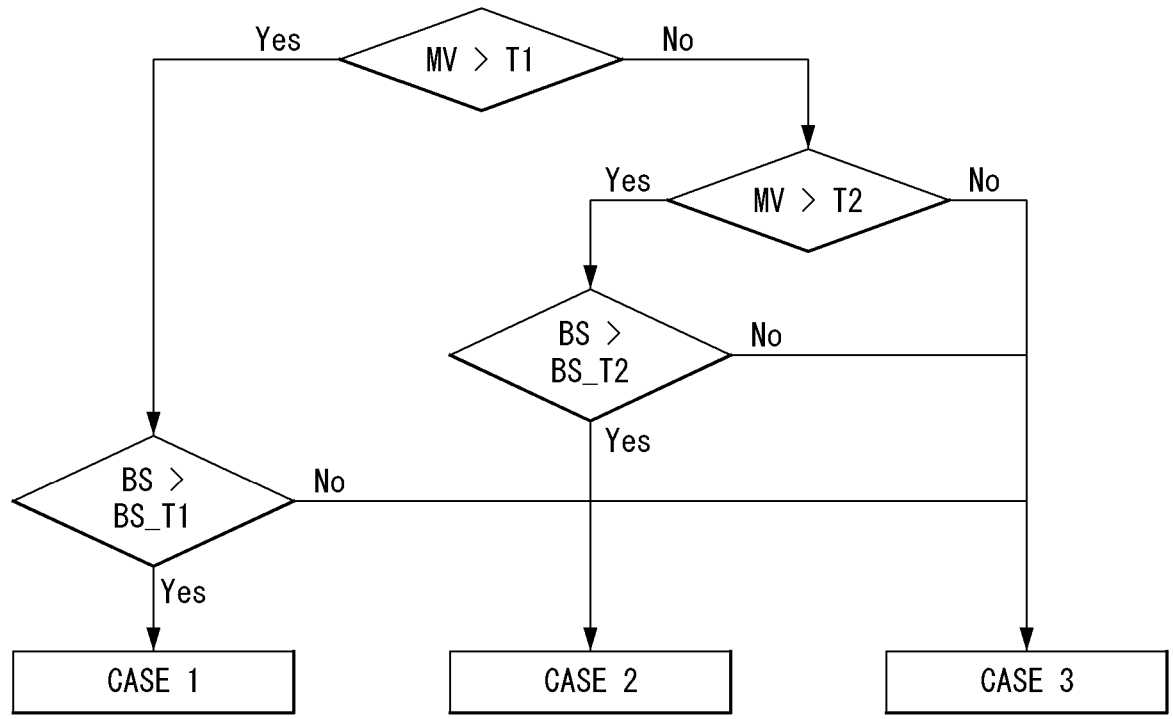

[FIG. 34]
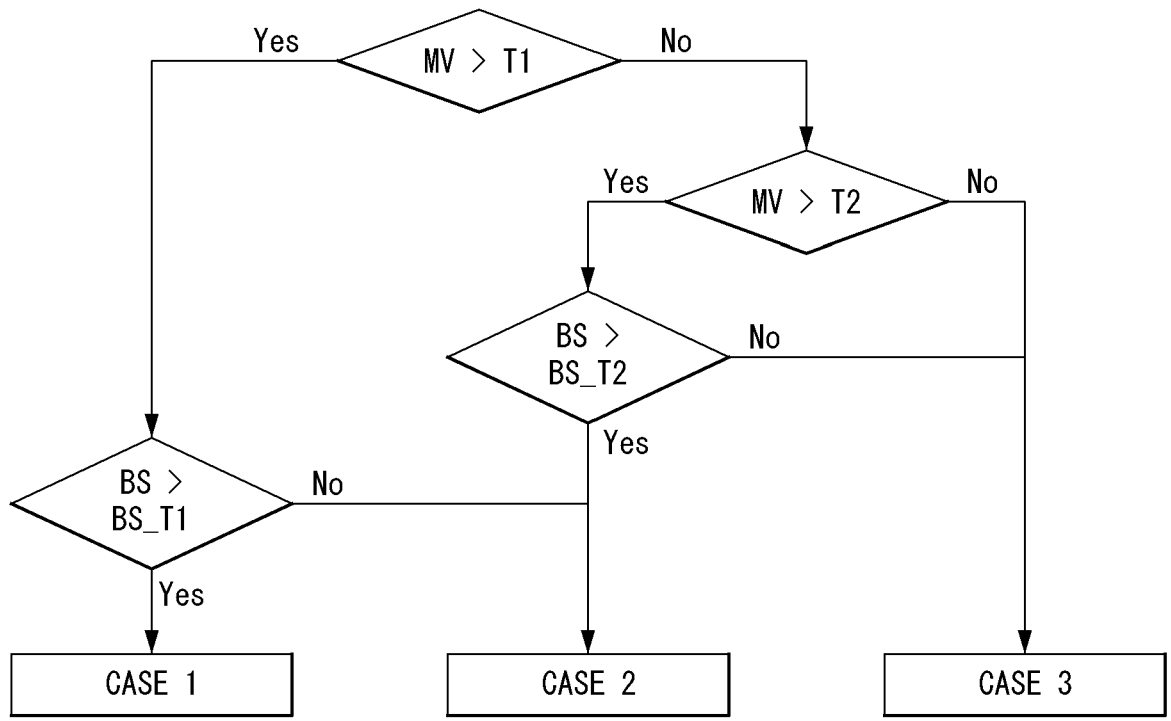

[FIG. 35]
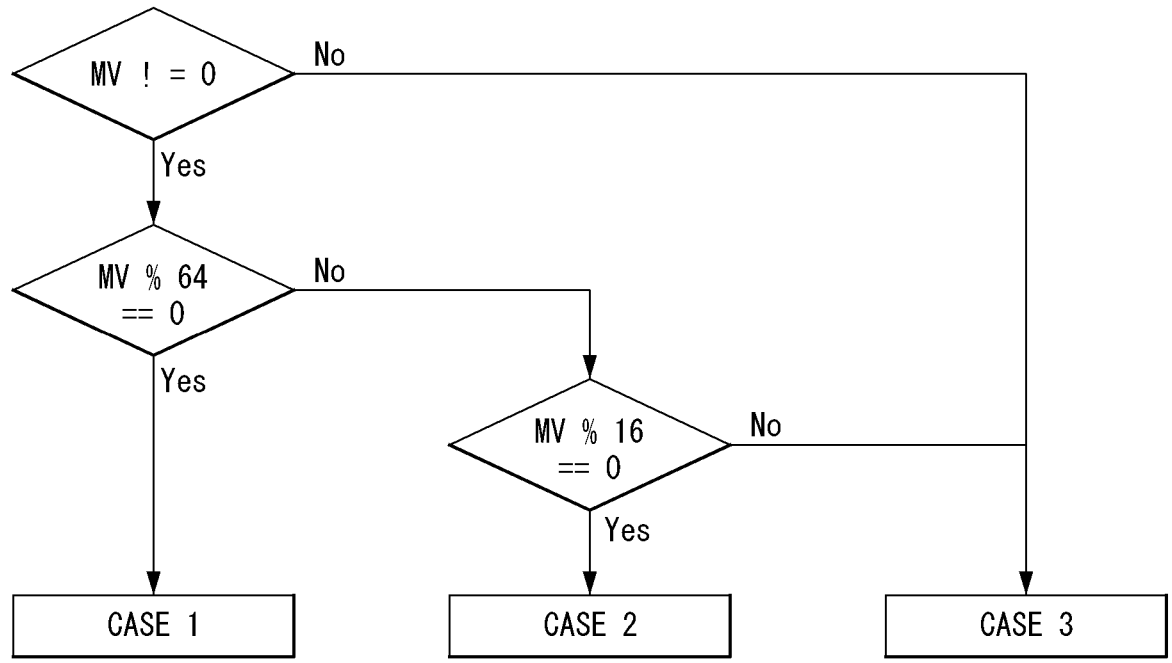
[FIG. 36]
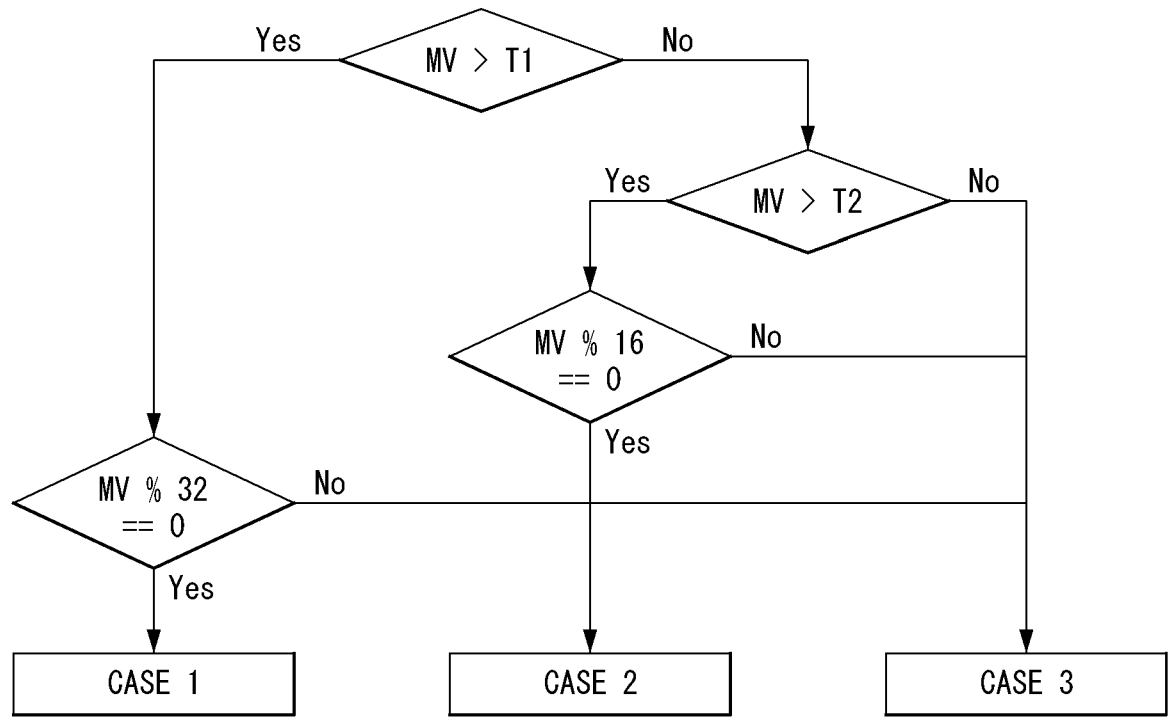

[FIG. 37]
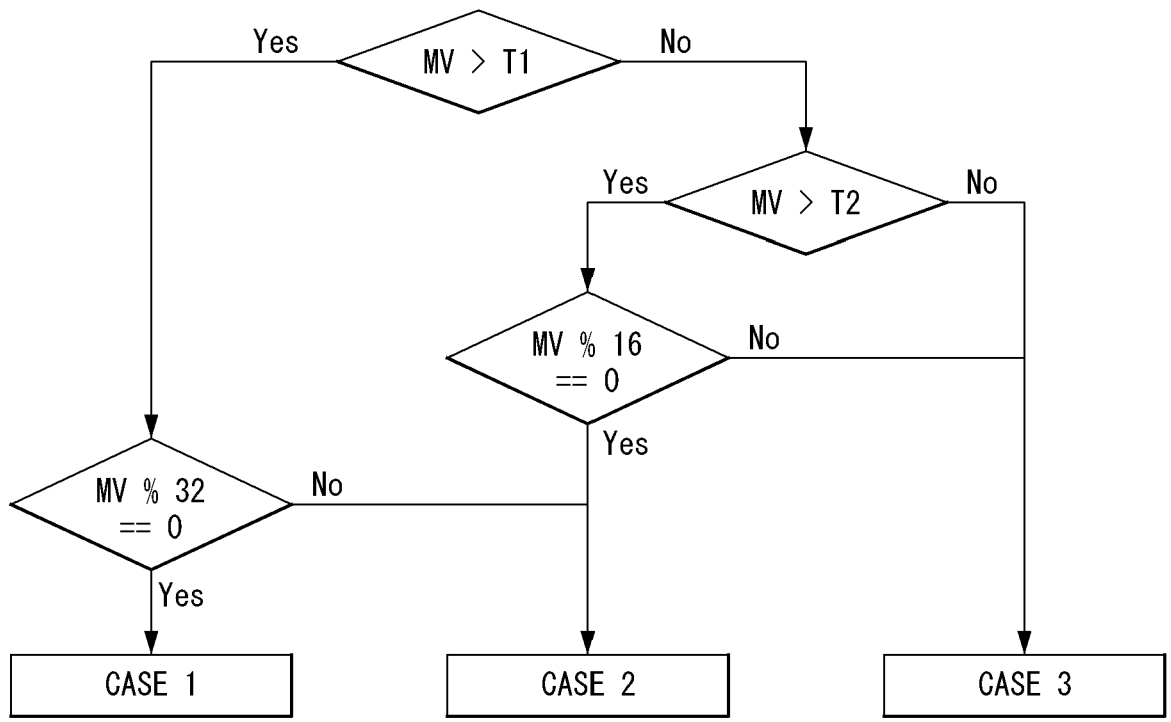
[FIG. 38]
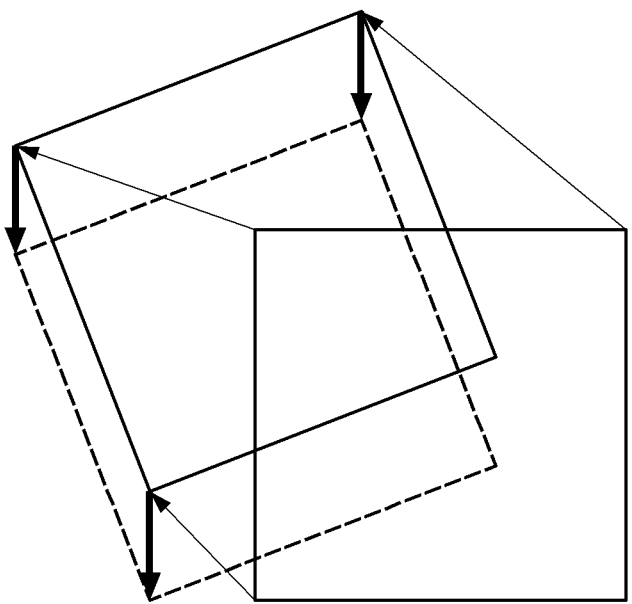

[FIG. 39]
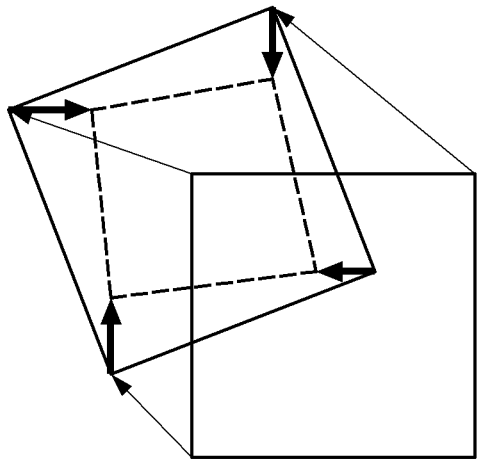
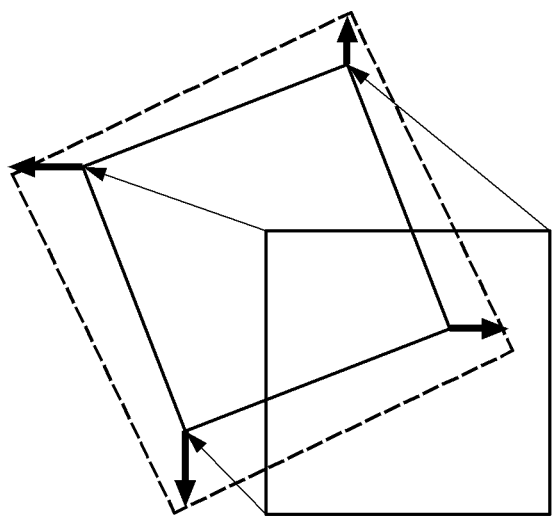
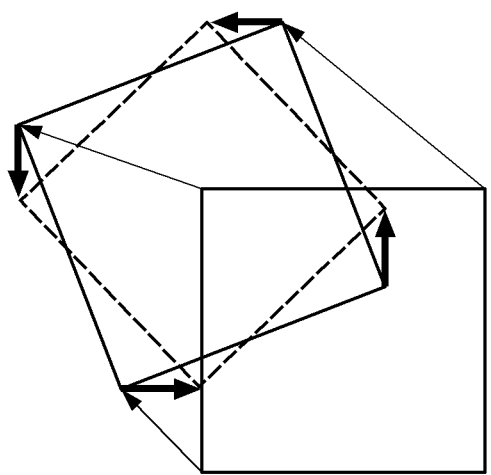
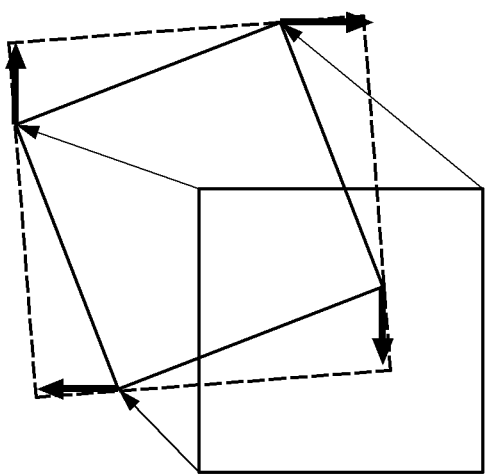

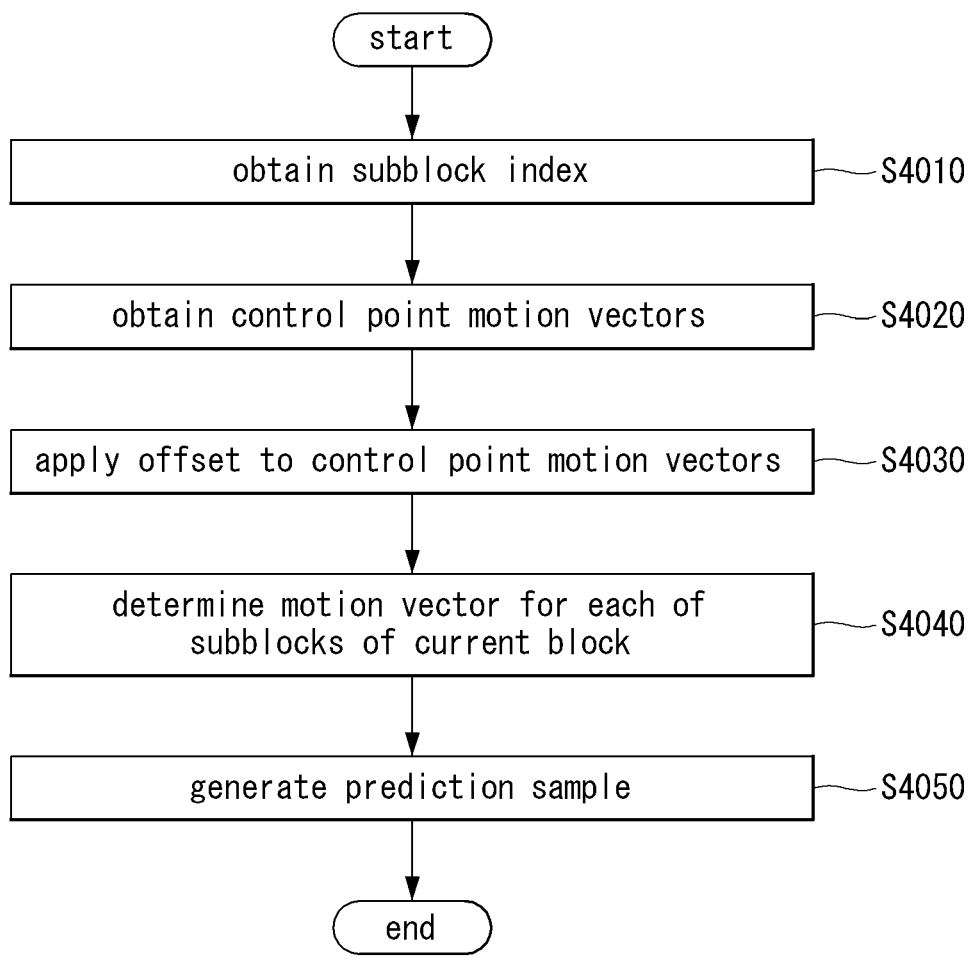
[FIG. 40]

[FIG. 41]
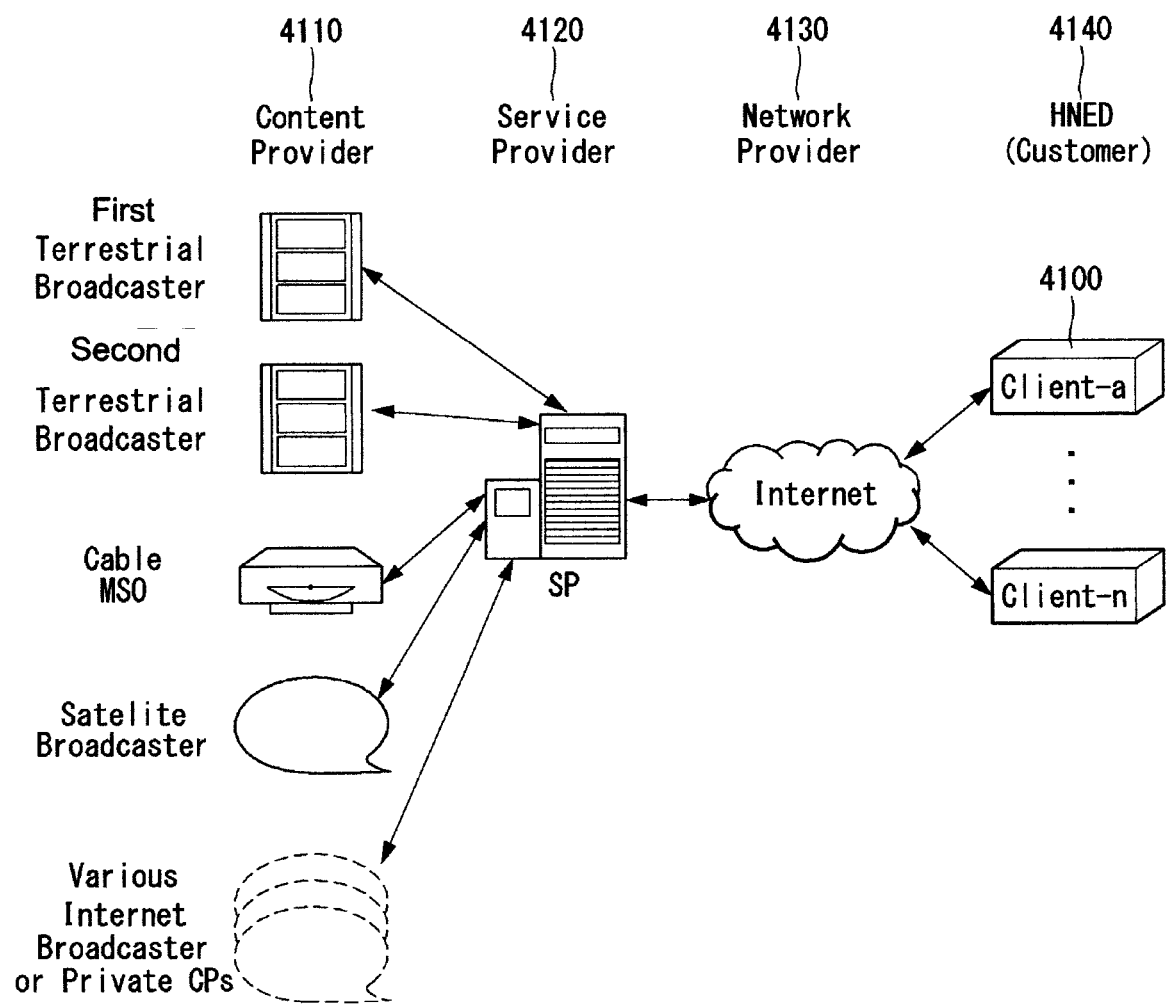

[FIG. 42]
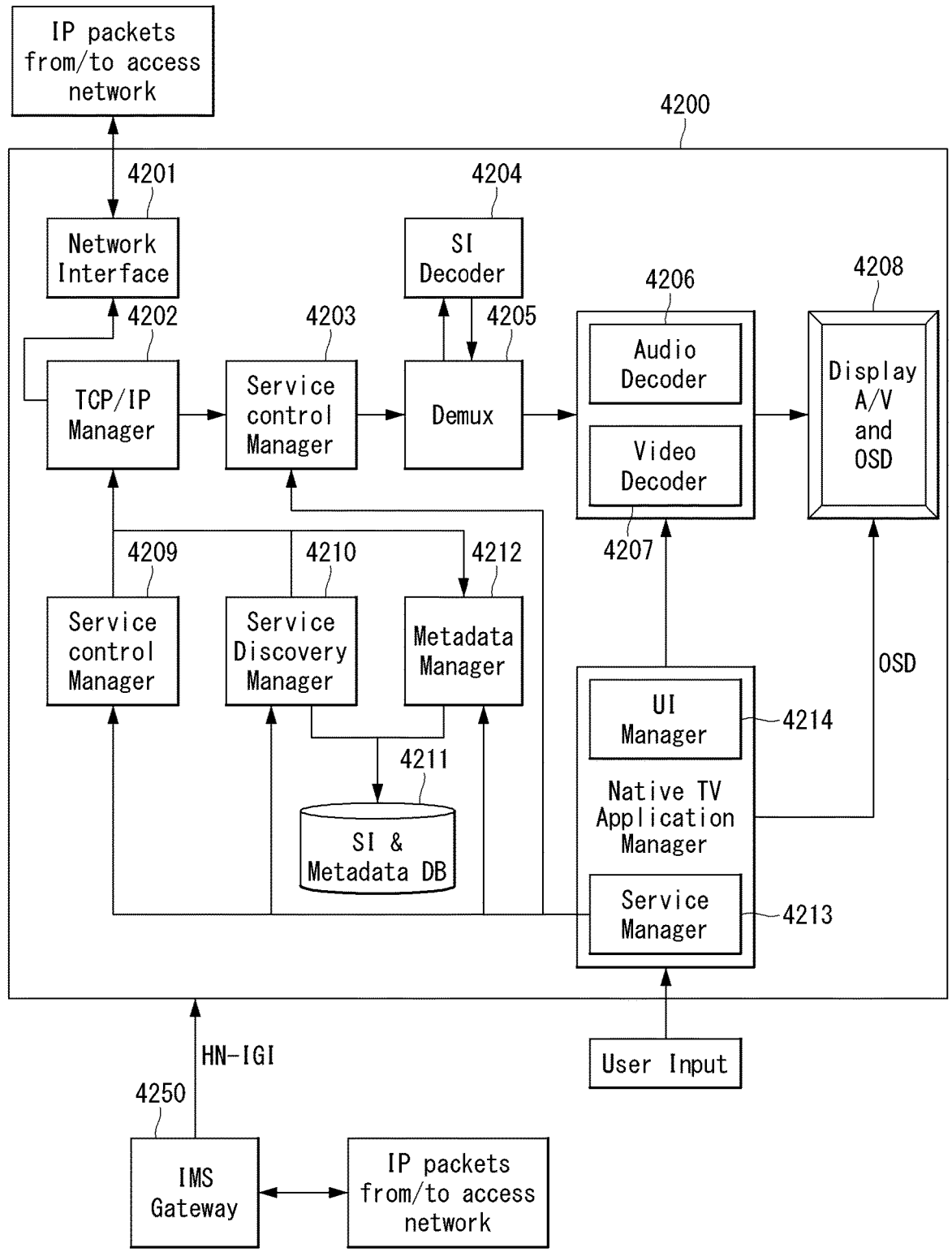

[FIG. 43]
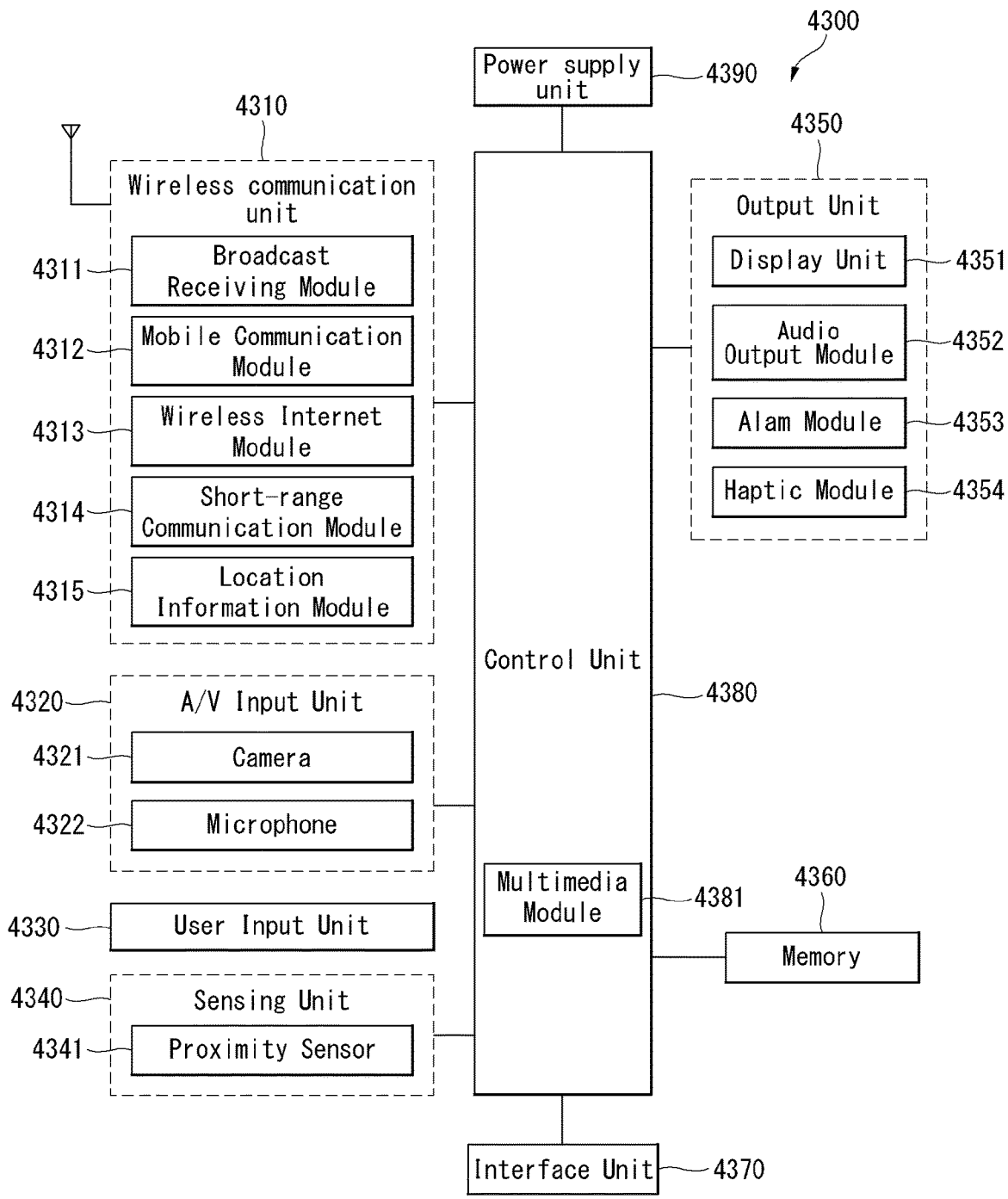

[FIG. 44]
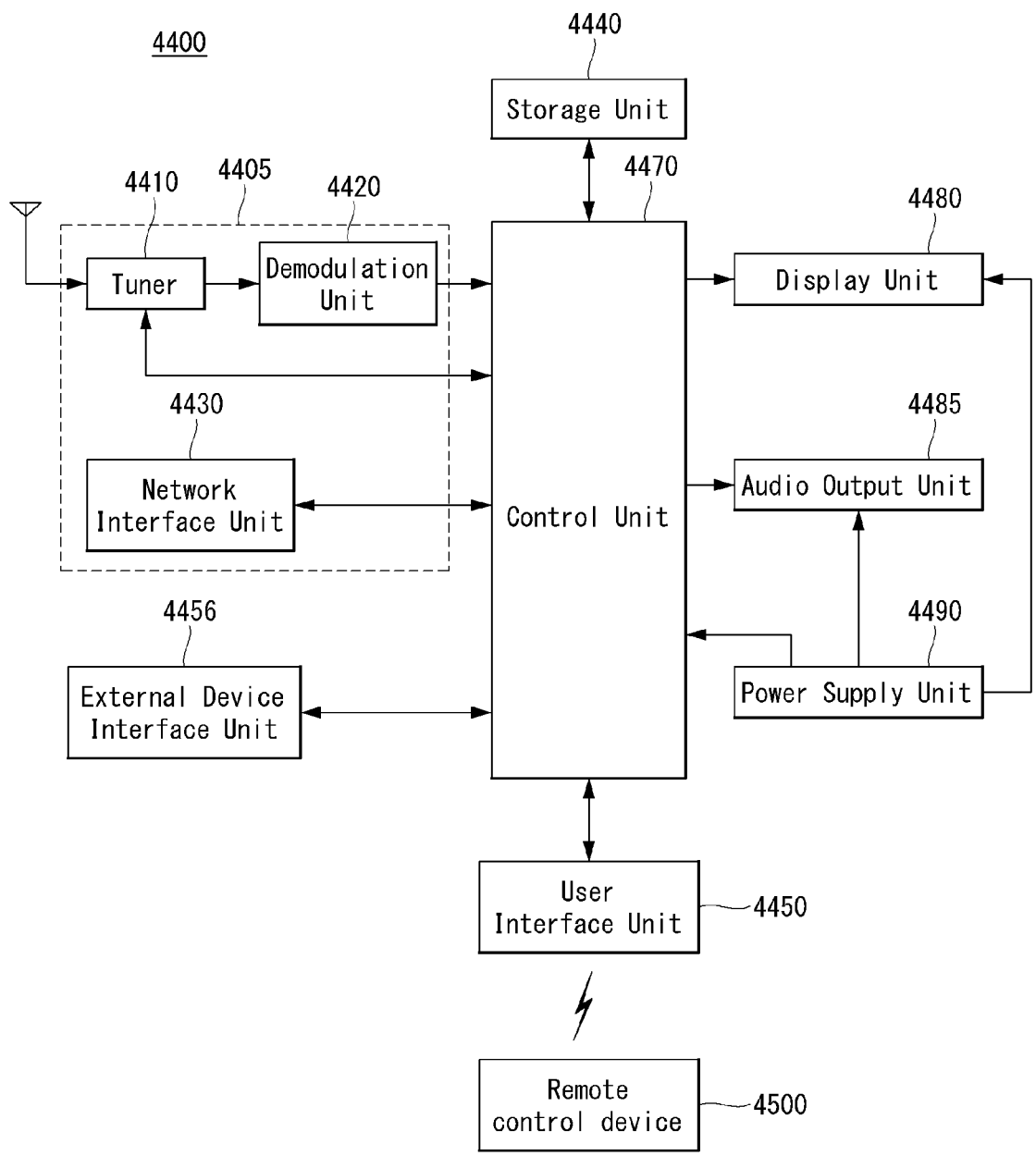

[FIG. 45]
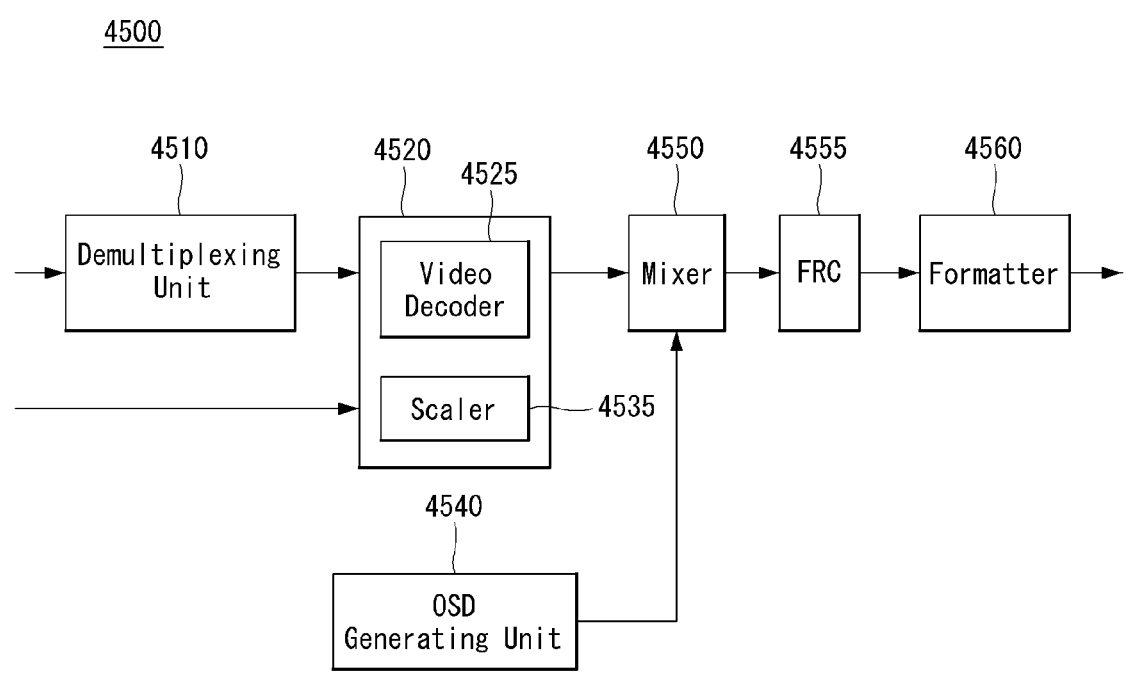

[FIG. 46]
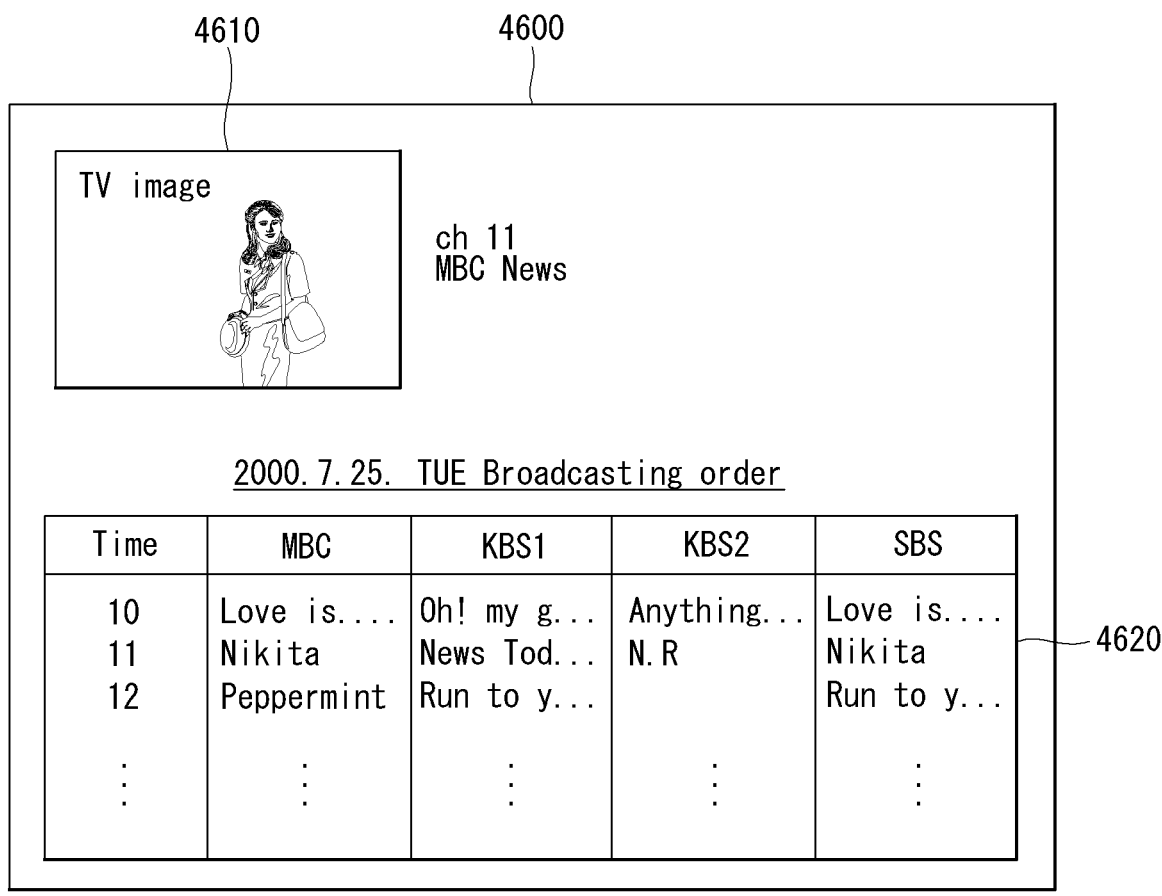

DEVICE AND METHOD FOR PROCESSING VIDEO SIGNAL BY USING INTER PREDICTION

This application is the National Stage filing under 35 U.S.C. 371 of International Application No. PCT/KR2020/000068, filed on Jan. 2, 2020, which claims the benefit of U.S. Provisional Application No. 62/787,749, filed on Jan. 2, 2019, the contents of which are all hereby incorporated by reference herein in their entirety.

TECHNICAL FIELD

The present disclosure relates to a method and device for processing a video signal by using inter prediction, and more particularly to a method and device for performing the inter prediction through the refinement of the motion vector according to an affine merge mode.

BACKGROUND ART

Compression encoding means a series of signal processing techniques for transmitting digitized information through a communication line or techniques for storing information in a form suitable for a storage medium. The medium including a picture, an image, audio, etc. May be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently. Particularly, video codec standards after the high efficiency video coding (HEVC) standard require prediction techniques which may generate prediction samples precisely while using resources efficiently.

DISCLOSURE

Technical Problem

An embodiment of the present disclosure provides a method and device for processing a video signal, capable of improving accuracy of a motion vector in case of applying an affine merge mode.

In addition, an embodiment of the present disclosure provides a method and device for processing a video signal, capable of reducing signaling overhead in the process of applying a merge with motion vector difference (MMVD) technique.

Technical objects to be achieved by the present disclosure are not limited to the aforementioned technical objects, and other technical objects not described above may be evidently understood by a person having ordinary skill in the art to which the present disclosure pertains from the following description.

Technical Solution

An embodiment of the present disclosure provides a method and device for processing a video signal using inter prediction. A video signal processing method according to an embodiment of the present disclosure includes: obtaining a merge subblock index for a current block for which a parameter for subblock-based inter prediction is derived from at least one neighboring block, wherein the merge subblock index is related to one candidate in a subblock-based merge candidate list; obtaining a plurality of control point motion vectors for a plurality of control points of the current block based on the merge subblock index; applying at least one offset to the plurality of control point motion vectors based on a merge with motion vector difference (MMVD) direction index for refinement of the plurality of control point motion vectors; determining a motion vector for each of subblocks of the current block based on a plurality of control point motion vectors to which the at least one offset is applied and a position of each of the subblocks within the current block; and generating a prediction sample of the current block based on the motion vector for each of the subblocks and a reference picture related to the merge subblock index.

In an embodiment, the applying of at least one offset to the plurality of control point motion vectors may include: adding a first offset value to at least one of a horizontal component or a vertical component of a first control point motion vector based on the MMVD direction index; and adding a second offset value to at least one of a horizontal component or a vertical component of a second control point motion vector based on the MMVD direction index, when the number of the control point motion vectors is 2, wherein the applying of at least one offset to the plurality of control point motion vectors further includes: when the number of the control point motion vectors is 3, adding the second offset value to at least one of the horizontal component or the vertical component of the second control point motion vector based on the MMVD direction index, and adding a third offset value to at least one of a horizontal component or a vertical component of a third control point motion vector based on the MMVD direction index.

In an embodiment, the applying of at least one offset to the plurality of control point motion vectors may include: adding an offset value to at least one of components of the plurality of control point motion vectors, wherein the offset value is determined based on an MMVD distance index related to a magnitude of the at least one offset.

In an embodiment, the MMVD distance index may indicate one of a plurality of predefined candidate offset values.

In an embodiment, the adding of an offset value to at least one of components of the plurality of control point motion vectors may include: scaling an offset value corresponding to the MMVD distance index; and adding the scaled offset value to at least one of the components of the plurality of control point motion vectors.

In an embodiment, the scaling of an offset value may include: scaling the offset value based on a size of the current block or a magnitude of at least one of the control point motion vectors.

In an embodiment, the scaling of an offset value may include: scaling the offset value based on pixel-wise resolution for at least one of the control point motion vectors.

A video signal processing device according to another embodiment of the present disclosure includes a memory configured to store the video signal; and a processor coupled to the memory, wherein the processor is configured to obtain a merge subblock index for a current block for which a parameter for subblock-based inter prediction is derived from at least one neighboring block, wherein the merge subblock index is related to one candidate in a subblock-based merge candidate list, obtain a plurality of control point motion vectors for a plurality of control points of the current block based on the merge subblock index, apply at least one offset to the plurality of control point motion vectors based on a merge with motion vector difference (MMVD) direction index for refinement of the plurality of control point motion vectors, determine a motion vector for each of subblocks of the current block based on a plurality of control point motion vectors to which the at least one offset is applied and a position of each of the subblocks within the current block, and generate a prediction sample of the current block based on the motion vector for each of the subblocks and a reference picture related to the merge subblock index.

Another embodiment of the present disclosure provides a non-transitory computer-readable medium for storing a computer-executable component configured to be executed in one or more processors of a computing device. The non-transitory computer-executable component is configured to obtain a merge subblock index for a current block for which a parameter for subblock-based inter prediction is derived from at least one neighboring block, wherein the merge subblock index is related to one candidate in a subblock-based merge candidate list, obtain a plurality of control point motion vectors for a plurality of control points of the current block based on the merge subblock index, apply at least one offset to the plurality of control point motion vectors based on a merge with motion vector difference (MMVD) direction index for refinement of the plurality of control point motion vectors, determine a motion vector for each of subblocks of the current block based on a plurality of control point motion vectors to which the at least one offset is applied and a position of each of the subblocks within the current block, and generate a prediction sample of the current block based on the motion vector for each of the subblocks and a reference picture related to the merge subblock index.

Advantageous Effects

According to an embodiment of the present disclosure, accuracy of a motion vector may be improved by performing prediction using merge with motion vector difference (MMVD) in an affine merge mode.

In addition, according to an embodiment of the present disclosure, the video signal processing method and device capable of reducing signaling overhead by limiting the number of candidate MMVD offsets applicable based on the motion vector and reducing a bit length of an MMVD length index in the process of applying the MMVD technique in the affine merge mode are provided.

The effects obtainable in the present disclosure are not limited to the above-mentioned effects, and other effects not mentioned will be clearly understood by those skilled in the art to which the present disclosure pertains from the following description.

DESCRIPTION OF DRAWINGS

The accompany drawings, which are included as part of the detailed description in order to help understanding of the disclosure, provide embodiments of the disclosure and describe the technical characteristics of the disclosure along with the detailed description.

FIG. 1 illustrates an example of a video coding system according to an embodiment of the disclosure.

FIG. 2 is an embodiment to which the disclosure is applied, and is a schematic block diagram of an encoding apparatus for encoding a video/image signal.

FIG. 3 is an embodiment to which the disclosure is applied, and is a schematic block diagram of a decoding apparatus for decoding a video/image signal.

FIG. 4 shows an example of a structural diagram of a content streaming system according to an embodiment of the disclosure.

FIG. 5 shows an example of a block diagram of an apparatus for processing a video signal according to an embodiment of the disclosure.

FIG. 6 shows an example of a picture divided into coding tree units (CTUs) according to an embodiment of the present disclosure.

FIG. 7 shows an example of multi-type tree splitting modes according to an embodiment of the present disclosure.

FIG. 8 shows an example of a signaling mechanism for partitioning information in a quadtree with nested multi-type tree structure according to an embodiment of the present disclosure.

FIG. 9 exemplarily shows that a CTU is partitioned into multiple CUs based on a quadtree and nested multi-type tree structure according to an embodiment of the present disclosure according to an embodiment of the present disclosure FIG. 10 shows an example in which ternary tree (TT) partitioning is limited for a 128×128 coding block according to an embodiment of the present disclosure.

FIG. 11 shows an example of redundant partitioning patterns that may occur in binary tree partitioning and ternary tree partitioning according to an embodiment of the present disclosure.

FIGS. 12 and 13 show a video/image encoding procedure based on inter prediction and an inter predictor in an encoding apparatus according to an embodiment of the present disclosure.

FIGS. 14 and 15 show a video/image decoding procedure based on inter prediction and an inter predictor in a decoding apparatus according to an embodiment of the present disclosure.

FIG. 16 shows an example of spatial merge candidate configuration for a current block according to an embodiment of the present disclosure.

FIG. 17 shows an example of a flowchart for constructing a merge candidate list according to an embodiment of the present disclosure.

FIG. 18 shows an example of a flowchart for constructing a prediction candidate list (MVP candidate list).

FIG. 19 shows an example of affine motion models according to an embodiment of the present disclosure.

FIGS. 20A and 20B show examples of motion vectors at respective control points according to an embodiment of the present disclosure.

FIG. 21 shows an example of motion vectors for each subblock according to an embodiment of the present disclosure.

FIG. 22 shows an example of a flowchart for constructing an affine merge candidate list according to an embodiment of the present disclosure.

FIGS. 23 and 24 show examples of neighboring blocks for constructing an inherited candidate of an affine motion vector and a case in which control point motion vectors of a current block are inherited from neighboring blocks according to an embodiment of the present disclosure.

FIG. 25 shows an example of candidate locations for a constructed affine merge mode according to an embodiment of the present disclosure.

FIG. 26 shows an example of a flowchart for constructing an affine motion vector predictor (MVP) candidate list according to an embodiment of the present disclosure.

FIGS. 27 and 28 show examples of spatial neighboring blocks for subblock-based temporal motion vector prediction (SbTMVP) and a method of applying a motion shift from a neighboring block according to an embodiment of the present disclosure.

FIG. 29 shows an example of an extended coding unit (CU) used in bi-directional optical flow (BDOF) according to an embodiment of the present disclosure.

FIG. 30 shows an example of an MMVD search process according to an embodiment of the present disclosure.

FIG. 31 shows an example of triangular prediction units according to an embodiment of the present disclosure.

FIG. 32 shows an example of a flowchart for determining an MMVD candidate set based on a magnitude of a motion vector according to an embodiment of the present disclosure.

FIGS. 33 and 34 show examples of a flowchart for determining an MMVD candidate set based on a magnitude and a block size of a motion vector according to an embodiment of the present disclosure.

FIG. 35 shows an example of a flowchart for determining an MMVD candidate set based on resolution of a motion vector according to an embodiment of the present disclosure.

FIGS. 36 and 37 show examples of a flowchart for determining an MMVD candidate set based on a magnitude and resolution of a motion vector according to an embodiment of the present disclosure.

FIGS. 38 and 39 show examples of applying an offset to each control point in an affine merge mode according to an embodiment of the present disclosure.

FIG. 40 shows an example of a flowchart for processing a video signal according to an embodiment of the present disclosure.

FIG. 41 is a diagram schematically illustrating an example of a service system including a digital device.

FIG. 42 is a block diagram illustrating an embodiment of a digital device.

FIG. 43 is a block diagram showing another embodiment of a digital device.

FIG. 44 is a block diagram illustrating another embodiment of a digital device.

FIG. 45 is a block diagram illustrating a detailed configuration of a controller of FIGS. 42 to 44 according to an embodiment.

FIG. 46 is a diagram illustrating an example in which a screen of a digital device simultaneously displays a main image and a sub image according to an embodiment.

MODE FOR DISCLOSURE

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art.

In some cases, in order to prevent the technical concept of the disclosure from being unclear, structures or devices which are publicly known may be omitted, or may be depicted as a block diagram centering on the core functions of the structures or the devices.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a slice, a tile, a frame, a block, etc may be properly replaced and interpreted in each coding process.

Hereinafter, in this specification, a "processing unit" means a unit in which an encoding/decoding processing process, such as prediction, a transform and/or quantization, is performed. A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), a coding block (CB), a prediction block (PB) or a transform block (TB) for a luma component. Alternatively, a processing unit may correspond to a coding tree block (CTB), a coding block (CB), a prediction block (PB) or a transform block (TB) for a chroma component. Furthermore, the disclosure is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, a coefficient (a transform coefficient or a transform coefficient after a first order transformation) etc. Are generally called a sample. Furthermore, to use a sample may mean to use a pixel value, a picture element value, a transform coefficient or the like.

General of Video Coding System

FIG. 1 illustrates an example of a video coding system according to an embodiment of the disclosure.

The video coding system may include a source device 10 and a receive device 20. The source device 10 may transmit encoded video/image information or data to the receive device 20 in a file or streaming format through a storage medium or a network.

The source device 10 may include a video source 11, an encoding apparatus 12, and an transmitter 13. The receive device 20 may include a receiver 21, a decoding apparatus 22 and a renderer 23. The source device may be referred to as a video/image encoding apparatus and the receive device may be referred to as a video/image decoding apparatus. The transmitter 13 may be included in the encoding apparatus 12. The receiver 21 may be included in the decoding apparatus 22. The renderer may include a display and the display may be configured as a separate device or an external component.

The video source may acquire video/image data through a capture, synthesis, or generation process of video/image. The video source may include a video/image capturing device and/or a video/image generating device. The video/image capturing device may include, for example, one or more cameras, a video/image archive including previously captured video/images, and the like. The video/image generating device may include, for example, a computer, a tablet, and a smartphone, and may electronically generate video/image data. For example, virtual video/image data may be generated through a computer or the like, and in this case, a video/image capturing process may be replaced by a process of generating related data.

The encoding apparatus 12 may encode an input video/image. The encoding apparatus 12 may perform a series of procedures such as prediction, transform, and quantization for compression and coding efficiency. The encoded data (encoded video/video information) may be output in a form of a bitstream.

The transmitter 13 may transmit the encoded video/video information or data output in the form of a bitstream to the receiver of the receive device through a digital storage medium or a network in a file or streaming format. The digital storage media may include various storage media such as universal serial bus USB, secure digital SD, compact disk CD, digital video disk DVD, bluray, hard disk drive HDD, and solid state drive SSD. The transmitter 13 may include an element for generating a media file through a predetermined file format, and may include an element for transmission through a broadcast/communication network. The receiver 21 may extract the bitstream and transmit it to the decoding apparatus 22.

The decoding apparatus 22 may decode video/image data by performing a series of procedures such as dequantization, inverse transform, and prediction corresponding to the operations of the encoding apparatus 12.

The renderer 23 may render the decoded video/image. The rendered video/image may be displayed through the display.

Encoding Apparatus

FIG. 2 is an embodiment to which the disclosure is applied, and is a schematic block diagram of an encoding apparatus for encoding a video/image signal.

Referring to FIG. 2, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may be configured with a hardware component (for example a memory or a digital storage medium) in an embodiment, and may include a decoded picture buffer (DPB).

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion information prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 may improve subjective/objective picture quality by applying filtering to a reconstructed signal. For example, the filter 160 may generate a modified reconstructed picture by applying various filtering methods to the reconstructed picture. The modified reconstructed picture may be stored in the DPB 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the DPB 170 may be used as a reference picture in the inter predictor 180. The encoding apparatus may avoid a prediction mismatch in the encoding apparatus 100 and a decoding apparatus and improve encoding efficiency if inter prediction is applied.

The DPB 170 may store a modified reconstructed picture in order to use the modified reconstructed picture as a reference picture in the inter predictor 180.

Decoding Apparatus

FIG. 3 is an embodiment to which the disclosure is applied, and is a schematic block diagram of a decoding apparatus for decoding a video/image signal.

Referring to FIG. 3, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 170 may be configured with a hardware component (for example a memory or a digital storage medium) in an embodiment, and may include a decoded picture buffer (DPB).

When a bitstream including video/image information is input, the decoding apparatus 200 may reconstruct an image in accordance with a process of processing video/image information in the encoding apparatus of FIG. 2. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes.

Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 may improve subjective/objective picture quality by applying filtering to a reconstructed signal. For example, the filter 240 may generate a modified reconstructed picture by applying various filtering methods to a reconstructed picture, and may transmit the modified reconstructed picture to the DPB 250. The various filtering methods may include deblocking filtering, a sample adaptive offset SAO, an adaptive loop filter ALF, and a bilateral filter, for example.

A reconstructed picture transmitted (modified) in the DPB 250 may be used as a reference picture in the inter predictor 260.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

Examples of Implementation and Application

The embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoding apparatus 200 and the encoding apparatus 100 to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blueray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

FIG. 4 shows an example of a structural diagram of a content streaming system according to an embodiment of the disclosure.

The content streaming system to which the disclosure is applied may largely include an encoding server 410, a streaming server 420, a web server 430, a media storage 440, a user device 450, and a multimedia input device 460.

The encoding server 410 may compress the content input from multimedia input devices such as a smartphone, camera, camcorder, etc. Into digital data to generate a bitstream and transmit it to the streaming server 420. As another example, when the multimedia input devices 460 such as the smartphone, camera, and camcorder directly generate a bitstream, the encoding server 410 may be omitted.

The bitstream may be generated by an encoding method or a bitstream generation method to which the disclosure is applied, and the streaming server 420 may temporarily store the bitstream in the process of transmitting or receiving the bitstream.

The streaming server 420 transmits multimedia data to the user device 450 based on a user request through the web server 430, and the web server 430 serves as an intermediary to inform the user of what service is present. When a user requests a desired service through the web server 430, the web server 430 delivers it to the streaming server 420, and the streaming server 420 transmits multimedia data to the user. At this time, the content streaming system may include a separate control server, in which case the control server serves to control commands/responses between devices in the content streaming system.

The streaming server 420 may receive content from the media storage 440 and/or the encoding server 410. For example, the streaming server 420 may receive content in real time from the encoding server 410. In this case, in order to provide a smooth streaming service, the streaming server 420 may store the bitstream for a predetermined time.

For example, the user device 450 may include a mobile phone, a smart phone, a laptop computer, a terminal for digital broadcasting, a personal digital assistant PDA, a portable multimedia player PMP, a navigation terminal, a slate PC, a tablet PC, an ultrabook, a wearable device (for example, a smart watch, a smart glass, a head mounted display HMD, a digital TV, a desktop computer, and digital signage.

Each server in the content streaming system may operate as a distributed server, and in this case, data received from each server may be processed in a distributed manner.

FIG. 5 shows an example of a block diagram of an apparatus for processing a video signal according to an embodiment of the disclosure. The video signal processing apparatus may correspond to the encoding apparatus 100 of FIG. 2 or the decoding apparatus 200 of FIG. 3.

The video signal processing apparatus 500 according to the embodiment of the disclosure may include a memory 520 for storing a video signal, and a processor 510 for processing the video signal while being combined with the memory 520.

The processor 510 according to an embodiment of the disclosure may be configured with at least one processing circuit for processing the video signal, and may process the video signal by executing instructions for encoding or decoding the video signal. That is, the processor 510 may encode the original video signal or decode the encoded video signal by executing the encoding or decoding methods described below.

The video/image coding method according to this document may be performed based on various detailed techniques, and each detailed technique will be briefly described as follows. It is obvious to those skilled in the art that the techniques described below may be related to related procedures such as prediction, residual processing (transform, quantization, etc.), syntax element coding, filtering, partitioning/splitting, etc. in the video/image encoding/decoding procedure described above and/or described below.

Block Partitioning

The video/image coding method according to the present disclosure may be performed based on the following partitioning structure. In detail, procedures such as prediction, residual processing ((inverse) transform, dequantization, etc.), syntax element coding, and filtering, which will be described later, may be performed based on a CTU, CU (and/or TU, PU) derived based on the partitioning structure. The block partitioning procedure may be performed by the image divider 110 of the above-described encoding apparatus, so that partitioning-related information may be (encoded) processed by the entropy encoder 190 and transmitted to the decoding apparatus in a bitstream form. The entropy decoder 210 of the decoding apparatus may derive a block partitioning structure of a current picture based on the partitioning-related information obtained from the bitstream, and may perform a series of procedures for image decoding (e.g., prediction, residual processing, block/picture reconstruction, in-loop filtering, etc.).

Partitioning of Picture into CTUs

Pictures may be divided into a sequence of coding tree units (CTUs). A CTU may correspond to a coding tree block (CTB). Alternatively, the CTU may include a coding tree block of luma samples and two coding tree blocks of corresponding chroma samples. In other words, for a picture including a three-sample array, the CTU may include an N×N block of luma samples and two corresponding blocks of chroma samples.

FIG. 6 shows an example of a picture divided into coding tree units (CTUs) according to an embodiment of the present disclosure.

Referring to FIG. 6, one picture may be divided into a plurality of CTUs having a constant size. A maximum allowed size of a CTU for coding and prediction may be different from a maximum allowed size of a CTU for transformation. For example, the maximum allowable size of a luma block in a CTU may be 128×128 (even if the maximum size of luma CTUs is 64×64).

Partitioning of CTU Using Tree Structure

FIG. 7 shows an example of multi-type tree splitting modes according to an embodiment of the present disclosure.

The CTU may be split into CUs based on a quadtree (QT) structure. The quadtree structure may be referred to as a quaternary tree structure. This is to reflect various local characteristics. In the present disclosure, the CTU may be split based on multi-type tree structure splitting including binary tree (BT) and ternary tree (TT) in addition to quadtree. Hereinafter, a QTBT structure may include quadtree and binary-tree based splitting structures and QTBTTT may include quadtree, binary-tree, and ternary-tree based splitting structures. Alternatively, the QTBT structure may include the quadtree, binary-tree, and ternary-tree based partitioning structures. In the coding tree structure, the CU may have a square or rectangular shape. The CTU may be first split into the quadtree structure. Thereafter, leaf nodes of the quadtree structure may be additionally split by a multi-type tree structure. For example, as shown in FIG. 7, the multi-type tree structure may include four partition types schematically.

The four partition types shown in FIG. 7 may include vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). Leaf nodes of the multi-type tree structure may be called CUs. These CUs may be used for prediction and transformation procedures. In this document, in general, CU, PU, and TU may have the same block size. However, when a maximum supported transform length is smaller than a width or height of a color component of the CU, the CU and the TU may have different block sizes.

FIG. 8 shows an example of a signaling mechanism for partitioning information in a quadtree with nested multi-type tree structure according to an embodiment of the present disclosure.

Here, the CTU is treated as a root of the quadtree and first partitioned into the quadtree structure. Thereafter, each quadtree leaf node may be further partitioned into the multi-type tree structure. In the multi-type tree structure, a first flag (e.g., mtt_split_cu_flag) is signaled to indicate whether a corresponding node is additionally partitioned. When the corresponding node is additionally partitioned, a second flag (e.g., mtt_split_cu_vertical_flag) may be signaled to indicate a splitting direction. Thereafter, a third flag (e.g., mtt_split_cu_binary_flag) may be signaled to indicate whether a splitting type is binary splitting or ternary splitting. For example, based on the mtt_split_cu_vertical_flag and the mtt_split_cu_binary_flag, a multi-type tree splitting mode MttSplitMode of the CU may be derived as shown in Table 1 below.

TABLE 1

| | MttSplitMode | |
|---|---|---|
| | mtt_split_cu_vertical_flag | mtt_split_cu_binary_flag |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 9 exemplarily shows that a CTU is partitioned into multiple CUs based on a quadtree and nested multi-type tree structure according to an embodiment of the present disclosure.

Here, bold block edges indicate quadtree partitioning and the remaining edges indicate multi-type tree partitioning. The quadtree partitioning accompanying the multi-type tree may provide a content-adapted coding tree structure. The CU may correspond to a coding block (CB). Alternatively, the CU may include a coding block of the luma samples and two coding blocks of the corresponding chroma samples. The size of the CU may be as large as the CTU or may be as small as 4×4 in units of the luma sample. For example, in the case of a 4:2:0 color format (or chroma format), a maximum chroma CB size may be 64×64 and a minimum chroma CB size may be 2×2.

In the present disclosure, for example, a maximum supported luma TB size may be 64×64 and a maximum supported chroma TB size may be 32×32. When the width or height of the CB split according to the tree structure is larger than a maximum transform width or height, the corresponding CB may be automatically (or implicitly) split until horizontal and vertical TB size limitations are satisfied.

Meanwhile, for a quadtree coding tree scheme accompanying the multi-type tree, the following parameters may be defined and identified as an SPS (sequence parameter set) syntax element.

CTU size: The root node size of a quaternary tree
MinQTSize: The minimum allowed quaternary tree leaf node size
MaxBtSize: The maximum allowed binary tree root node size
MaxTtSize: The maximum allowed ternary tree root node size)
MaxMttDepth: The maximum allowed hierarchy depth of multi-type tree splitting from a quadtree leaf
MinBtSize: The minimum allowed binary tree leaf node size
MinTtSize: The minimum allowed ternary tree leaf node size As an example of a quadtree coding tree structure with a multitype tree, the CTU size may be set to 128×128 luma samples and 64×64 blocks of two corresponding chroma samples (in 4:2:0 chroma format). In this case, MinOTSize is set to 16×16, MaxBtSize may be set to 128×128, MaxTtSzie may be set to 64×64, MinBtSize and MinTtSize (for width and height) may be set to 4×4, and MaxMttDepth may be set to 4. Quadtree partitioning may be applied to the CTU to create quadtree leaf nodes. The quadtree leaf node may be referred to as a leaf QT node. Quadtree leaf nodes may have a size of 128×128 (i.e., CTU size) from 16×16 (i.e., MinOTSize). If the leaf QT node is 128×128, it may not be additionally partitioned into a binary tree/ternary tree. This is because, in this case, even if the leaf QT node is partitioned, it exceeds MaxBtsize and MaxTtszie (that is, 64×64). In other cases, the leaf QT node may be further partitioned into a multi-type tree. Therefore, the leaf QT node is a root node for a multi-type tree, and the leaf QT node may have a multi-type tree depth (mttDepth) of 0. If the multi-type tree depth reaches MaxMttdepth (e.g., 4), additional partitioning may not be considered any more. If a width of the multi-type tree node is equal to MinBtSize and smaller than or equal to 2×MinTtSize, additional horizontal partitioning may not be considered. If a height of the multi-type tree node is equal to MinBtSize and smaller than or equal to 2×MinTtSize, additional vertical partitioning may not be considered any more.

In order to allow 64×64 luma block and 32×32 chroma pipeline design in a hardware decoder, ternary tree (TT) partitioning may be forbidden in certain cases. For example, when the width or height of the luma coding block is greater than 64, TT partitioning may be prohibited as shown in FIG. 9. Also, for example, when the width or height of the chroma coding block is greater than 32, TT partitioning may be prohibited.

FIG. 10 shows an example in which ternary tree (TT) partitioning is limited for a 128×128 coding block according to an embodiment of the present disclosure.

In the present disclosure, a coding tree scheme may support that luma and chroma blocks have a separate block tree structure. For P and B slices, luma and chroma CTBs in a single CTU may be limited to have the same coding tree structure. However, for I slices, luma and chroma blocks may have a separate block tree structure. If a separate block tree mode is applied, a luma CTB may be split into CUs based on a specific coding tree structure, and a chroma CTB may be split into chroma CUs based on a different coding tree structure. This may mean that a CU in the I slice may consist of a coding block of luma component or coding blocks of two chroma components, and a CU in the P or B slice may consist of blocks of three color components.

In the "Partitioning of CTUs using a tree structure" described above, the quadtree coding tree structure with nested multi-type tree has been described, but a structure in which a CU is partitioned is not limited thereto. For example, BT structure and TT structure may be interpreted as the concept included in a multiple partitioning tree (MPT) structure, and it may be interpreted that a CU is partitioned through QT structure and MPT structure. In an example where a CU is partitioned through the QT structure and the MPT structure, a syntax element (e.g., MPT_split_type) including information on how many blocks a leaf node of the QT structure is split, and a syntax element (e.g., MPT_split_mode) including information on whether a leaf node of the QT structure is split in a vertical direction or a horizontal direction may be signaled, and thus a partitioning structure may be determined.

In another example, a CU may be partitioned in a different method from QT structure, BT structure or TT structure. That is, unlike that a CU of deeper depth is partitioned to ¼ size of a CU of upper depth according to the QT structure, or a CU of deeper depth is partitioned to ½ size of a CU of upper depth according to the BT structure, or a CU of deeper depth is partitioned to ¼ size or ½ size of a CU of upper depth according to the TT structure, a CU of deeper depth may be partitioned to ⅕, ⅓, ⅜, ⅗, ⅔ or ⅝ size of a CU of upper depth if necessary or desired, but a method of partitioning a CU is not limited thereto.

If a portion of the tree node block exceeds the bottom or right picture boundary, the corresponding tree node block may be restricted such that all samples of all coded CUs are positioned within the picture boundaries. In this case, for example, the partitioning rule shown in Table 2 below may be applied.

TABLE 2

If a portion of a tree node block exceeds both the bottom and the right picture boundaries,
If the block is a QT node and the size of the block is larger than the minimum QT size, the block is forced to be split with QT split mode.
Otherwise, the block is forced to be split with SPLIT_BT_HOR mode
Otherwise if a portion of a tree node block exceeds the bottom picture boundaries, TABLE 2-continued If the block is a QT node, and the size of the block is larger than the minimum QT size, and the
size of the block is larger than the maximum BT size, the block is forced to be split with QT split mode.
Otherwise, if the block is a QT node, and the size of the block is larger than the minimum QT
size and the size of the block is smaller than or equal to the maximum BT size, the block is forced to be
split with QT split mode or SPLIT_BT_HOR mode.
Otherwise (the block is a BTT node or the size of the block is smaller than or equal to the
minimum QT size), the block is forced to be split with SPLIT_BT_HOR mode.
Otherwise if a portion of a tree node block exceeds the right picture boundaries,
If the block is a QT node, and the size of the block is larger than the minimum QT size, and the
size of the block is larger than the maximum BT size, the block is forced to be split with QT split mode.
Otherwise, if the block is a QT node, and the size of the block is larger than the minimum QT
size and the size of the block is smaller than or equal to the maximum BT size, the block is forced to be
split with QT split mode or SPLIT_BT_VER mode.
Otherwise (the block is a BTT node or the size of the block is smaller than or equal to the
minimum QT size), the block is forced to be split with SPLIT_BT_VER mode.

Limitations on Redundant CU Splits

FIG. 11 shows an example of redundant partitioning patterns that may occur in binary tree partitioning and ternary tree partitioning according to an embodiment of the present disclosure.

A quadtree coding block structure with a multitype tree may provide a very flexible block partitioning structure. Because of the partitioning types supported for the multitype tree, different partitioning patterns may potentially lead to the same coding block structure result in some cases. By limiting the occurrence of such redundant partitioning patterns, the amount of data of partitioning information may be reduced.

As shown in FIG. 11, two levels of consecutive binary splits in one direction have the same coding block structure as binary partitioning for center partition after ternary partitioning. In this case, the binary tree partitioning (in the given direction) for the center partition of the ternary tree partitioning is prohibited. This prohibition may be applied to CUs of all pictures. When such specific partitioning is prohibited, signaling of corresponding syntax elements may be modified to reflect such a prohibited case, and through this, the number of bits signaled for partitioning may be reduced. For example, as in the example shown in FIG. 10, when binary tree partitioning for the center partition of the CU is prohibited, the mtt_split_cu_binary_flag syntax element indicating whether the partitioning is binary partitioning or ternary partitioning is not signaled, and the value may be inferred by the decoder as zero.

Inter Prediction

Hereinafter, an inter prediction technique according to an embodiment of the present disclosure will be described. Inter prediction described below may be performed by an inter predictor 180 of an encoding apparatus 100 of FIG. 2 or an inter predictor 260 of a decoding apparatus 200 of FIG. 3. In addition, data encoded according to an embodiment of the present disclosure may be stored in the form of a bitstream.

General

The predictor of the encoding apparatus 100/decoding apparatus 200 may derive a prediction sample by performing inter prediction on block units. Inter prediction may be a prediction derived in a manner that is dependent on data elements (e.g., sample values or motion information) of picture(s) other than the current picture. When inter prediction is applied to the current block, a predicted block (prediction sample array) for the current block may be derived based on a reference block (reference sample array) specified by a motion vector on a reference picture indicated by a reference picture index. In this case, in order to reduce an amount of motion information transmitted in an inter prediction mode, motion information of the current block may be predicted on a per block, subblock, or sample basis based on a correlation of motion information between the neighboring block and the current block. The motion information may include a motion vector and a reference picture index. The motion information may further include inter-prediction type (L0 prediction, L1 prediction, Bi prediction, etc.) information. If the inter prediction is applied, a neighboring block may include a spatial neighboring block which is present in the current picture, and a temporal neighboring block which is present in the reference picture. A reference picture including the reference block and a reference picture including the temporal neighboring block may be the same as or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be constructed based on the neighboring blocks of the current block, and a flag or index information indicating which candidate is selected (used) may be signaled in order to derive the motion vector and/or reference picture index of the current block. The inter prediction may be performed based on various prediction modes. For example, in a skip mode and a merge mode, motion information of the current block may be the same as motion information of a selected neighboring block. In the skip mode, a residual signal may not be transmitted unlike the merge mode. In a motion vector prediction (MVP) mode, a motion vector of the selected neighboring block may be used as a motion vector predictor, and a motion vector difference value may be signaled. In this case, a motion vector of the current block may be derived using a sum of the motion vector predictor and the motion vector difference.

FIGS. 12 and 13 are respectively an inter prediction-based video/image encoding procedure and an inter predictor within an encoding apparatus according to an embodiment of the disclosure.

The encoding apparatus 100 performs inter prediction on a current block (S1210). The encoding apparatus 100 may derive an inter prediction mode and motion information of a current block, and may generate the prediction samples of the current block. In this case, the inter prediction mode determination, motion information derivation and prediction sample generation procedure may be performed at the same time, and any one procedure may be performed prior to another procedure. For example, the inter predictor 180 of the encoding apparatus 100 may include a prediction mode determination unit 181, a motion information derivation unit 182, and a prediction sample derivation unit 183. The prediction mode determination unit 181 may determine a prediction mode for a current block. The motion information derivation unit 182 may derive motion information of the current block. The prediction sample derivation unit 183 may derive prediction samples of the current block. For example, the inter predictor 180 of the encoding apparatus 100 may search a given area (search area) of reference pictures for a block similar to a current block through motion estimation, and may derive a reference block having a minimum difference or a difference of a given reference or less with respect to the current block. The inter predictor 180 may derive a reference picture index indicating a reference picture in which a reference block is located based on the reference block, and may derive a motion vector based on a location difference between the reference block and the current block. The encoding apparatus 100 may determine a mode applied to the current block among various prediction modes. The encoding apparatus may compare RD costs for the various prediction modes, and may determine an optimal prediction mode for the current block.

For example, if a skip mode or merge mode is applied to the current block, the encoding apparatus 100 may configure a merge candidate list to be described later, and may derive a reference block having a minimum difference or a difference of a given reference or less with respect to the current block among reference blocks indicated by merge candidates included in a merge candidate list. In this case, a merge candidate associated with the derived reference block may be selected. Merge index information indicating the selected merge candidate may be generated and signaled to the decoding apparatus 200. Motion information of the current block may be derived using motion information of the selected merge candidate.

For another example, if an (A)MVP mode is applied to the current block, the encoding apparatus may configure an (A)MVP candidate list to be described later, and may use a motion vector of a motion vector predictor (mvp) candidate, selected among mvp candidates included in the (A)MVP candidate list, as the mvp of the current block. In this case, for example, a motion vector indicating the reference block derived by the motion estimation may be used as the motion vector of the current block. An mvp candidate including a motion vector having the smallest difference with respect to the motion vector of the current block, among the mvp candidates, may become the selected mvp candidate. A motion vector difference (MVD), that is, a difference obtained by subtracting the mvp from the motion vector of the current block, may be derived. In this case, information on the MVD may be signaled to the decoding apparatus 200. Furthermore, if an (A)MVP mode is applied, a value of the reference picture index may be configured as reference picture index information and may be separately signaled to the decoding apparatus.

The encoding apparatus 100 may derive residual samples based on the prediction samples (S1220). The encoding apparatus 100 may derive the residual samples through a comparison between the original samples of the current block and the prediction samples.

The encoding apparatus 100 encodes image information including prediction information and residual information (S1230). The encoding apparatus may output the encoded image information in a bitstream form. The prediction information may include information on prediction mode information (e.g., skip flag, merge flag or mode index) and motion information as information related to the prediction procedure. The information related to motion information may include candidate selection information (e.g., merge index, mvp flag or mvp index), that is, information for deriving a motion vector. Furthermore, the information related to motion information may include information on the MVD and/or reference picture index information. Furthermore, the information related to motion information may include information indicating whether L0 prediction, L1 prediction, or bi-prediction is applied. The residual information is information on the residual samples. The residual information may include information on quantized transform coefficients for the residual samples.

The output bitstream may be stored in a (digital) storage medium and transmitted to the decoding apparatus or may be transmitted to the decoding apparatus over a network.

Meanwhile, as described above, the encoding apparatus may generate a reconstructed picture (including reconstructed samples and reconstructed block) based on the reference samples and the residual samples. This is for deriving, in the encoding apparatus 100, the same prediction results as those performed in the decoding apparatus 200. Accordingly, coding efficiency may be improved. Accordingly, the encoding apparatus 100 may store the reconstructed picture (or reconstructed samples and reconstructed block) in the memory, and may use the reconstructed picture as a reference picture for inter prediction. As described above, an in-loop filtering procedure may be further applied to the reconstructed picture.

FIGS. 14 and 15 are respectively an inter prediction-based video/image decoding procedure and an inter predictor within a decoding apparatus according to an embodiment of the disclosure.

The decoding apparatus 200 may perform an operation corresponding to an operation performed in the encoding apparatus 100. The decoding apparatus 200 may perform prediction on a current block based on received prediction information, and may derive prediction samples.

Specifically, the decoding apparatus 200 may determine a prediction mode for the current block based on received prediction information (S1410). The decoding apparatus 200 may determine which inter prediction mode is applied to the current block based on prediction mode information within the prediction information.

For example, the decoding apparatus 200 may determine whether the merge mode or (A)MVP mode is applied to the current block based on the merge flag. Alternatively, the decoding apparatus 200 may select one of various inter prediction mode candidates based on the mode index. The inter prediction mode candidates may include a skip mode, a merge mode and/or an (A)MVP mode or may include various inter prediction modes to be described later.

The decoding apparatus 200 derives motion information of the current block based on the determined inter prediction mode (S1420). For example, if a skip mode or merge mode is applied to the current block, the decoding apparatus 200 may configure a merge candidate list to be described later and select one of merge candidates included in the merge candidate list. The selection of the merge candidate may be performed based on the merge index. Motion information of the current block may be derived from the motion information of the selected merge candidate. The motion information of the selected merge candidate may be used the motion information of the current block.

For another example, if an (A)MVP mode is applied to the current block, the decoding apparatus 200 may configure an (A)MVP candidate list to be described later, and may use a motion vector of a motion vector predictor (mvp) candidate, selected among mvp candidates included in the (A)MVP candidate list, as the mvp of the current block. The selection may be performed based on the selection information (mvp flag or mvp index). In this case, the decoding apparatus 200 may derive the MVD of the current block based on information on the MVD. The decoding apparatus may derive the motion vector of the current block based on the mvp of the current block and the MVD. Furthermore, the decoding apparatus may derive the reference picture index of the current block based on the reference picture index information. A picture indicated by the reference picture index within a reference picture list regarding the current block may be derived as a reference picture referred for the inter prediction of the current block.

Meanwhile, as will be described later, motion information of the current block may be derived without a candidate list configuration. In this case, motion information of the current block may be derived according to a procedure disclosed in a prediction mode to be described later. In this case, a candidate list configuration, such as that described above, may be omitted.

The decoding apparatus 200 may generate prediction samples for the current block based on the motion information of the current block (S1430). In this case, the decoding apparatus 200 may derive a reference picture based on the reference picture index of the current block, and may derive the prediction samples of the current block indicated on the reference picture by the motion vector of the current block. In this case, as will be described later, a prediction sample filtering procedure may be further performed on some of or all the prediction samples of the current block according to circumstances.

For example, the inter predictor 260 of the decoding apparatus 200 may include a prediction mode determination unit 261, a motion information derivation unit 262, and a prediction sample derivation unit 263. The decoding apparatus 200 may determine a prediction mode of the current block based on prediction mode information received from the prediction mode determination unit 261, may derive motion information (motion vector and/or the reference picture index) of the current block based on information related to motion information received from the motion information derivation unit 262. The prediction sample derivation unit 263 may derive the prediction samples of the current block.

The decoding apparatus 200 generates residual samples for the current block based on the received residual information (S1440). The decoding apparatus 200 may generate reconstructed samples for the current block based on the prediction samples and the residual samples, and may generate a reconstructed picture based on the reconstructed samples (S1450). Thereafter, as described above, an in-loop filtering procedure may be further applied to the reconstructed picture.

As described above, the inter prediction procedure may include an inter prediction mode determination step, a motion information derivation step according to a determined prediction mode, and a prediction execution (prediction sample generation) step based on derived motion information.

Determination of Inter Prediction Mode

Various inter prediction modes may be used for the prediction of a current block within a picture. For example, various modes, such as a merge mode, a skip mode, an MVP mode, and an affine mode, may be used. A decoder side motion vector refinement (DMVR) mode, an adaptive motion vector resolution (AMVR) mode, etc. May be further used as additional modes. The affine mode may be referred to as an affine motion prediction mode. The MVP mode may be referred to as an advanced motion vector prediction (AMVP) mode.

Prediction mode information indicating an inter prediction mode of a current block may be signaled from an encoding apparatus to a decoding apparatus. The prediction mode information may be included in a bitstream and received by the decoding apparatus. The prediction mode information may include index information indicating one of multiple candidate modes. Alternatively, an inter prediction mode may be indicated through the hierarchical signaling of flag information. In this case, the prediction mode information may include one or more flags. For example, a flag may be further signaled in order to indicate whether a skip mode is applied by signaling a skip flag, to indicate whether a merge mode is applied by signaling a merge flag if a skip mode is not applied, and to indicate that an MVP mode is applied if a merge mode is not applied or for an additional identification. The affine mode may be signaled as an independent mode or may be signaled as a mode dependent on a merge mode or MVP mode. For example, the affine mode may be configured as one of a merge candidate list or MVP candidate list, as will be described later.

Derivation of Motion Information

The encoding apparatus 100 or the decoding apparatus 200 may perform inter prediction using motion information of a current block. The encoding apparatus 100 may derive optimal motion information for a current block according to a motion estimation procedure. For example, the encoding apparatus 100 may search a reference block having a similar correlation using the original block within the original picture for a current block in a fraction pixel unit within a determined search range within a reference picture. Accordingly, the encoding apparatus may derive motion information. The similarity of a block may be derived based on a difference between phase-based sample values. For example, the similarity of a block may be calculated based on a SAD (Sum of Absolute Difference) between a current block (or the template of the current block) and a reference block (or the template of the reference block). In this case, motion information may be derived based on a reference block having the smallest SAD within a search area. The derived motion information may be signaled to the decoding apparatus using several methods based on an inter prediction mode.

Merge Mode and Skip Mode

If a merge mode is applied, motion information of a current prediction block is not directly transmitted, and motion information of the current prediction block is derived using motion information of a neighboring prediction block. Accordingly, the encoding apparatus 100 may indicate the motion information of the current prediction block by transmitting flag information to notify that a merge mode has been used and a merge index to notify which neighboring prediction block has been used.

The encoding apparatus 100 should search a merge candidate block used to derive motion information of a current prediction block in order to perform a merge mode. For example, a maximum of up to 5 merge candidate blocks may be used, but the disclosure is not limited thereto. Furthermore, a maximum number of merge candidate blocks may be transmitted in a slice header, and the disclosure is not limited thereto. After searching merge candidate blocks, the encoding apparatus 100 may generate a merge candidate list, and may select a merge candidate block having the smallest cost, among the merge candidate blocks, as the final merge candidate block.

An embodiment of the disclosure provides various embodiments of merge candidate blocks constructing a merge candidate list.

The merge candidate list may use 5 merge candidate blocks, for example. For example, 4 spatial merge candidates and 1 temporal merge candidate may be used.

FIG. 16 illustrates an example of constructing spatial merge candidates for a current block.

Referring to FIG. 16, for prediction of a current block, at least one of a left neighboring block A1, a bottom-left neighboring block A2, a top-right neighboring block B0, an upper neighboring block B1, and a top-left neighboring block B2 may be used. The merge candidate list for the current block may be configured based on the procedure shown in FIG. 12.

FIG. 17 is a flowchart illustrating a method of configuring a merge candidate list according to an embodiment to which the disclosure is applied.

A coding apparatus (the encoding apparatus 100 or the decoding apparatus 200) searches spatial neighboring blocks of a current block and inserts derived spatial merge candidates into a merge candidate list (S1710). For example, the spatial neighboring blocks may include the bottom left corner neighboring block, left neighboring block, top right corner neighboring block, top neighboring block, and top left corner neighboring block of the current block. In this case, this is an example, and additional neighboring blocks, such as a right neighboring block, a bottom neighboring block, and a bottom right neighboring block, in addition to the spatial neighboring blocks may be further used as the spatial neighboring blocks. The coding apparatus may detect available blocks by searching the spatial neighboring blocks based on priority, and may derive motion information of the detected blocks as the spatial merge candidates. For example, the encoding apparatus 100 or the decoding apparatus 200 may search the 5 blocks illustrated in FIG. 11 in the sequence of A1, B1, B0, A0, and B2, and may configure a merge candidate list by sequentially indexing available candidates.

The coding apparatus searches a temporal neighboring block of the current block and inserts a derived temporal merge candidate into the merge candidate list (S1720). The temporal neighboring block may be located on a reference picture, that is, a picture different from a current picture in which the current block is located. A reference picture in which the temporal neighboring block is located may be called a co-located picture or a col-picture. The temporal neighboring block may be searched in the sequence of the bottom right corner neighboring block and bottom right center block of a co-located block for the current block on the col-picture. Meanwhile, if motion data compression is applied, specific motion information may be stored in the col-picture as representative motion information for each given storage unit. In this case, it is not necessary to store motion information for all blocks within the given storage unit, and thus a motion data compression effect may be obtained. In this case, the given storage unit may be predetermined as a 16×16 sample unit or an 8×8 sample unit, for example, or size information for the given storage unit may be signaled from the encoding apparatus 100 to the decoding apparatus 200. If the motion data compression is applied, motion information of the temporal neighboring block may be substituted with representative motion information of the given storage unit in which the temporal neighboring block is located. That is, in this case, in an implementation aspect, after an arithmetic right shift is performed by a given value based on the coordinates (top left sample position) of the temporal neighboring block not a prediction block in which the coordinates of the temporal neighboring block are located, the temporal merge candidate may be derived based on motion information of a prediction block that covers the arithmetic left-shifted location. For example, if the given storage unit is a 2n×2n sample unit, assuming that the coordinates of the temporal neighboring block are (xTnb, yTnb), motion information of a prediction block located in ((xTnb>>n)<<n), (yTnb>>n)<<n)), that is, a modified location, may be used for the temporal merge candidate. Specifically, for example, if the given storage unit is a 16×16 sample unit, assuming that the coordinates of the temporal neighboring block are (xTnb, yTnb), motion information of a prediction block located in ((xTnb>>4)<<4), (yTnb>>4)<<4)), that is, a modified location, may be used for the temporal merge candidate. Alternatively, for example, if the given storage unit is an 8×8 sample unit, assuming that the coordinates of the temporal neighboring block are (xTnb, yTnb), motion information of a prediction block located in ((xTnb>>3)<<3), (yTnb>>3)<<3)), that is, a modified location, may be used for the temporal merge candidate.

The coding apparatus may check whether the current number of merge candidates is smaller than a maximum number of merge candidates (S1730). The maximum number of merge candidates may be pre-defined or may be signaled from the encoding apparatus 100 to the decoding apparatus 200. For example, the encoding apparatus 100 may generate information on the maximum number of merge candidates, may encode the information, and may transmit the information to the decoding apparatus 200 in a bitstream form. If the maximum number of merge candidates is filled, a candidate addition process may not be performed.

If, as a result of the check, the current number of merge candidates is smaller than the maximum number of merge candidates, the coding apparatus inserts an added merge candidate into the merge candidate list (S1740). The added merge candidate may include an ATMVP (Adaptive Temporal Motion Vector Prediction), a combined bi-predictive merge candidate (if the slice type of a current slice is a B type) and/or a zero vector merge candidate, for example.

MVP Mode

FIG. 13 is a flowchart illustrating a method of configuring a prediction candidate list (MVP candidate list) according to an embodiment to which the disclosure is applied.

If a motion vector prediction (MVP) mode is applied, a motion vector predictor (mvp) candidate list may be generated based on a motion vector of a reconstructed spatial neighboring block (e.g., the neighboring block described in FIG. 16) and/or a motion vector corresponding to a temporal neighboring block (or Col block). That is, the motion vector of the reconstructed spatial neighboring block and/or the motion vector of the temporal neighboring block may be used as a motion vector predictor candidate. The information on prediction may include selection information (e.g., MVP flag or MVP index) indicating an optimal motion vector predictor candidate selected among motion vector predictor candidates included in the list. In this case, the predictor may select the motion vector predictor of a current block, among motion vector predictor candidates included in a motion vector candidate list, using the selection information. The predictor of the encoding apparatus 100 may calculate a motion vector difference (MVD) between the motion vector of the current block and the motion vector predictor, may encode the MVD, and may output the encoded MVD in a bitstream form. That is, the MVD may be calculated as a value obtained by subtracting the motion vector predictor from the motion vector of the current block. In this case, the predictor of the decoding apparatus may obtain a motion vector difference included in the information on prediction, and may derive the motion vector of the current block through the addition of the motion vector difference and the motion vector predictor. The predictor of the decoding apparatus may obtain or derive a reference picture index indicating a reference picture from the information on prediction. For example, a motion vector predictor candidate list may be configured as illustrated in FIG. 18.

Referring to FIG. 18, the coding apparatus searches for a spatial candidate block for motion vector prediction and inserts it into a prediction candidate list (S1810). For example, the coding apparatus may search for neighboring blocks according to a predetermined search order, and add information of the neighboring block satisfying the condition for the spatial candidate block to the prediction candidate list (MVP candidate list).

After constructing the spatial candidate block list, the coding apparatus compares the number of spatial candidates included in the prediction candidate list with a preset reference number (e.g., 2) (S1820). If the number of the spatial candidates included in the prediction candidate list is greater than or equal to the reference number (e.g., 2), the coding apparatus may end the construction of the prediction candidate list.

But if the number of spatial candidate lists included in the prediction candidate list is less than the reference number (e.g., 2), the coding apparatus searches for a temporal candidate block and inserts it into the prediction candidate list (S1830), and when the temporal candidate block is unavailable, adds a zero motion vector to the prediction candidate list (S1840).

A predicted block for a current block may be derived based on the motion information derived according to a prediction mode. The predicted block may include prediction samples (prediction sample array) of the current block. When the motion vector of the current block indicates a fractional sample unit, an interpolation procedure may be performed, and through these prediction samples of the current block may be derived based on the reference samples in a fractional sample unit in a reference picture. When affine inter prediction is applied to the current block, prediction samples may be generated based on a motion vector in a sample/subblock unit. When bi-direction prediction is applied, final prediction samples may be derived through weighted (according to the phase) sums of prediction samples derived based on first direction prediction (e.g., L0 prediction) and prediction samples derived based on second direction prediction. Reconstruction samples and reconstruction pictures may be generated based on the derived prediction samples, and as described above, a procedure such as in-loop filtering may be performed afterwards.

Affine Motion Prediction

The existing video coding system uses one motion vector (translation motion model) to represent a motion of a coding block. However, the method using one motion vector may express an optimal motion in block units, but it is not actually an optimal motion for each pixel. Therefore, if an optimal motion vector is determined in a pixel unit, encoding efficiency may be increased. To this end, in the present embodiment, an affine motion prediction method for performing encoding/decoding using an affine motion model is described. In the affine motion prediction method, a motion vector may be expressed in units of pixels of a block using two, three, or four motion vectors.

FIG. 19 shows an example of affine motion models according to an embodiment of the present disclosure.

The affine motion model may express four motions as shown in FIG. 19. An affine movement model that expresses three movements (translation, scale, and rotate) among the movements that may be expressed by the affine movement model is referred to as a similar (or simplified) affine movement model, and in the present disclosure, methods proposed based on the similar (or simplified) affine motion model will be described. However, the embodiment of the present disclosure is not limited to the similar (or simplified) affine motion model.

FIGS. 20A and 20B show examples of motion vectors at respective control points according to an embodiment of the present disclosure.

As shown in FIGS. 20A and 20B, in affine motion prediction, a motion vector for each pixel position included in a block may be determined using two or more control point motion vectors (CPMV).

For the 4-parameter affine motion model, a motion vector at a sample position (x, y) may be derived as shown in Equation 1 below.

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad \text{[Equation 1]}$$

For a 6-parameter affine motion model, a motion vector at the sample position (x, y) may be derived as shown in Equation 2 below.

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{[Equation 2]}$$

Here, $\vec{v_0}=\{v_{0x}, v_{0y}\}$ is a CPMV of a CP at a top-left corner position of the coding block, $\vec{v_1}=\{v_{1x}, v_{1y}\}$ is a CPMV of the CP at a top-right corner position is the coding block, and $\vec{v_2}=\{v_{2x}, v_{2y}\}$ is a CPMV of the CP of at a bottom-left corner position. Also, W corresponds to a width of the current block, H corresponds to a height of the current block, and $\vec{v}=\{v_x, v_y\}$ is a motion vector at a position $\{x, y\}$.

FIG. 21 shows an example of motion vectors for each subblock according to an embodiment of the present disclosure.

In the encoding/decoding process, an affine motion vector field (MVF) may be determined in a pixel unit or a previously defined subblock unit. When the MVF is determined in units of pixels, a motion vector is obtained based on each pixel value. When the MVP is determined in units of subblocks, a motion vector of the corresponding block may be obtained based on a pixel value at the center (lower right of the center, that is, a lower right sample among the four central samples) of the subblock. In the following description, it is assumed that the affine MVF is determined in units of 4*4 subblocks as shown in FIG. 21. However, this is only for convenience of description and the size of the sub-block may be variously modified.

That is, when affine prediction is available, the motion model applicable to the current block may include the following three types: translational motion model, 4-parameter affine motion model, and 6-parameter affine motion mode. Here, the translational motion model may represent a model using an existing block unit motion vector, the 4-parameter affine motion model may represent a model using two CPMVs, and the 6-parameter affine motion model may represent a model using three CPMVs.

Affine motion prediction may include an affine MVP (or affine inter) mode and an affine merge. In affine motion prediction, motion vectors of the current block may be derived in units of samples or subblocks.

Affine Merge

In the affine merge mode, CPMVs may be determined according to an affine motion model of a neighboring block coded with affine motion prediction. In the search order, affine coded neighboring blocks may be used for affine merge mode. When one or more neighboring blocks are coded with affine motion prediction, the current block may be coded with AF_MERGE. That is, when the affine merge mode is applied, the CPMVs of the current block may be derived using CPMVs of the neighboring blocks. In this case, the CPMVs of the neighboring block may be used as CPMVs of the current block as they are, or the CPMVs of the neighboring block may be modified based on a size of the neighboring block and a size of the current block so as to be used used as the CPMVs of the current block.

When the affine merge mode is applied, an affine merge candidate list may be configured for deriving CPMVs for the current block. The fine merge candidate list may include, for example, at least one of the following candidates.

1) Inherited affine candidates
2) Constructed affine candidates
3) Zero MV candidate Here, the inherited affine candidates may be candidates derived based on the CPMVs of the neighboring block when the neighboring block is coded in the affine mode, the constructed affine candidates may be candidates derived by constructing the CPMVs with each CPMV unit based on MV of the corresponding CP neighboring block, and the zero MV candidate may represent a candidate including CPMVs having a value of 0.

FIG. 22 shows an example of a flowchart for constructing an affine merge candidate list according to an embodiment of the present disclosure.

Referring to FIG. 22, a coding apparatus (encoding apparatus or decoding apparatus) may insert the inherited affine candidates in a candidate list (S2210), insert the constructed affine candidates in the affine candidate list (S2220), and insert the zero MV candidate in the affine candidate list (S2230). In an embodiment, when the number of candidates included in the candidate list is smaller than a reference number (e.g., two), the coding apparatus may insert the configured affine candidates or the zero MV candidate.

FIGS. 23 and 24 show an example of neighboring blocks for constructing an inherited candidate of an affine motion vector and a case in which control point motion vectors of a current block are inherited from neighboring blocks according to an embodiment of the present disclosure.

There may be up to two inherited affine candidates (one from the left neighboring CU and one of the upper neighboring CUs), which may be derived from the affine motion model of neighboring blocks. Candidate blocks are shown in FIG. 23. A scan order for the left predictor is A0-A1, and a scan order for the upper predictor is B0-B1-B2. Only the first inherited candidates from each side are selected. Pruning check may not be performed between two inherited candidates. When an adjacent affine CU is identified, control point motion vectors of the adjacent affine CU may be used to derive a control point motion vector predictor (CPMVP) candidate in the affine merge list of the current CU. As shown in FIG. 24, if the left neighboring block A is coded in the affine mode, v2, v3, and v4 at the top-left corner, top-right corner, and bottom-left corner are used as motion vectors of the CU including the block A. If block A is coded with a 4-parameter affine model, two CPMVs of the current CU are calculated according to v2 and v3. If block A is coded with a 6-parameter model, three CPMVs of the current CU are calculated according to v2, v3, and v4.

FIG. 25 shows an example of candidate positions for a constructed affine merge mode according to an embodiment of the present disclosure.

The constructed affine merge refers to a candidate constructed by combining neighboring translational motion information for each control point. As shown in FIG. 25, motion information for control points is derived from specified spatial neighbors and temporal neighbors. CPMVk (k=1, 2, 3, 4) indicates a k-th control point. For CPMV1 (CP0) at the top-left corner, blocks are checked in the order B2-B3-A2 and an MV of a first available block is used. Blocks are checked in the order of B1-B0 for CPMV2 (CP1) at the top-right corner, and blocks are checked in the order of A1-A0 for CPMV3 (CP2) at the bottom-left corner. If available, TMVP is used for CPMV4 (CP3) at the bottom-right corner.

When the MVs of the four control points are obtained, affine merge candidates are constructed based on this motion information. Combinations of the following control points MVs are used in order:

{CPMV1, CPMV2, CPMV3}, {CPMV1, CPMV2, CPMV4}, {CPMV1, CPMV3, CPMV4},

{CPMV2, CPMV3, CPMV4}, {CPMV1, CPMV2}, {CPMV1, CPMV3}

Combinations of three CPMVs construct a 6-parameter affine merge candidate, and a combination of two CPMVs constructs a 4-parameter affine merge candidate. To avoid a motion scaling process, if reference indices of the control points are different, the combination of related control points MVs is discarded.

Affine MVP

FIG. 26 shows an example of a flowchart for constructing an affine motion vector predictor (MVP) candidate list according to an embodiment of the present disclosure.

In the affine MVP mode, after two or more control point motion vector prediction (CPMVP) and CPMV for the current block are determined, a control point motion vector difference (CPMVD) corresponding to a difference value is transmitted from the encoding apparatus 100 to the decoding apparatus 200.

When the affine MVP mode is applied, an affine MVP candidate list may be constructed for deriving CPMVs for the current block. For example, the affine MVP candidate list may include at least one of the following candidates. For example, the affine MVP candidate list may include a maximum of n (e.g., 2) candidates.

1) Inherited affine mvp candidates that extrapolated from the CPMVs of the neighbor CUs (S2610)
2) Constructed affine mvp candidates CPMVPs that are derived using the translational MVs of the neighbour CUs (S2620)

3) Additional candidates based on Translational MVs from neighboring CUs (S2630)

4) Zero MVs candidate) (S2640)

Here, the inherited affine candidate is a candidate derived based on the CPMVs of the neighboring block when the neighboring block is coded in the affine mode, the constructed affine candidate is a candidate derived by constructing CPMVs based on the MVs of the corresponding CP neighboring blocks in units of each CPMV, and the zero MV candidate indicates a candidate including CPMVs whose value is 0. When the maximum number of candidates for the affine MVP candidate list is two, candidates 2) or lower in the above order may be considered and added for the case where the number of current candidates is less than two. In addition, additional candidates based on translational MVs from neighboring CUs may be derived in the following order.

1) If the number of candidates is less than 2 and CPMV0 of a constructed candidate is valid, CPMV0 is used as an affine MVP candidate. That is, the MVs of CP0, CP1, and CP2 are all set to be the same as CPMV0 of a constructed candidate.

2) If the number of candidates is less than 2 and CPMV1 of a constructed candidate is valid, CPMV1 is used as an affine MVP candidate. That is, the MVs of CP0, CP1, and CP2 are all set to be the same as CPMV1 of a constructed candidate.

3) If the number of candidates is less than 2 and CPMV2 of a constructed candidate is valid, CPMV2 is used as an affine MVP candidate. That is, the MVs of CP0, CP1, and CP2 are all set to be the same as CPMV2 of a constructed candidate.

4) If the number of candidates is less than 2, TMVP (temporal motion vector predictor or mvCol) is used as an affine MVP candidate.

The affine MVP candidate list may be derived by the procedure shown in FIG. 26.

The confirmation order of the inherited MVP candidates is the same as the confirmation order of the inherited affine merge candidates. A difference is that, for the MVP candidate, only affine CUs having the same reference picture as the current block are considered. A pruning process is not applied when the inherited affine motion predictor is added to the candidate list.

The constructed MVP candidate is derived from the neighboring blocks shown in FIG. 25. The same confirmation sequence as the construction of the affine merge candidate is used. In addition, a reference picture index of the neighboring block is also checked. A first block which is inter-coded in the confirmation order and has the same reference picture as the current CU is used.

SbTMVP (Subblock-Based Temporal Motion Vector Prediction)

FIGS. 27 and 28 show examples of spatial neighboring blocks for subblock-based temporal motion vector prediction (SbTMVP) and a method of applying a motion shift from the neighboring blocks according to an embodiment of the present disclosure.

The SbTMVP method may be used. Similar to temporal motion vector prediction (TMVP) in HEVC, SbTMVP may use a motion field in a collocated picture (col picture) to improve a merge mode and motion vector prediction for CUs in the current picture. The same col picture used by TMVP is used for SbTMVP. SbTMVP differs from TMVP in two key aspects:

1. TMVP predicts motion at a CU level, but SbTMVP predicts motion at a sub-CU level.

2. TMVP fetches temporal motion vectors from the collocated block (col block) in the col picture (col block is the bottom-right or center block for the current CU), while SbTMVP applies a motion shift before fetching temporal motion information from the col picture and is obtained from a motion vector of one of spatial neighboring blocks of the current CU.

The SbTMVP process is shown in FIG. 28. SbTMVP predicts motion vectors of a sub-CU within the current CU in two steps. In a first step, the spatial neighboring blocks in FIG. 27 are examined in the order of A1, B1, B0, and A0. When a first spatial neighboring block having a motion vector using the col picture as a reference picture is identified, this motion vector is selected as a motion vector to which motion shift applied. If no such motion is identified from spatial neighbors, the motion shift is set to (0, 0).

In a second step, the motion shift identified in the first step is applied to obtain sub-CU level motion information (motion vectors and reference indices) from the col pictures shown in FIG. 28 (i.e., added to coordinates of the current block). The example in FIG. 28 assumes that the motion shift is set to a motion of block A1. Then, for each sub-CU, motion information of a corresponding block (the smallest motion grid covering the center sample) in the col picture is used to derive motion information for the sub-CU. After the motion information of the collocated sub-CU is identified, it is converted into motion vectors and reference indices in a manner similar to the TMVP process of HEVC, and here, temporal motion scaling is applied to align reference pictures of temporal motion vectors to reference pictures of the current CU.

A combined sub-block based merge list including both SbTMVP candidates and affine merge candidates may be used for signaling of the affine merge mode (which may be referred to as sub-block-based merge mode). The SbTMVP mode may be enabled/disabled by a sequence parameter set (SPS) flag. When SbTMVP is enabled, an SbTMVP predictor is added as a first entry to the list of subblock-based merge candidates, and then, affine merge candidates are added thereafter. The maximum allowed size of the affine merge candidate list may be 5.

The sub-CU size used in SbTMVP may be fixed to 2×2, 4×4, or 8×8, and the affine merge mode may also be the same. The SbTMVP mode may be applied to a CU having a width and height greater than or equal to 9.

An encoding logic of an additional SbTMVP merge candidate may be the same as that of the other merge candidates. For each P or B slice, additional RD check may be performed to determine whether to use the SbTMVP candidate.

AMVR (Adaptive Motion Vector Resolution)

Previously, motion vector differences (MVDs) (between the motion vector and predicted motion vector of a CU) are signaled in units of quarter-luma-sample when use_integer_mv_flag is equal to 0 in the slice header. In the related art, when use_integer_mv_flag is 0 in the slice header, a motion vector difference (MVD) (between the predicted motion vector and the motion vector of the CU) may be signaled in units of quarter-luma-sample. In this document, a CU-level AMVR scheme is introduced. AMVR may cause the MVD of a CU to be coded in units of ¼ luma samples, integer luma samples, or 4 luma samples. If the current CU has at least one non-zero MVD component, a CU-level MVD resolution indicator is conditionally signaled. If all MVD components (i.e., horizontal and vertical MVDs for reference list L0 and reference list L1 are zero, a quarter luma sample MVD resolution is inferred.

For a CU with at least one non-zero MVD component, a first flag is signaled to determine whether quarter luma sample MVD accuracy is applied for that CU. If the first flag is 0, no additional signaling is needed and ¼ luma sample MVD accuracy is used for the current CU. Otherwise, a second flag is signaled to indicate whether integer luma sample or 4 luma sample MVD accuracy is used. In order to ensure the reconstructed MV has the intended precision (quarter-luma-sample, interger-luma-sample or four-luma-sample), the motion vector predictors for the CU will be rounded to the same precision as that of the MVD before being added together with the MVD. Motion vector predictors may be rounded to zero. (i.e. negative motion vector predictors are rounded to positive infinity and positive motion vector predictors are rounded to negative infinity). The encoder determines the motion vector resolution for the current CU using RD check. In order to avoid always performing 3 CU-level RD checks for each MVD resolution, in VTM3, the RD check of 4 luma sample MVD resolutions is called conditionally. The RD cost of ¼ sample MVD accuracy is calculated first. Then, the RD cost of the integer luma sample MVD accuracy is compared with the RD cost of the ¼ luma sample MVD accuracy to determine whether verification of the RD cost of the 4 luma sample MVD accuracy is necessary. When the RD cost for the ¼ luma sample MVD accuracy is less than the RD cost for the integer luma sample MVD accuracy, the RD cost for the 4 sample MVD accuracy is omitted.

Generation of Prediction Sample

A predicted block for the current block may be derived based on the motion information derived according to a prediction mode. The predicted block may include prediction samples (prediction sample array) of the current block. When the motion vector of the current block indicates a fractional sample unit, an interpolation procedure may be performed, and prediction samples of the current block may be derived based on reference samples of the fractional sample unit in the reference picture through interpolation. When affine inter prediction is applied to the current block, prediction samples may be generated based on a sample/subblock unit MV. When bi-prediction is applied, prediction samples derived based on L0 prediction (i.e., prediction using a reference picture and MVL0 in the reference picture list L0) and prediction samples derived through weighted averaging of prediction samples (according to phases) derived based on L1 prediction (i.e., prediction using reference picture and MVL1 in the reference picture list L1) may be used as prediction samples of the current block.

As described above, reconstructed samples and a reconstructed picture may be generated based on the derived prediction samples, and then procedures such as in-loop filtering may be performed.

BWA (Bi-Prediction with Weighted Average)

As described above, according to the present disclosure, when bi-prediction is applied to the current block, prediction samples may be derived based on a weighted average. Conventionally, a bi-prediction signal (i.e., the bi-prediction samples) was able to be derived through a simple average of the L0 prediction signal (L0 prediction samples) and the L1 prediction signal (L1 prediction samples). That is, the bi-prediction samples were derived as an average of the L0 prediction samples based on the L0 reference picture and MVL0 and the L1 prediction samples based on the L1 reference picture and MVL1. However, according to this document, when bi-prediction is applied, a bi-prediction signal (bi-prediction samples) may be derived through a weighted average of the L0 prediction signal and the L1 prediction signal as shown in Equation 3 below.

$$P_{bi-pred}=((8-w)*P_0+w*P_1+4)>>3 \quad \text{[Equation 3]}$$

Five weights $\{-2, 3, 4, 5, 10\}$ may be used in weighted average bi-prediction. For each CU to which bi-prediction is applied, the weight w may be determined by one of two methods: 1) For a non-merge CU, the weight index is signaled after a motion vector difference; 2) For a merge CU, a weight index is inferred from neighboring blocks based on a merge candidate index. Weighted averaging bi-prediction is only applied to CUs with 256 or more luma samples (i.e., CU width times CU height is greater than or equal to 256). For low-delay pictures, all 5 weights are used. For non-low-delay pictures, three weights $\{3, 4, 5\}$ may be used.

In the encoder, fast search algorithms may be applied to find a weight index without significantly increasing encoder complexity. These algorithms are summarized below. When combined with AMVR, only unequal weights for 1 pixel (1-pel) and 4 pixel (4-pel) motion vector accuracies may be conditionally checked if the current picture is a low delay picture.

b) When combined with affine, affine motion estimation (ME) may be performed on unequal weights only when the affine mode is currently selected as the best mode.

c) When two reference pictures are identical in bi-prediction, only unequal weights are conditionally checked.

e) When specific conditions are not met, unequal weights are not searched depending on a POC distance between the current picture and the reference pictures, a coding quantization parameter (QP), and a temporal level.

BDOF (Bi-Directional Optical Flow)

BDOF may be used to improve a bi-prediction signal of a CU at the 4×4 sub-block level. BDOF may be applied to a CU if the following conditions are satisfied: 1) When the height of the CU is not 4 and the CU is not 4×8 in size; 2) When the CU is not coded using affine mode or ATMVP merge mode; 3) When the CU is coded using "true" bi-prediction mode, i.e., when one of the two reference pictures is in a display order that precedes the current picture and the other is in a display order that is later than the current picture, BDOF is applied to the luma components.

As the name implies, the BDOF mode is based on an optical flow concept, which assumes that a motion of an object is smooth. For each 4×4 subblock, a motion improvement (vx, vy) is calculated by minimizing a difference between the L0 and L1 prediction samples. Motion improvement is used to adjust the bi-predicted sample values in the subblock. The steps applied in the BDOF process are as follows.

First, horizontal and vertical gradients $$\frac{\partial I^{(k)}}{\partial x}(i,j) \frac{\partial I^{(k)}}{\partial y}(i,j),$$

k=0, 1 of the two prediction signals are calculated by directly calculating a difference between two adjacent samples as shown in Equation 4 below.

$$\frac{\partial I^{(k)}}{\partial x}(i,j) = \left(I^{(k)}(i+1,j) - I^{(k)}(i-1,j)\right) \gg 4 \quad \text{[Equation 4]}$$

-continued $$\frac{\partial I^{(k)}}{\partial y}(i, j) = \left(I^{(k)}(i, j+1) - I^{(k)}(i, j-1)\right) \gg 4$$

where $I^{(k)}(i,j)$ are the sample value at coordinate (i,j) of the prediction signal in list k, k=0,1.

Then, auto- and cross-correlation of the gradients, S1, S2, S3, S5, and S6 may be calculated as in Equation 5 below.

$$S_1 = \sum_{(i,j) \in \Omega} \psi_x(i,j) \cdot \psi_x(i,j)$$ [Equation 5]

$$S_3 = \sum_{(i,j) \in \Omega} \theta(i,j) \cdot \psi_x(i,j)$$

$$S_2 = \sum_{(i,j) \in \Omega} \psi_x(i,j) \cdot \psi_y(i,j)$$

$$S_5 = \sum_{(i,j) \in \Omega} \psi_y(i,j) \cdot \psi_y(i,j)$$

$$S_6 = \sum_{(i,j) \in \Omega} \theta(i,j) \cdot \psi_y(i,j)$$

where $$\psi_x(i,j) = \left(\frac{\partial I^{(1)}}{\partial x}(i,j) + \frac{\partial I^{(0)}}{\partial x}(i,j)\right) \gg n_a$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = \left(I^{(1)}(i,j) \gg n_b\right) - \left(I^{(0)}(i,j) \gg n_b\right)$$

where $\Omega$ is a 6×6 window around the 4×4 sub-block.

Motion improvement (vx, vy) may be induced using auto- and cross-correlation terms as in Equation 6 below:

$$v_x = S_1 > 0 ? \text{clip3}(-th_{BIO}', th_{BIO}', -((S_3 \cdot 2^{n_b - n_a}) \gg \lfloor \log_2 S_1 \rfloor)) : 0$$

$$v_y = S_5 > 0 ? \text{clip3}(th_{BIO}', th_{BIO}', -((S_6 \cdot 2^{n_b - n_a} - ((v_x S_{2,m}) \ll n_{S_2} + v_x S_{2,s})/2) \gg \lfloor \log_2 S_5 \rfloor)) : 0$$ [Equation 6]

Finally, the BDOF samples of the CU are calculated by adjusting the bi-prediction samples:

$$\text{pred}_{BDOF}(x,y) = (I^{(0)}(x,y) + I^{(1)}(x,y) + b(x,y) + o_{offset}) \gg \text{shift}$$ [Equation 7]

FIG. 29 shows an example of an extended CU (coding unit) used in bi-directional optical flow (BDOF) according to an embodiment of the present disclosure.

In Equation 6, na, nb, and nS2 are equal to 3, 6, and 12, respectively. These are selected so that multipliers do not exceed 15 bits in the BDOF process, and a maximum bit width of the intermediate parameters in the BDOF process is maintained within 32 bits. To derive the gradient values, some prediction samples I(k)(i,j) need to be generated in the list k (k=0, 1) outside the current CU boundaries.

As shown in FIG. 29, BDOF uses one extended row/column near the boundaries of a CU. To control computational complexity for generating prediction samples outside the boundaries, a bilinear filter is used to generate prediction samples in the extended region (white position), and an ordinary 8-tap motion compensation interpolation filter is used is used to generate prediction samples inside the CU (gray position). These extended sample values are used only for gradient calculation. For the remaining steps in the BDOF process, if any sample and gradient values outside the CU boundaries are needed, neighbors, starting from nearest ones, are padded (repeated).

Hereinafter, an embodiment for performing inter prediction using the merge mode to which the MMVD technique is applied according to an embodiment of the present disclosure will be described.

A refinement technique such as MVP may be applied to improve motion vector accuracy in a merge mode or a skip mode. The merge with MVD (MMVD) technique may improve accuracy by adjusting a magnitude and direction of a motion vector with respect to a candidate selected from among the candidates constructed by the merge candidate list construction method.

The coding apparatus may determine a specific candidate on the merge candidate list, as a base candidate. When the number of available base candidates is two, first and second candidates on the list may be used as base candidates. The encoding apparatus 100 may transmit information on the selected base candidate by signaling a base candidate index. The number of base candidates may be variously set, and when the number of base candidates is 1, the base candidate index may not be used. Table 3 below shows an example of a base candidate index.

TABLE 3

| | Base candidate IDX | |
|---|---|---|
| | 0 | 1 |
| Nth MVP | 1st MVP | 2nd MVP |

Referring to Table 3, if the base candidate index is 0, a motion vector corresponding to the first candidate in the currently constructed merge candidate list (or MVP candidate list) may be determined as the base candidate, and if the base candidate index is 1, a motion vector corresponding to the second candidate in the the currently constructed merge candidate list (or MVP candidate list) may be determined as the base candidate.

The encoding apparatus 100 may refine by signaling a magnitude (MMVD length) and direction (MMVD sign) applied to the motion vector corresponding to the base candidate, in which case a length index (MMVD length index) indicates a magnitude of the MVD applied to the motion vector and a direction index (MMVD sign index) indicates a direction of the MVD applied to the motion vector. Table 4 below shows a magnitude (MMVD offset) of the MVD according to the length index (MMVD length index), and Table 5 shows the direction of the MVD according to the direction index (MMVD sign index).

TABLE 4

| Distance IDX | 0 | 1 | 2 | 3 | 4 | 5 | 6 | 7 |
|---|---|---|---|---|---|---|---|---|
| Pixel distance | 1/4-pel | 1/2-pel | 1-pel | 2-pel | 4-pel | 8-pel | 16-pel | 32-pel |

TABLE 5

| | Direction IDX | | | |
| --- | --- | --- | --- | --- |
| | 00 | 01 | 10 | 11 |
| x-axis | + | − | N/A | N/A |
| y-axis | N/A | N/A | + | − |

Embodiment 1

FIG. 30 shows an example of an MMVD search process according to an embodiment of the present disclosure.

Considering a base candidate, a distance index, and a direction index, a motion search method in MMVD may be expressed as shown in FIG. 19. In particular, in the case of bi-prediction, a motion vector in an L1 direction may be derived using a mirroring scheme on an L0 motion vector.

Referring to FIG. 30, when an MMVD offset such as +s or +2s is applied to the motion vector for the L0 reference picture, mirroring may be applied to a L1 reference picture located in the temporally opposite direction from the L0 reference picture with respect to the current picture.

Considering two base candidates, eight MMVD length indexes, and four MMVD sign indexes by the signaling method used in MMVD, there are a total of 64 MVD candidates for motion vector refinement. This not only increases complexity of the encoder but it is also difficult to consider that a magnitude and direction of the motion vector are efficiently considered, so an embodiment of the present disclosure provides a method and apparatus for efficiently applying the MMVD technique.

In order to effectively signal the MVD in AMVP mode, an adaptive motion vector resolution (AMVR) technology is applied. When the magnitude of the motion vector is large, many bits are required for the signaling of the motion vector. Thus, in order to reduce required bits for transmission, an operation of down-scaling the MVD having a 1-integer pixel or 4-integer pixel to ¼ or ¹⁄₁₆ may be performed. If the AMVR index (imv_idx) is 0, the encoding apparatus 100 may signal the MVD without applying AMVR. If imv_idx is 1, the MVD of the 1-integer pixel may be scaled by ¼ and signaled. If imv_idx is 2, the MVD of the 4-integer pixel may be scaled by ¹⁄₁₆ and signaled.

Since the AMVR technology is an index reflecting the characteristics of motion for each image or block, in particular, the trend of the magnitude of motion, the embodiment of the present disclosure proposes a method to reduce index overhead of a distance table and improve compression performance by adaptively selecting a distance table in the MMVD using the imv_idx value.

TABLE 6

| | Distance IDX | | | |
| --- | --- | --- | --- | --- |
| | 0 | 1 | 2 | 3 |
| Pixel distance (Case 1) | 1/4-pel | 1/2-pel | 1-pel | 2-pel |
| Pixel distance (Case 2) | 1/2-pel | 1-pel | 2-pel | 4-pel |
| Pixel distance (Case 3) | 1-pel | 2-pel | 4-pel | 8-pel |

Table 6 shows a table of MMVD offset values for the MMVD length index according to this embodiment. According to Table 6, different MMVD offsets are allocated for respective MMVD length indices according to imv_idx. That is, in Case 1, imv_idx is 0 and the base motion vector may be adjusted by a distance of ¼-pel to 2-pel. Also, Case 2 is a case where imv_idx is 1, and a base motion vector may be adjusted by a distance of ½-pel to 4-pel. Finally, Case 3 is a case where imv_idx is 2, and a base motion vector may be adjusted by a distance of 1-pel to 8-pel. The number of candidates and the candidate values in the distance table described herein represent only one example, and other numbers or other values may be used.

Embodiment 2

In an embodiment, the AMVR index may be determined based on resolution of a motion vector difference (MVD) applied to a motion vector of a neighboring block related to a merge index. For example, the AMVR index may be determined based on AMVR information (AMVR index) of a spatial or temporal neighboring block used in the process of generating an merge candidate list or an MVP candidate list of the current block.

The AMVR mode is applied in the AMVP and is not used in a merge/skip mode. Accordingly, an AMVR index may be separately set in the merge/skip mode in order to determine a method for determining a length table based on the AMVR mode described above. That is, when the current block is in the merge/skip mode, the AMVR may be applied when configuring candidates for MMVD by setting and storing the AMVR index (imv_idx) of the neighboring block. In this case, since the coding apparatus performs context modeling using the imv_idx of the left or upper neighboring block in the parsing process, an AMAR index of a block to which the MMVD is applied may be named as a separate syntax element (e.g., imv_idc) to prevent imv_index of a neighboring block which is stored during a process of decoding the merge/skip mode-applied block from being applied to a parsing process, whereby the an AMAR index of the block to which the MMVD is applied may be distinguished from the AVMR index of the AMVP-applied block.

The following embodiment provides a method of storing an AMVR index (imv_idc) in the process of constructing an MVP candidate list for a block to which the merge/skip mode is applied. This is because, according to the MMVD, a base motion vector corresponding to a selected candidate among MVP candidates configured in a decoding process of a block to which the merge/skip mode is applied is adjusted. In the candidate list constructing process, the AMVR index may be set as follows according to the characteristics of the adjacent block (the resolution of the MVD or the AMVR index).

- For a spatially adjacent block, an AMVR index of the adjacent block is used.
- For a temporally adjacent block, a default value (e.g., 0) is used.
- For a neighboring block to which HMVP is applied, an AMVR index matched to candidates stored in an HMVP buffer is used, or a default value (e.g., 0) is always used in the case of an HMVP candidate.
- For pairwise candidates, if the candidates of the L0 motion vector (L0 block) and the L1 motion vector (L1 block) have the same AMVR index, a common AMVR index is used, and if the L0 motion vector (L0 block) and the L1 motion vector (L1 block) have different AMVR indices, a default value is used.

If the candidates of the L0 motion vector (L0 block) and the L1 motion vector (L1 block) have the same AMVR index, the corresponding AMVR index is used, and in other cases, the larger AMVR index value is used.

- For zero vectors, a default value (e.g., 0) is used.

It is natural that all of the methods described above may be applied, or only some thereof may be applied.

FIG. 31 shows an example of triangular prediction units according to an embodiment of the present disclosure.

In addition, by storing an AMVR index of an adjacent block when constructing a candidate list of the triangular mode, the AMVR index value may be propagated to the merge/skip mode thereafter. In this case, in the triangular mode, one coding unit (CU) may be divided into two triangular prediction units (PUs) as shown in FIGS. 20A and 20B, and prediction may be performed on each PU by uni-directional prediction. For each PU, a candidate list for uni-directional prediction may be configured in a manner similar to the general merge/skip mode. When the triangular mode is applied, since one CU includes two PUs (Cand0, Cand1), the AMVR index of the corresponding block (CU) may be determined by considering all the AMVR indices of the two blocks (PUs), which may be specifically as follows.

The AMVR index of Cand0 is used.
The AMVR index of Cand1 is used.
When the AMVR indexes of Cand0 and Cand1 are the same, a corresponding value is used.
If the AMVR indexes of Cand0 and Cand1 are different, a default value is used.
If the AMVR indexes of Cand0 and Cand1 are different, a larger value is used.

It goes without saying that all or some of the methods described above may be applied.

In addition, when constructing a candidate list of multi-hypothesis (M/H) mode, AMVR index values may be propagated to later merge/skip mode by storing AMVR indexes of adjacent blocks. In this case, the M/H mode is a technique in which intra prediction and inter prediction are combined in the merge/skip mode, and both the indexes for the intra mode and the merge mode are signaled. A candidate list is constructed in a manner similar to the general merge/skip mode, and when the M/H mode is applied, the AMVR index may be set for the corresponding block as follows.

In case of a spatially adjacent block, an AMVR index of the adjacent block is used.
In case of a temporally adjacent block, a default value (e.g., 0) is used.
In case of an HMVP candidate, i) an AMVR index matching the candidates stored in the HMVP buffer is used or ii) a default value (e.g., 0) is always used.
In case of pair-wise candidates, i) if the L0 candidate (L0 block) and the L1 candidate (L1 block) have the same AMVR index, a common AMVR index is used, otherwise a default value (e.g., 0)) is used, or ii) when the L0 candidate (L0 block) and the L1 candidate (L1 block) have the same AMVR index, the common AMVR index is used, and in other cases, the larger of the two AMVR indexes is used.
For a zero vector, the default value (e.g., 0) is used.

It is natural that all or some of the methods described above may be applied.

According to an embodiment of the present invention, the AMVR index may be updated based on the MMVD length (offset). In addition, the updated AMVR index may be reused as an AMVR index of at least one block processed after the current block. The AMVR index of the base motion vector for MMVD may be derived using the method described above, and a distance of the motion vector for refinement may be determined by selecting a MMVD length table based on the derived AMVR index. However, even if the MMVD length table is selected based on the AMVR index of the base motion vector, a distance value such as 1-pel or 4-pel may be selected from among the candidates in the table, so the AMVR index may be updated based on the length selected in the MMVD process. This is because the MMVD length also plays a role of the AMVR. Accordingly, the AMVR index may be updated according to the selected MMVD length as shown in Table 7 below.

TABLE 7

```
if(distance >= 4-pel)
    imv_idc = 2;
else if (distance >= 1-pel)
    imv_idc = 1;
else
    imv_idc = 0;
```

That is, if the MMVD length is determined to be 4-pel or 8-pel, it may be updated to 2 even if the AMVR index of the base motion vector is 0 because it is similar to the AMVR index (imv_idc) 2. In addition, if the MMVD distance is determined to be a value of 1-pel or greater, it may be updated to 1 because it is similar to the AMVR index (imv_idc) 1.

That is, if the MMVD offset is greater than or equal to a threshold, the AMVR index is determined to indicate a first MMVD set, and if the magnitude of the MMVD offset is smaller than the threshold, the MMVD range index is determined to indicate a second MMVD set, and the first MMVD set has a larger value than an MMVD offset of the second MMVD set with respect to a same MMVD length index.

Embodiment 3

The magnitude of the x and y values of the base motion vector of the MMVD may have an effect similar to the AMVR of the block in inducing a distance for refinement. In addition, even if the AMVR index is not applied, there is an advantage that it does not depend on other tools. Accordingly, this embodiment provides a method for determining an MMVD length table according to a value of the base motion vector. Table 8 below, as another example of a table indicating the relationship between the MMVD length index and the MMVD offset values, shows a method of determining an MMVD length table according to a value of the base motion vector.

TABLE 8

|  | Distance IDX | | | |
| --- | --- | --- | --- | --- |
|  | 0 | 1 | 2 | 3 |
| Pixel distance(CASE 1) | 1-pel | 2-pel | 4-pel | 8-pel |
| Pixel distance(CASE 2) | 1/2-pel | 1-pel | 2-pel | 4-pel |
| Pixel distance(CASE 3) | 1/4-pel | 1/2-pel | 1-pel | 2-pel |

Case 1 has the following conditions.
When bi-prediction is applied and a motion vector in 4-pel units is used
(L0_x % 16==0 && L0_y % 16==0 && L1_x % 16==0 && L1_y % 16==0)
When uni-directional prediction is applied and a motion vector in 4-pel units is used
(LX_x % 16==0 && LX_y % 16==0, X=0, 1)
If the conditions of Case 1 are satisfied, it is refined to a distance of 1-pel to 8-pel.
If Case 1 is not satisfied, the conditions for Case 2 are as follows.

When bi-prediction is applied and a motion vector in 1-pel units is used
(L0_x % 4==0 && L0_y % 4==0 && L1_x % 4==0 && L1_y % 4==0)
When uni-directional prediction is applied and a motion vector of 1-pel units is used
(LX_x % 4==0 && LX_y % 4==0, X=0, 1)
If the conditions of Case 2 are satisfied, it is refined to a distance of ½-pel to 4-pel.

When Case 1 and Case 2 are not satisfied, it may be refined to a distance of ¼-pel to 2-pel corresponding to Case 3. The number of candidates and candidate values in the distance table described in this disclosure are merely examples, and other numbers or other values may be applied.

The Cases 1 to 3 described above may be modified and applied as follows. That is, it may be determined that the condition is satisfied if even one direction among the candidates to which the bi-prediction is applied has a motion vector in 4-pel or 1-pel units as shown in the following condition.

For example, the conditions of Case 1 may be as follows.
When bi-prediction is applied and a motion vector in 4-pel units is used
((L0_x % 16==0 && L0_y % 16==0)||(L1_x % 16==0 && L1_y % 16==0))
When uni-directional prediction is applied and a motion vector in 4-pel units is used
(LX_x % 16==0 && LX_y % 16==0, X=0, 1)
If the conditions of Case 1 are satisfied, it is refined to a distance of 1-pel to 8-pel.

If Case 1 is not satisfied, the conditions for Case 2 are as follows.
When bi-prediction is applied and a motion vector in 1-pel units is used
(((L0_x % 4==0 && L0_y % 4==0)||(L1_x % 4==0 && L1_y % 4==0))
When uni-directional prediction is applied and a motion vector of 1-pel eye is used
(LX_x % 4==0 && LX_y % 4==0, X=0, 1)
If the conditions of Case 2 are satisfied, it is refined to a distance of ½-pel to 4-pel.

This embodiment may be applied when AMVR is not used, or may be used regardless of whether AMVR is applied. In addition, when AMVR is applied (imv_dic=1, 2), the MMVD length table is determined according to the AMVR index, and when AMVR is not applied (imv_idc=0), the MMVD length table may be determined based on a pixel unit of the motion vector as in the present embodiment.

That is, the range of the MMVD offset applied to the motion vector may be determined based the AMVR index and on resolution of position coordinates indicated by the base motion vector. For example, when the AMVR index is 0, the range of the MMVD offset applied to the motion vector for prediction of the current block may be determined based on the position coordinates indicated by the motion vector. Here, the position coordinates may include a horizontal position (x-coordinate) and/or a vertical position (y-coordinate) from an arbitrary position (e.g., a position of a top-left pixel) in a picture or block.

Embodiment 4

According to an embodiment of the present disclosure, a size of the current block may be considered in the process of applying the MMVD by reflecting the characteristics of the current block. A table for the MMVD offset value may be determined in consideration of at least one of the AMVR mode, the magnitude of the x and y values of the base motion vector, and the size of the current block.

That is, the range of the MMVD offset applied to the motion vector may be determined based on the AMVR index and the size of the current block. For example, the following method may be considered.

When the AMVR index (imv_idc) is 0 and w×h>256 (hereinafter, w is a width of the current block and h is a height of the current block), the MMVD length table of {2, 4, 8, 16} is used, otherwise Table 6 or Table 8 is used.

When AMVR index is 0 and w>16 && h>16, the MMVD length table of {2, 4, 8, 16} is used, otherwise Table 6 or Table 8 is used.

When the AMVR index is greater than 0 and w×h>256, the MMVD length table of {2, 4, 8, 16} is used, otherwise Table 6 or Table 8 is used.

When the AMVR index is greater than 0 and w>16 && h>16, the MMVD length table of {2, 4, 8, 16} is used, otherwise Table 6 or Table 8 is used.

Here, a threshold to be compared with the used block size may be changed, and width and height may be simultaneously considered, or width×height may be considered. Also, it goes without saying that the AMVR index and/or the base motion vector are considered together.

Embodiment 5

In an embodiment of the present disclosure, a MMVD candidate set may be determined based on the magnitude (the horizontal (x) magnitude and/or the vertical (y) magnitude) of the base motion vector of the MMVD. The magnitude of the x and y values of the base motion vector of the MMVD may be used to derive an effect similar to that of the AMVR in deriving a distance for MMVD refinement.

TABLE 9

|  | Distance IDX | | | |
| --- | --- | --- | --- | --- |
|  | 0 | 1 | 2 | 3 |
| Pixel distance(CASE 1) | 1-pel | 2-pel | 4-pel | 8-pel |
| Pixel distance(CASE 2) | 1/2-pel | 1-pel | 2-pel | 4-pel |
| Pixel distance(CASE 3) | 1/4-pel | 1/2-pel | 1-pel | 2-pel |

Table 9 shows an example of a case in which different distance tables are allocated according to x and y values of a base motion vector according to an embodiment of the present disclosure.

FIG. 32 shows an example of a flowchart for determining an MMVD candidate set based on a magnitude of a motion vector according to an embodiment of the present disclosure.

As shown in FIG. 32, when the motion vector MV is greater than a first threshold T1, the first MMVD candidate set (1-pel, 2-pel, 4-pel, 8-pel) corresponding to Case 1 may be used. If the motion vector MV is equal to or less than the first threshold T1 and greater than a second threshold T2, the second MMVD candidate set (½-pel, 1-pel, 2-pel, 4-pel) corresponding to Case 2 may be used. If the motion vector MV is smaller than the second threshold T2, the third MMVD candidate set (¼-pel, ½-pel, 1-pel, 2-pel) corresponding to Case 3 may be used.

As an example, the first threshold T1 and the second threshold T2 may be set as follows, and various values may be used according to implementation.

T1=128 (128 (8-pel) when 1/16 precision is applied, and 64 (8-pel) when 1/4 precision is applied)

T2=16 (16 (1-pel) when 1/16 precision is applied, 4 (1-pel) when 1/4 precision is applied)

A description of the comparison between the motion vector MV and the first threshold T1 or the second threshold T2 is as follows. When bi-prediction is used, both x and y of the L0 and L1 motion vectors may be considered as follows.

(L0_x>T1 && L0_y>T1 && L1_x>T1 && L1_y>T1)

L0_x represents a horizontal magnitude (x value) of a motion vector with respect to the first prediction direction L0, L0_y represents a vertical magnitude (y value) of the motion vector with respect to the first prediction direction L0, L1_x represents a horizontal magnitude (x value) of a motion vector with respect to the second prediction direction L1, and L1_y denotes a vertical magnitude (y value) of a motion vector with respect to the second prediction direction L1.

When uni-directional prediction (LX, X=0, 1) is applied, x, y values of the base motion vector may be considered.

(LX_x>T1 && LX_y>T1)

LX_x represents the horizontal magnitude (x value) of the motion vector for the first or second prediction direction (LX, X=0, 1), and LX_y represents the vertical magnitude (y value) of the motion vector for the first or second prediction direction (LX, X=0, 1).

In addition, when bi-prediction is applied, L0 or L1 motion vector may be considered and may be expressed as follows.

(L0_x>T1 && L0_y>T1)||(L1_x>T1 && L1_y>T1)

Similarly, when uni-directional prediction (LX, X=0, 1) is applied, the x, y values of the base motion vector may be considered.

(LX_x>T1 && LX_y>T1)

In addition, when bi-prediction is applied, the x or y value of each of the L0 or L1 direction motion vector may be considered.

L0_x>T1||L0_y>T1||L1_x>T1||L1_y>T1

Similarly, when uni-directional prediction (LX, X=0, 1) is applied, the x or y value of the base motion vector may be considered.

LX_x>T1||LX_y>T1

Embodiment 6

FIGS. 33 and 34 show examples of flowcharts for determining an MMVD candidate set based on a block size and a size of a motion vector according to an embodiment of the present disclosure.

In an embodiment of the present disclosure, an MMVD candidate set may be determined based on a magnitude (a horizontal (x) magnitude and/or a vertical (y) magnitude) and a block size of the base motion vector of the MMVD.

TABLE 10

|  | Distance IDX | | | |
| --- | --- | --- | --- | --- |
|  | 0 | 1 | 2 | 3 |
| Pixel distance(CASE 1) | 1-pel | 2-pel | 4-pel | 8-pel |
| Pixel distance(CASE 2) | 1/2-pel | 1-pel | 2-pel | 4-pel |
| Pixel distance(CASE 3) | 1/4-pel | 1/2-pel | 1-pel | 2-pel |

Table 10 shows an example of a case in which different distance tables are allocated according to the magnitude of the base motion vector and the block size according to the present embodiment. Cases according to the base motion vector and block size may be expressed as shown in FIGS. 33 and 34.

According to FIG. 33, when the base motion vector MV is greater than the first threshold T1, if the block size BS is greater than a first block size threshold BS_T1, a first MMVD candidate set (1-pel, 2-pel, 4-pel, and 8-pel) corresponding to Case 1 may be used, and if the block size BS is less than or equal to the first block size threshold BS_T1, a third MMVD candidate set (1/4-pel, 1/2-pel, 1-pel, 2-pel) corresponding to Case 3 may be used.

Also, when the base motion vector MV is less than or equal to the first threshold T1 and greater than a second threshold T2, if the block size BS is greater than the second block size threshold BS_T2, the second MMVD candidate set (1/2-pel, 1-pel, 2-pel, 4-pel) corresponding to Case 2 may be used, and if the block size BS is smaller than or equal to the second block size threshold BS_T2, a third MMVD candidate set (1/4-pel, 1/2-pel, 1-pel, 2-pel) corresponding to Case 3 may be used. When the base motion vector MV is less than or equal to the second threshold T2, the third MMVD candidate set (1/4-pel, 1/2-pel, 1-pel, 2-pel) corresponding to Case 3 may be used.

According to FIG. 34, when the base motion vector MV is greater than the first threshold T1, if the block size BS is greater than the first block size threshold BS_T1, the first MMVD candidate set (1-pel, 2-pel, 4-pel, 8-pel) corresponding to Case 1 may be used, and if the block size BS is less than or equal to the first block size threshold BS_T1, the second MMVD candidate set (1/2-pel, 1-pel, 2-pel, 4-pel) corresponding to Case 2 may be used.

Also, when the base motion vector MV is less than or equal to the first threshold T1 and greater than the second threshold T2, if the block size BS is greater than the second block size threshold BS_T2, the second MMVD candidate set (1/2-pel, 1-pel, 2-pel, 4-pel) corresponding to Case 2 may be used, and if the block size BS is smaller than or equal to the second block size threshold BS_T2, the third MMVD candidate set (1/4-pel, 1/2-pel, 1-pel, 2-pel) corresponding to Case 3 may be used. When the base motion vector MV is less than or equal to the second threshold T2, the third MMVD candidate set (1/4-pel, 1/2-pel, 1-pel, 2-pel) corresponding to Case 3 may be used.

In this case, the first threshold T1 and the second threshold T2 may be set as follows, and various values may be used according to implementation.

T1=128 (128 (8-pel) when 1/16 precision is applied, and 64 (8-pel) when 1/4 precision is applied)

T2=16 (16 (1-pel) when 1/16 precision is applied, and 4 (1-pel) when 1/4 precision is applied)

Also, the first and second block size thresholds BS_T1 and T2 may be set as follows, but this is only an example and may be changed.

BS_T1=32
BS_T2=16

A description of the comparison between the motion vector MV and the first threshold T1 or the second threshold T2 is as follows. When bi-prediction is used, both x and y of the L0 and L1 motion vectors may be considered as follows.

(L0_x>T1 && L0_y>T1 && L1_x>T1 && L1_y>T1)

L0_x represents a horizontal magnitude (x value) of the motion vector with respect to the first prediction direction (L0), L0_y represents a vertical magnitude (y value) of the motion vector with respect to the first prediction direction (L0), L1_x represents a horizontal magnitude (x value) of a motion vector with respect to the second prediction direction L1, and L1_y represents a vertical magnitude (y value) of a motion vector with respect to the second prediction direction L1.

When uni-directional prediction (LX, X=0, 1) is applied, x, y values of the base motion vector may be considered.

(LX_x>T1 && LX_y>T1)

LX_x is a horizontal magnitude (x value) of the motion vector for the first or second prediction direction (LX, X=0, 1), and LX_y is a vertical magnitude (y value) of the motion vector the first or second prediction direction (LX, X=0, 1).

In addition, when bi-prediction is applied, L0 or L1 motion vector may be considered, and may be expressed as follows.

(L0_x>T1 && L0_y>T1)||(L1_x>T1 && L1_y>T1)

Similarly, when uni-directional prediction (LX, X=0, 1) is applied, x, y values of the base motion vector may be considered.

(LX_x>T1 && LX_y>T1)

Also, when bi-prediction is applied, the x or y value of each of the L0 or L1 direction motion vectors may be considered.

L0_x>T1||L0_y>T1||L1_x>T1||L1_y>T1

Similarly, when uni-directional prediction (LX, X=0, 1) is applied, the x or y value of the base motion vector may be considered.

LX_x>T1||LX_y>T1

As in the present embodiment, a bit length of the MMVD length index may be reduced by determining the MMVD candidate set based on the size of the motion vector and the block size.

Embodiment 7

FIG. 35 shows an example of a flowchart for determining an MMVD candidate set based on resolution of a motion vector according to an embodiment of the present disclosure.

According to an embodiment of the present disclosure, the MMVD candidate set may be determined based on pixel resolution of coordinates indicated by the motion vector.

TABLE 11

|  | Distance IDX | | | |
| --- | --- | --- | --- | --- |
|  | 0 | 1 | 2 | 3 |
| Pixel distance(CASE 1) | 1-pel | 2-pel | 4-pel | 8-pel |
| Pixel distance(CASE 2) | 1/2-pel | 1-pel | 2-pel | 4-pel |
| Pixel distance(CASE 3) | 1/4-pel | 1/2-pel | 1-pel | 2-pel |

Table 11 shows an example of a distance table based on resolution of the coordinates indicated by the motion vector.

According to FIG. 35, when the motion vector is not 0, if the motion vector has a resolution of a 4-pel unit (MV % 64=0), the first MMVD candidate set (1-pel, 2-pel, 4-pel, 8-pel) corresponding to Case 1 may be used, and if the motion vector does not have a resolution of the 4-pel unit (MV % 64 !=0) and the motion vector has a resolution of a 1-pel unit (MV % 16)==0), the second MMVD candidate set (½-pel, 1-pel, 2-pel, 4-pel) corresponding to Case 2 may be used. In other cases, the third MMVD candidate set (¼-pel, ½-pel, 1-pel, 2-pel) corresponding to Case 3 may be used.

Here, the case in which the motion vector is not 0 may be determined as follows. The following is an example of a case where the base motion vector is bi-prediction, and a similar method may be applied to uni-directional prediction.

L0_x !=0 && L0_y !=0 && L1_x !=0 && L1_y !=0 or,
(L0_x !=0 && L0_y !=0)||(L1_x !=0 && L1_y !=0) or,
L0_x !=0||L0_y !=0||L1_x !=0||L1_y !=0

A method for determining whether a motion vector has a resolution of the 4-pel unit may be as follows. Following is an example of a case where the base motion vector is bi-prediction, and a similar method may be used even when uni-directional prediction is applied.

L0_x % 64==0 && L0_y % 64==0 && L1_x % 64==0 && L1_y % 64==0 or,
(L0_x %64==0 && L0_y % 64==0)||(L1_x % 64==0 && L1_y % 64==0) or,
(L0_x % 64==0)||(L0_y % 64==0)||(L1_x % 64==0)|| (L1_y % 64==0)

Here, 64 and 16 may be applied when the motion vector has a precision of 1/16 and correspond to the precision of 4-pel and 1-pel, respectively, in reality (e.g., versatile video coding system). However, this is only an example and the base motion vector may vary depending on a video processing system.

As in the present embodiment, a bit length of the MMVD length index may be reduced by determining the MMVD candidate set based on the resolution of the pixel indicated by the motion vector.

Embodiment 8

FIGS. 36 and 37 show examples of a flowchart for determining an MMVD candidate set based on a magnitude and resolution of a motion vector according to an embodiment of the present disclosure.

According to an embodiment of the present disclosure, an MMVD candidate set may be determined based on a magnitude of a motion vector and resolution of pixel coordinates indicated by resolution of the motion vector. The MMVD distance table may be determined as follows by considering the magnitudes of the x and y values of the base motion vector of the MMVD and the motion vector resolution.

TABLE 12

|  | Distance IDX | | | |
| --- | --- | --- | --- | --- |
|  | 0 | 1 | 2 | 3 |
| Pixel distance(CASE 1) | 1-pel | 2-pel | 4-pel | 8-pel |
| Pixel distance(CASE 2) | 1/2-pel | 1-pel | 2-pel | 4-pel |
| Pixel distance(CASE 3) | 1/4-pel | 1/2-pel | 1-pel | 2-pel |

Table 12 shows an example of a case in which different distance tables are allocated according to a magnitude of a base motion vector and resolution of the base motion vector. A case according to the base motion vector value and the resolution may be set as shown in FIG. 36 or FIG. 37.

According to FIG. 36, when the motion vector MV is greater than the first threshold T1, if the motion vector has a resolution of a 2-pel unit (MV % 32==0), the first MMVD candidate set (1-pel, 2-pel, 4-pel, 8-pel) corresponding to Case 1 may be used, otherwise (MV % 32 !=0) the third MMVD candidate set (¼-pel, (½-pel, 1-pel, 2-pel) corresponding to Case 3 may be used. Also, when the motion vector MV is less than or equal to the first threshold T1 and greater than the second threshold T2, if it has a resolution of 1-pel unit (MV % 16==0), the second MMVD candidate set (½-pel, 1-pel, 2-pel, 4-pel) corresponding to Case 2 may be used, otherwise (MV % !=16) the third MMVD candidate set corresponding to Case 3 may be used. When the motion vector MV is less than or equal to the second threshold T2, the third MMVD candidate set (¼-pel, (½-pel, 1-pel, 2-pel) corresponding to Case 3 may be used.

According to FIG. 37, when the motion vector MV is greater than the first threshold T1, if the motion vector has a resolution of a 2-pel unit (MV % 32==0), the first MMVD candidate set (1-pel, 2-pel, 4-pel, 8-pel) corresponding to Case 1 may be used, otherwise (MV % 32 !=0) the second MMVD candidate set (½-pel, 1-pel, 2-pel, 4-pel) corresponding to Case 2 may be used. In addition, when the motion vector MV is less than or equal to the first threshold T1 and greater than the second threshold T2, if the motion vector MV has a resolution of a 1-pel unit (MV % 16==0), the second MMVD candidate set (½-pel, 1-pel, 2-pel, 4-pel) corresponding to Case 2 may be used, otherwise (MV % !=16), the third MMVD candidate set corresponding to Case 3 may be used. When the motion vector (MV) is less than or equal to the second threshold T2, the third MMVD candidate set (¼-pel, (½-pel, 1-pel, 2-pel)) corresponding to Case 3 may be used.

In this case, the first threshold T1 and the second threshold T2 may be set as follows, and various values may be used according to implementation.

T1=128 (128 (8-pel) when 1/16 precision is applied, and 64 (8-pel) when ¼ precision is applied)

T2=16 (16 (1-pel) when 1/16 precision is applied, and 4 (1-pel) when ¼ precision is applied)

Here, the thresholds 32 and 16 for the motion vector resolution may be applied when the motion vector has a precision of 1/16, and actually mean that they have precisions of 2-pel and 1-pel, respectively, but this is only an example, and the values may vary.

As in the present embodiment, a bit length of the MMVD length index may be reduced by determining the MMVD candidate set based on the magnitude and resolution of the motion vector.

Embodiment 9

This embodiment may be performed in a decoding process of a video signal by the decoding apparatus 200, and may also be performed in an encoding process by the encoding apparatus 100 in a range corresponding to the decoding operation.

In the affine merge, motion vectors at respective control points CP0, CP1, CP2, and CP3 may be derived using adjacent blocks of a current block as shown in FIG. 25. An MMVD may be applied to a specific candidate included in the affine merge candidate list. In this case, a specific candidate may be a first candidate present in the candidate list, and when a base MV is indexed in the MMVD, some of the candidates present in the candidate list may become a target. In addition, ATMVP may be a target as the affine candidate is processed in a subblock decoding process, but it is possible to target a candidate except this.

Embodiment 10

This embodiment may be performed in the decoding process of the video signal by the decoding apparatus 200, and may also be performed in the encoding process by the encoding apparatus 100 in a range corresponding to the decoding operation.

FIGS. 38 and 39 show examples of applying an offset to each control point in an affine merge mode according to an embodiment of the present disclosure.

When MMVD is applied in affine merge, a direction offset at each control point may be determined to be different from each other as shown in FIG. 38. If a same directional offset is applied to all control points, only the translation characteristics may be refined as shown in FIG. 38, and thus, in order to improve this, different directional offsets may be applied to respective control points.

FIG. 39 shows an example in which different offsets are applied to respective control points, and shrink, enlarge, left rotation, and right rotation of a motion vector may be made by applying different offsets to respective control points.

In order to apply the offset as shown in FIG. 39, the MMVD direction index may be signaled as shown in Table 13 below.

TABLE 13

|     |   | shrink 00 | enlarge 01 | Left rotation 10 | Right rotation 11 |
|-----|---|-----------|------------|------------------|-------------------|
| CP0 | x | +1        | −1         | 0                | 0                 |
|     | y | 0         | 0          | +1               | −1                |
| CP1 | x | 0         | 0          | −1               | +1                |
|     | y | +1        | −1         | 0                | 0                 |
| CP2 | x | 0         | 0          | +1               | −1                |
|     | y | −1        | +1         | 0                | 0                 |

Also, a same offset may be applied to all control points, and in this case, the MMVD direction index may be signaled as shown in Table 14.

TABLE 14

|            |   | 000       | 001        | 010              | 011               |
|------------|---|-----------|------------|------------------|-------------------|
| CP0 CP1 CP2 | x | +1     | −1         | 0                | 0                 |
|            | y | 0         | 0          | +1               | −1                |

|     |   | shrink 100 | enlarge 101 | Left rotation 110 | Right rotation 111 |
|-----|---|------------|-------------|-------------------|--------------------|
| CP0 | x | +1         | −1          | 0                 | 0                  |
|     | y | 0          | 0           | +1                | −1                 |
| CP1 | x | 0          | 0           | −1                | +1                 |
|     | y | +1         | −1          | 0                 | 0                  |
| CP2 | x | 0          | 0           | +1                | −1                 |
|     | y | −1         | +1          | 0                 | 0                  |

That is, the coding apparatus (the encoding apparatus 100 or the decoding apparatus 200) may add a first offset value (e.g., +1 or −1) to at least one of a horizontal component (e.g., x value) or a vertical component (e.g., y value) of a first control point motion vector (e.g., CPMV0) based on the MMVD direction index and add a second offset value (e.g., +1 or −1) to at least one of a horizontal component (e.g., x value) or a vertical component (e.g., y value) of a second control point motion vector (e.g., CPMV1) based on the MMVD distance index. For example, as shown in Table 12 or Table 13, an offset value may be added to the x component or the y component of each control point motion vector according to the MMVD distance index. By refining the motion vector for each control point according to the MMVD direction index, a motion of an object may be expressed more precisely in the affine merge mode.

Embodiment 11

This embodiment may be performed in the decoding process of the video signal by the decoding apparatus 200, and may also be performed in the encoding process by the encoding apparatus 100 in a range corresponding to the decoding operation.

When applying MMVD to affine merge, MMVD distances (offsets) at respective control points may be set to be different from each other. It is possible to equally apply the embodiments and combinations of embodiments described above to affine, and may be applied as follows. It goes without saying that the following methods re equally applied to merge and affine merge.

The distance for affine may be defined as shown in Table 15 below, and it is natural that the numbers and values of candidates for the distance are changed.

TABLE 15

| | Distance IDX | | | | |
|---|---|---|---|---|---|
| | 0 | 1 | 2 | 3 | 4 |
| Distance-offset | ½-pel | 1-pel | 2-pel | 4-pel | 8-pel |

That is, the coding apparatus adds the offset value to at least one of the components of the plurality of control point motion vectors, and here, the offset value may be determined based on an MMVD distance index related to the magnitude of the at least one offset. For example, a magnitude of an offset applied to at least one of the respective control point motion vectors may be determined according to a distance index (MMVD distance index) as shown in Table 15. That is, the MMVD distance index may indicate one of a plurality of pre-defined candidate offset values (e.g., ½-pel, 1-pel, 2-pel, 4-pel, 8-pel). By adjusting the magnitude of the motion vector for each control point using the MMVD distance index, a motion of the object may be more precisely expressed in the affine merge mode.

A distance offset may be scaled as shown in Table 16 below in consideration of a motion size and a block size of the base MV, and a shift value may be adjusted according to the number and value of distance candidates.

TABLE 16

| if (MV ≥ 128 && W > 32 && H > 32) | Distance-offset <<= 1; |
|---|---|
| else if (MV ≥ 16) | Distance-offset = Distance-offset; |
| else | Distance-offset >>= 1; |

In addition, the distance offset may be scaled as shown in Table 17 below in consideration of resolution of the base MV, and the shift value may be adjusted according to the number and value of distance candidates.

TABLE 17

| if ((MV % 32) == 0) | Distance-offset <<= 1; |
|---|---|
| else if ((MV % 16) == 0) | Distance-offset = Distance-offset; |
| else | Distance-offset >>= 1; |

That is, the coding apparatus may scale the offset value corresponding to the MMVD distance index, and add the scaled offset value to at least one of the components of the plurality of control point motion vectors. For example, as shown in Table 15, the coding apparatus may scale the offset value based on the size of the current block or the magnitude of at least one of control point motion vectors. Also, as shown in Table 16, the coding apparatus may scale the offset value based on the pixel-wise resolution of at least one of the control point motion vectors. By adjusting the magnitude of the motion vector for each control point based on at least one of the magnitude of the motion vector, the resolution of the motion vector, and the block size, the motion of the object may be more precisely expressed in the affine merge mode.

FIG. 40 shows an example of a flowchart for processing a video signal according to an embodiment of the present disclosure. The operations of FIG. 40 may be performed by the inter predictor 180 of the encoding apparatus 100, the inter predictor 260 of the decoding apparatus 200, or the processor 510 of the video signal processing apparatus 500. The following operations are collectively referred to as being performed by a coding apparatus.

In step S4010, with respect to a current block which derives a parameter for subblock-based inter prediction from at least one neighboring block, the coding apparatus obtains a merge subblock index for the current block. Here, the merge subblock index is an index indicating one candidate in the subblock-based merge candidate list. The subblock-based inter prediction may be referred to as affine prediction, and the merge subblock index is an index indicating one of the candidates included in the affine merge candidate list constructed by the procedure of FIG. 22.

In step S4020, the coding apparatus obtains a plurality of control point motion vectors for a plurality of control points of the current block based on the merge subblock index. According to the embodiment of the present disclosure, the control points of the current block may be two (4-parameter model) or three (6-parameter model) as shown in FIG. 20 FIGS. 20A and 20B.

In step S4030, the coding apparatus applies at least one offset to the plurality of control point motion vectors based on the MMVD distance index for refinement of the plurality of control point motion vectors.

In an embodiment, the coding apparatus may add a first offset value (e.g., +1 or −1) to at least one of a horizontal component (e.g., v0x) or a vertical component (e.g., v0y) of the first control point motion vector (e.g., CPMV0) based on the MMVD distance index and add a second offset value (e.g., +1 or −1) to at least one of a horizontal component (e.g., v1x) or vertical component (e.g., v1y) of the second control point motion vector (e.g., CPMV1) based on the MMVD direction index. In addition, when the number of control point motion vectors is 3 (6-parameter model), the coding apparatus may add a third offset value (e.g., +1 or −1) to at least one of a horizontal component (e.g., v2x) or a vertical component (e.g., v2y) of the third control point motion vector (e.g., CPMV2) based on the MMVD direction index. For example, as shown in Table 12 or Table 13, an offset value may be added to the x component or the y component of each control point motion vector according to the MMVD direction index.

In an embodiment, the coding apparatus may add an offset value to at least one of the components of the plurality of control point motion vectors, and here, the offset value may be determined based on an MMVD distance index related to a magnitude of the at least one offset. For example, the magnitude of the offset applied to at least one of the respective control point motion vectors may be determined according to the distance index (MMVD distance index) as shown in Table 14. That is, the MMVD distance index may indicate one of a plurality of pre-defined candidate offset values (e.g., ½-pel, 1-pel, 2-pel, 4-pel, 8-pel).

In an embodiment, the coding apparatus may scale an offset value corresponding to the MMVD distance index, and add the scaled offset value to at least one of the components of the plurality of control point motion vectors. For example, as shown in Table 15, the coding apparatus may scale the offset value based on the size of the current block or the magnitude of at least one of control point motion vectors. Also, as shown in Table 16, the coding apparatus may scale the offset value based on the pixel-wise resolution of at least one of the control point motion vectors.

In step S4040, the coding apparatus determines a motion vector for each of the subblocks based on the plurality of control point motion vectors to which at least one offset is applied and a position of each of the subblocks in the current block. The subblocks of the current block may be configured as shown in FIG. 21, and a motion vector of each subblock may be derived by Equation 1 or 2.

In step S4050, the coding apparatus generates a prediction sample of the current block based on a motion vector for each of the subblocks and a reference picture related to the subblock merge index.

The decoding apparatus and the encoding apparatus to which the disclosure is applied may be included in a digital device. The term "digital device" includes all digital devices capable of performing at least one of transmission, reception, processing, and output, for example, of data, content, and services. Here, processing of data, content, service, etc. By a digital device includes an operation of encoding and/or decoding data, content, service, and the like. The digital device is paired or connected (hereinafter referred to as 'pairing') with other digital devices, external servers, etc. Through a wired/wireless network to transmit and receive data, and converts it if necessary.

The digital device includes, for example, a fixed device (or a standing device) such as a network TV, an HBBTV (Hybrid Broadcast Broadband TV), a smart TV, an IPTV (internet protocol television), a PC, etc. And a mobile device (or a handheld device) such as a PDA (Personal Digital Assistant), a smart phone, a tablet PC, a laptop. In the disclosure described later, for convenience, FIG. 44 shows and describes a digital TV as an embodiment for the digital device and FIG. 43 shows and describes a mobile device as an embodiment of the digital device.

Meanwhile, the term "wired/wireless network" described herein refers to a communication network that supports various communication standards or protocols for interconnection and/or data transmission and reception between digital devices or between digital devices and external servers. These wired/wireless networks may include both current and future supported communication networks and communication protocols for them, and may be formed by a communication standard or protocols for wired connection, such as USB (Universal Serial Bus), CVBS (Composite Video Banking Sync), Component, S-Video (Analog), DVI (Digital Visual Interface), HDMI (High Definition Multimedia Interface), RGB, D-SUB and the like and formed by a communication standards for wireless connection such as Bluetooth, Radio Frequency Identification (RFID), Infrared Data Association (IrDA), Ultra Wideband (UWB), ZigBee, Digital Living Network Alliance (DLNA), Wireless LAN (WLAN) (Wi-Fi)), Wibro (Wireless broadband), Wimax (World Interoperability for Microwave Access), HSDPA (High Speed Down-link Packet Access), LTE (Long Term Evolution), Wi-Fi Direct (Direct), etc.

Hereinafter, in the case of simply referring to a digital device in the disclosure, it may mean a fixed device or a mobile device or include both depending on context.

That is, the coding apparatus may scale the offset value corresponding to the MMVD distance index, and add the scaled offset value to at least one of the components of the plurality of control point motion vectors. For example, as shown in Table 15, the coding apparatus may scale the offset value based on the size of the current block or the magnitude of at least one of control point motion vectors. Also, as shown in Table 16, the coding apparatus may scale the offset value based on the pixel-wise resolution of at least one of the control point motion vectors. By adjusting the magnitude of the motion vector for each control point based on at least one of the motion vector size, the motion vector resolution, and the block size, the motion of the object may be more accurately expressed in the affine merge mode.

Bitstream

Encoded information (eg, encoded video/image information) derived by the encoding apparatus based on the above-described embodiments of the present specification may be output in the form of a bitstream. The encoded information may be transmitted or stored in a network abstraction layer (NAL) unit in the form of a bitstream. The bitstream may be transmitted over a network or may be stored in a (non-transitory) digital storage medium. Also, as described above, the bitstream is not directly transmitted from the encoding apparatus to the decoding apparatus, but may be streamed/downloaded through an external server (eg, a content streaming server). Here, the network may include a broadcasting network and/or a communication network, and the digital storage medium may include various storage media such as USB, SD, CD, DVD, Blu-ray, HDD, and SSD.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method for processing a video signal using inter prediction, the method comprising:
    obtaining a merge subblock index for a current block for which a parameter for subblock-based inter prediction is derived from at least one neighboring block, wherein the merge subblock index is related to one candidate in a subblock-based merge candidate list;
    obtaining a plurality of control point motion vectors for a plurality of control points of the current block based on the merge subblock index;
    applying at least one offset to the plurality of control point motion vectors based on a merge with motion vector difference (MMVD) direction index for refinement of the plurality of control point motion vectors;
    determining a motion vector for each of subblocks of the current block based on a plurality of control point motion vectors to which the at least one offset is applied and a position of each of the subblocks within the current block; and
    generating a prediction sample of the current block based on the motion vector for each of the subblocks and a reference picture related to the merge subblock index.

2. The method of claim 1, wherein the applying of at least one offset to the plurality of control point motion vectors comprises:
    adding a first offset value to at least one of a horizontal component or a vertical component of a first control point motion vector based on the MMVD direction index; and
    adding a second offset value to at least one of a horizontal component or a vertical component of a second control point motion vector based on the MMVD direction index, when the number of the control point motion vectors is 2, wherein the applying of at least one offset to the plurality of control point motion vectors further comprises:
when the number of the control point motion vectors is 3, adding the second offset value to at least one of the horizontal component or the vertical component of the second control point motion vector based on the MMVD direction index, and adding a third offset value to at least one of a horizontal component or a vertical component of a third control point motion vector based on the MMVD direction index.

3. The method of claim 1, wherein the applying of at least one offset to the plurality of control point motion vectors comprises:
adding an offset value to at least one of components of the plurality of control point motion vectors,
wherein the offset value is determined based on an MMVD distance index related to a magnitude of the at least one offset.

4. The method of claim 3, wherein the MMVD distance index indicates one of a plurality of predefined candidate offset values.

5. The method of claim 4, wherein the adding of an offset value to at least one of components of the plurality of control point motion vectors comprises:
scaling an offset value corresponding to the MMVD distance index; and
adding the scaled offset value to at least one of the components of the plurality of control point motion vectors.

6. The method of claim 5, wherein the scaling of an offset value comprises:
scaling the offset value based on a size of the current block or a magnitude of at least one of the control point motion vectors.

7. The method of claim 5, wherein the scaling of an offset value comprises:
scaling the offset value based on pixel-wise resolution for at least one of the control point motion vectors.

8. A device for processing a video signal using inter prediction, the device comprising:
a memory configured to store the video signal; and
a processor coupled to the memory,
wherein the processor is configured to:
obtain a merge subblock index for a current block for which a parameter for subblock-based inter prediction is derived from at least one neighboring block, wherein the merge subblock index is related to one candidate in a subblock-based merge candidate list,
obtain a plurality of control point motion vectors for a plurality of control points of the current block based on the merge subblock index,
apply at least one offset to the plurality of control point motion vectors based on a merge with motion vector difference (MMVD) direction index for refinement of the plurality of control point motion vectors,
determine a motion vector for each of subblocks of the current block based on a plurality of control point motion vectors to which the at least one offset is applied and a position of each of the subblocks within the current block, and
generate a prediction sample of the current block based on the motion vector for each of the subblocks and a reference picture related to the merge subblock index.

9. The device of claim 8, wherein,
in order to apply of at least one offset to the plurality of control point motion vectors, the processor is configured to:
add a first offset value to at least one of a horizontal component or a vertical component of a first control point motion vector based on the MMVD direction index,
add a second offset value to at least one of a horizontal component or a vertical component of a second control point motion vector based on the MMVD direction index, when the number of the control point motion vectors is 2, and
add the second offset value to at least one of the horizontal component or the vertical component of the second control point motion vector based on the MMVD direction index, and add a third offset value to at least one of a horizontal component or a vertical component of a third control point motion vector based on the MMVD direction index, when the number of the control point motion vectors is 2.

10. The device of claim 8, wherein,
in order to apply of at least one offset to the plurality of control point motion vectors, the processor is configured to:
add an offset value to at least one of components of the plurality of control point motion vectors,
wherein the offset value is determined based on an MMVD distance index related to a magnitude of the at least one offset.

11. The device of claim 10, wherein the MMVD distance index indicates one of a plurality of predefined candidate offset values.

12. The device of claim 11, wherein,
in order to add the offset value to at least one of components of the plurality of control point motion vectors, the processor is configured to:
scale an offset value corresponding to the MMVD distance index, and
add the scaled offset value to at least one of the components of the plurality of control point motion vectors.

13. The device of claim 12, wherein, in order to scale the offset value, the processor is configured to scale the offset value based on a size of the current block or a magnitude of at least one of the control point motion vectors.

14. The device of claim 12, wherein, in order to scale the offset value, the processor is configured to scale the offset value based on pixel-wise resolution for at least one of the control point motion vectors.

15. A non-transitory computer-readable medium for storing a computer-executable component configured to be executed in one or more processors of a computing device, the computer-executable component being configured to:
obtain a merge subblock index for a current block for which a parameter for subblock-based inter prediction is derived from at least one neighboring block, wherein the merge subblock index is related to one candidate in a subblock-based merge candidate list,
obtain a plurality of control point motion vectors for a plurality of control points of the current block based on the merge subblock index,
apply at least one offset to the plurality of control point motion vectors based on a merge with motion vector difference (MMVD) direction index for refinement of the plurality of control point motion vectors,
determine a motion vector for each of subblocks of the current block based on a plurality of control point motion vectors to which the at least one offset is applied and a position of each of the subblocks within the current block, and generate a prediction sample of the current block based on the motion vector for each of the subblocks and a reference picture related to the merge subblock index.

* * * * *